US012652539B2

(12) United States Patent
Zellner et al.

(10) Patent No.: US 12,652,539 B2
(45) Date of Patent: Jun. 9, 2026

(54) REMOTE VERIFICATION OF THE CONDITION OF A MOBILE DEVICE

(71) Applicant: Assurant, Inc., New York, NY (US)

(72) Inventors: Jennifer Zellner, Cleveland, OH (US); Jennifer Ridenour, Apple Creek, OH (US); Gui Rastelli, Miami, FL (US)

(73) Assignee: ASSURANT, INC., New York, NY (US)

( * ) Notice: Subject to any disclaimer, the term of this patent is extended or adjusted under 35 U.S.C. 154(b) by 95 days.

(21) Appl. No.: 17/643,442

(22) Filed: Dec. 9, 2021

(65) Prior Publication Data

US 2023/0188998 A1 Jun. 15, 2023

(51) Int. Cl.
| | |
|---|---|
| *H04M 1/66* | (2006.01) |
| *H04M 3/26* | (2006.01) |
| *H04W 12/12* | (2021.01) |
| *H04W 12/40* | (2021.01) |

(52) U.S. Cl.
CPC ............. *H04W 12/12* (2013.01); *H04M 3/26* (2013.01); *H04W 12/40* (2021.01); *H04M 2203/052* (2013.01)

(58) Field of Classification Search
CPC ..... H04L 63/102; H04L 67/303; H04L 63/10; H04L 63/20; H04W 12/08; H04W 12/12; H04W 12/40; H04W 12/37; H04W 12/30; H04W 12/65; H04M 3/26; G06F 21/604
See application file for complete search history.

(56) References Cited

U.S. PATENT DOCUMENTS

| | | | | |
|---|---|---|---|---|
| 9,454,889 B2 * | 9/2016 | Kerning | ................. | H04W 4/14 |
| 10,332,249 B2 | 6/2019 | Dwivedi et al. | | |
| 10,810,732 B2 | 10/2020 | Dwivedi et al. | | |
| 10,887,307 B1 * | 1/2021 | Newstadt | .............. | H04L 63/102 |
| 11,622,276 B1 * | 4/2023 | Wan | .................... | H04W 88/182 |
| | | | | 455/411 |
| 2007/0201641 A1 * | 8/2007 | Bar | ........................ | G06Q 30/04 |
| | | | | 379/114.03 |
| 2008/0066156 A1 * | 3/2008 | Ikeda | .................. | H04L 63/0876 |
| | | | | 726/3 |
| 2009/0282466 A1 * | 11/2009 | Uchida | ................. | H04L 9/3231 |
| | | | | 726/7 |
| 2011/0059688 A1 * | 3/2011 | Noonan | .................. | H04W 8/24 |
| | | | | 455/1 |

(Continued)

OTHER PUBLICATIONS

Outgoing—ISA/210—International Search Report Mailed on Apr. 5, 2023 for WO Application No. PCT/US22/052382, 15 page(s).

*Primary Examiner* — Shantell L Heiber
(74) *Attorney, Agent, or Firm* — ALSTON & BIRD LLP

(57) ABSTRACT

In various implementations, an acceptable condition of a mobile device may be determined based on a remote verification of a condition of the mobile device, wherein a method to verify the mobile device may comprise a user requesting the verification of the mobile device, the performance of a diagnostic on the mobile device, the reception of a security data object associated with the mobile device by the system, and/or the determination that the mobile device has a security feature either disabled or enabled. When the security feature of the mobile device is enabled or disabled, the system may configure the GUI to direct a user to disable the security feature or the system may configure the GUI to show an acceptable condition when the security feature is disabled.

25 Claims, 27 Drawing Sheets

(56) References Cited

U.S. PATENT DOCUMENTS

| | | | |
|---|---|---|---|
| 2013/0165072 | A1 | 6/2013 | Hoover et al. |
| 2014/0362768 | A1* | 12/2014 | Wood ................ H04W 52/0258 |
| | | | 370/328 |
| 2017/0126692 | A1* | 5/2017 | Stuntebeck ........... G06F 3/0481 |
| 2018/0367305 | A1* | 12/2018 | Gouget .................. G07C 13/00 |
| 2019/0266720 | A1 | 8/2019 | Dwivedi et al. |
| 2020/0074615 | A1* | 3/2020 | Nabavi .................. H04N 23/64 |
| 2020/0228979 | A1* | 7/2020 | Syed .................... H04W 12/12 |
| 2020/0358771 | A1* | 11/2020 | Vanguri ................ H04W 12/06 |
| 2021/0029239 | A1* | 1/2021 | Davis ..................... H04L 65/61 |
| 2023/0353423 | A1* | 11/2023 | Brown ............... H04L 63/0421 |

* cited by examiner

400

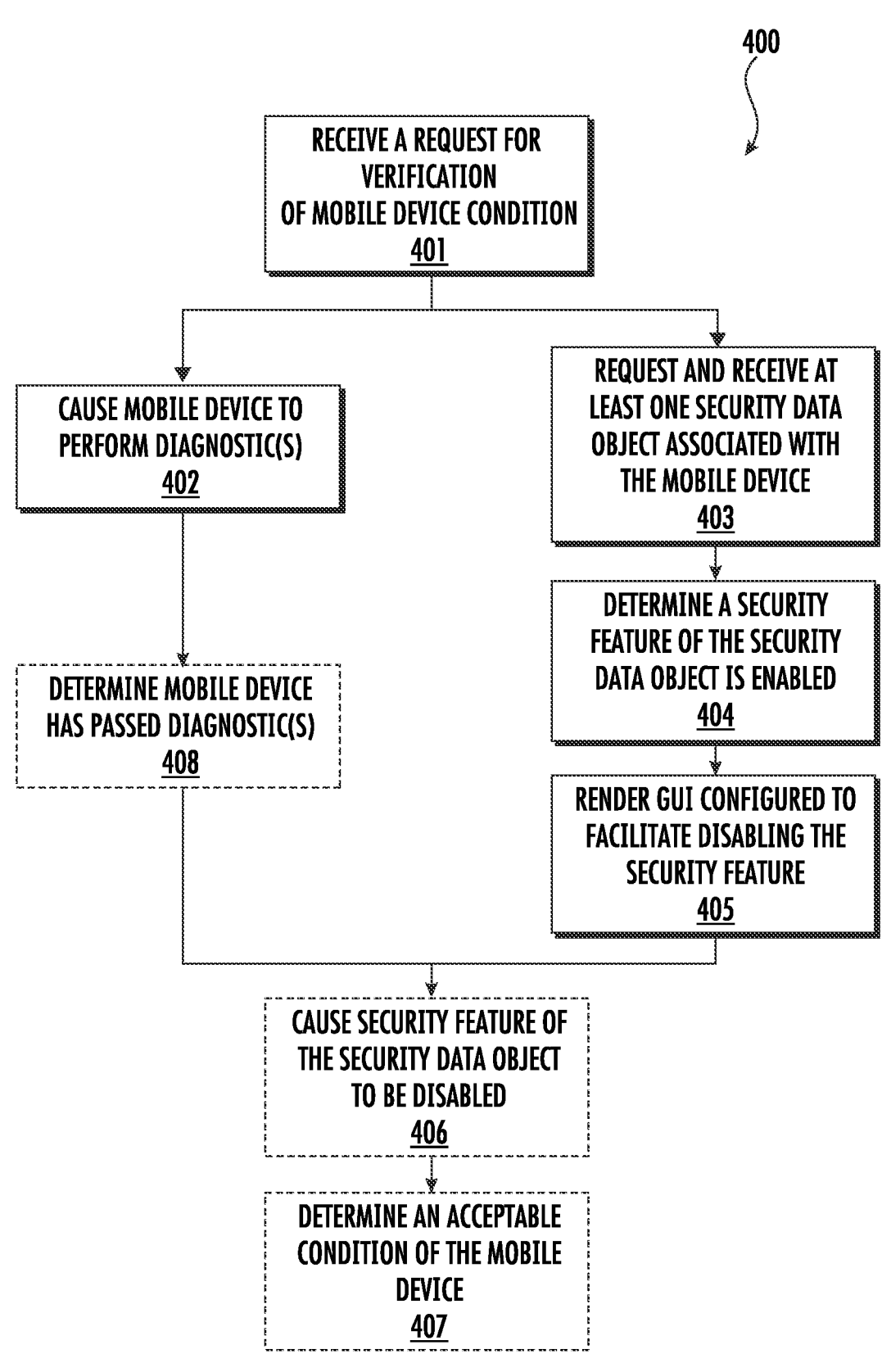

RECEIVE A REQUEST FOR
VERIFICATION
OF MOBILE DEVICE CONDITION
401

CAUSE MOBILE DEVICE TO
PERFORM DIAGNOSTIC(S)
402

REQUEST AND RECEIVE AT
LEAST ONE SECURITY DATA
OBJECT ASSOCIATED WITH
THE MOBILE DEVICE
403

DETERMINE MOBILE DEVICE
HAS PASSED DIAGNOSTIC(S)
408

DETERMINE A SECURITY
FEATURE OF THE SECURITY
DATA OBJECT IS ENABLED
404

RENDER GUI CONFIGURED TO
FACILITATE DISABLING THE
SECURITY FEATURE
405

CAUSE SECURITY FEATURE OF
THE SECURITY DATA OBJECT
TO BE DISABLED
406

DETERMINE AN ACCEPTABLE
CONDITION OF THE MOBILE
DEVICE
407

FIG. 4

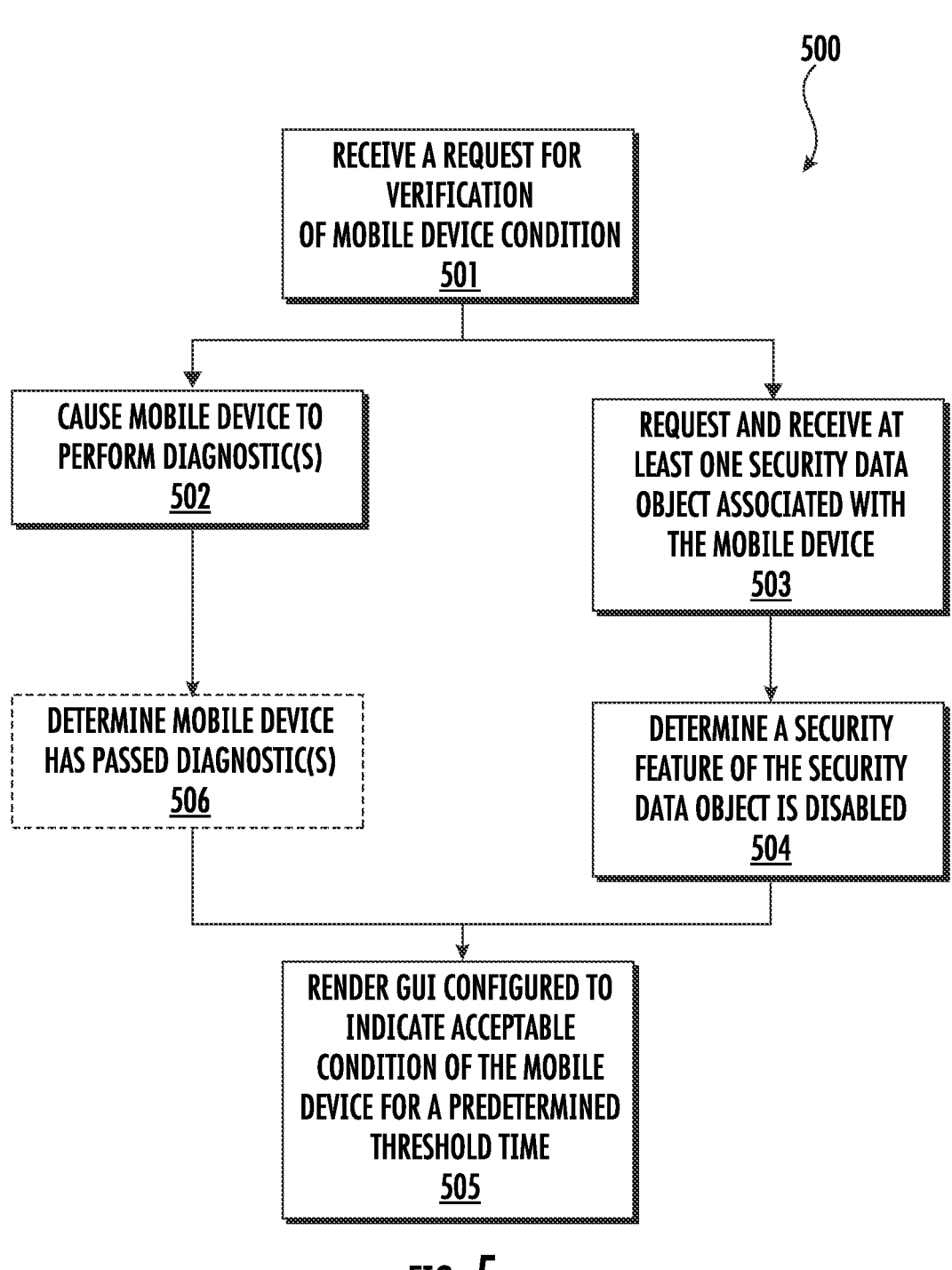

500

RECEIVE A REQUEST FOR
VERIFICATION
OF MOBILE DEVICE CONDITION
501

CAUSE MOBILE DEVICE TO
PERFORM DIAGNOSTIC(S)
502

REQUEST AND RECEIVE AT
LEAST ONE SECURITY DATA
OBJECT ASSOCIATED WITH
THE MOBILE DEVICE
503

DETERMINE MOBILE DEVICE
HAS PASSED DIAGNOSTIC(S)
506

DETERMINE A SECURITY
FEATURE OF THE SECURITY
DATA OBJECT IS DISABLED
504

RENDER GUI CONFIGURED TO
INDICATE ACCEPTABLE
CONDITION OF THE MOBILE
DEVICE FOR A PREDETERMINED
THRESHOLD TIME
505

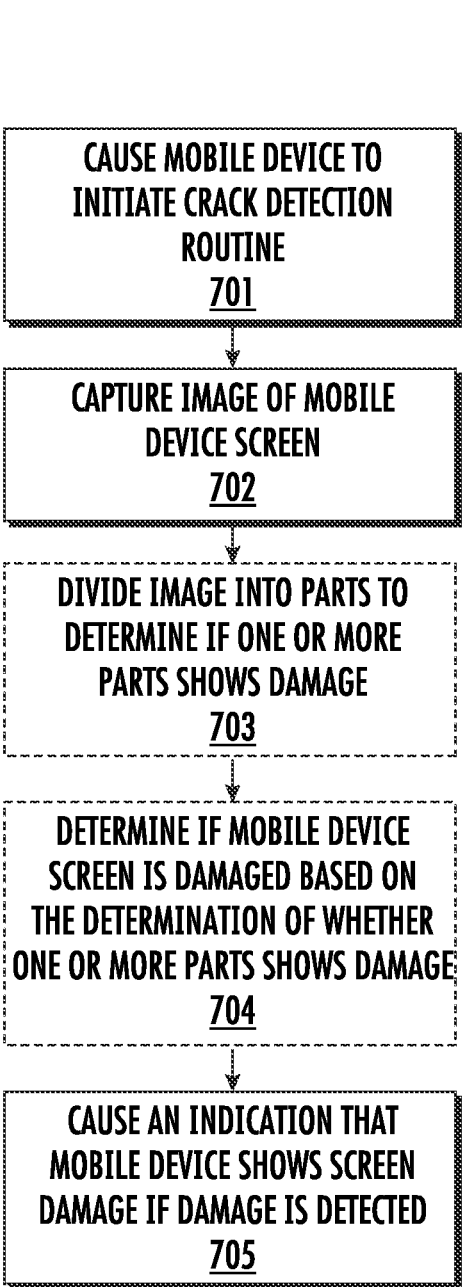

CAUSE MOBILE DEVICE TO
INITIATE CRACK DETECTION
ROUTINE
701

CAPTURE IMAGE OF MOBILE
DEVICE SCREEN
702

DIVIDE IMAGE INTO PARTS TO
DETERMINE IF ONE OR MORE
PARTS SHOWS DAMAGE
703

DETERMINE IF MOBILE DEVICE
SCREEN IS DAMAGED BASED ON
THE DETERMINATION OF WHETHER
ONE OR MORE PARTS SHOWS DAMAGE
704

CAUSE AN INDICATION THAT
MOBILE DEVICE SHOWS SCREEN
DAMAGE IF DAMAGE IS DETECTED
705

REQUEST AND RECEIVE SECURITY
DATA OBJECT ASSOCIATED WITH
THE MOBILE DEVICE
801

DETERMINE IF ONE OR MORE
SECURITY FEATURES ARE
ENABLED ON MOBILE DEVICE
802

YES

NO

CAUSE INVALID INDICATION OF
MOBILE DEVICE
803

CAUSE INDICATION OF
ACCEPTABLE CONDITION
OF MOBILE DEVICE
804

TRADE-IN                    ✕

APPLE iPHONE XS 64GB                    1501
PLEASE DEACTIVATE FIND MY iPHONE

WE CANNOT PROCEED AS LONG AS THE SECURITY
FEATURE: "FIND MY iPHONE" IS ACTIVATED ON YOUR
DEVICE.

PLEASE DEACTIVATE.                    1507

HOW TO DEACTIVATE "FIND MY iPHONE"
    1. OPEN SETTINGS.
    2. TAP [YOUR NAME] > FIND MY.
    3. TAP "FIND MY iPHONE", THEN TURN IT OFF.
    4. ENTER YOUR APPLE ID PASSWORD.
    5. TAP TURN OFF.

PROCEED                    1504

BACK TO OFFER                    1508

1700

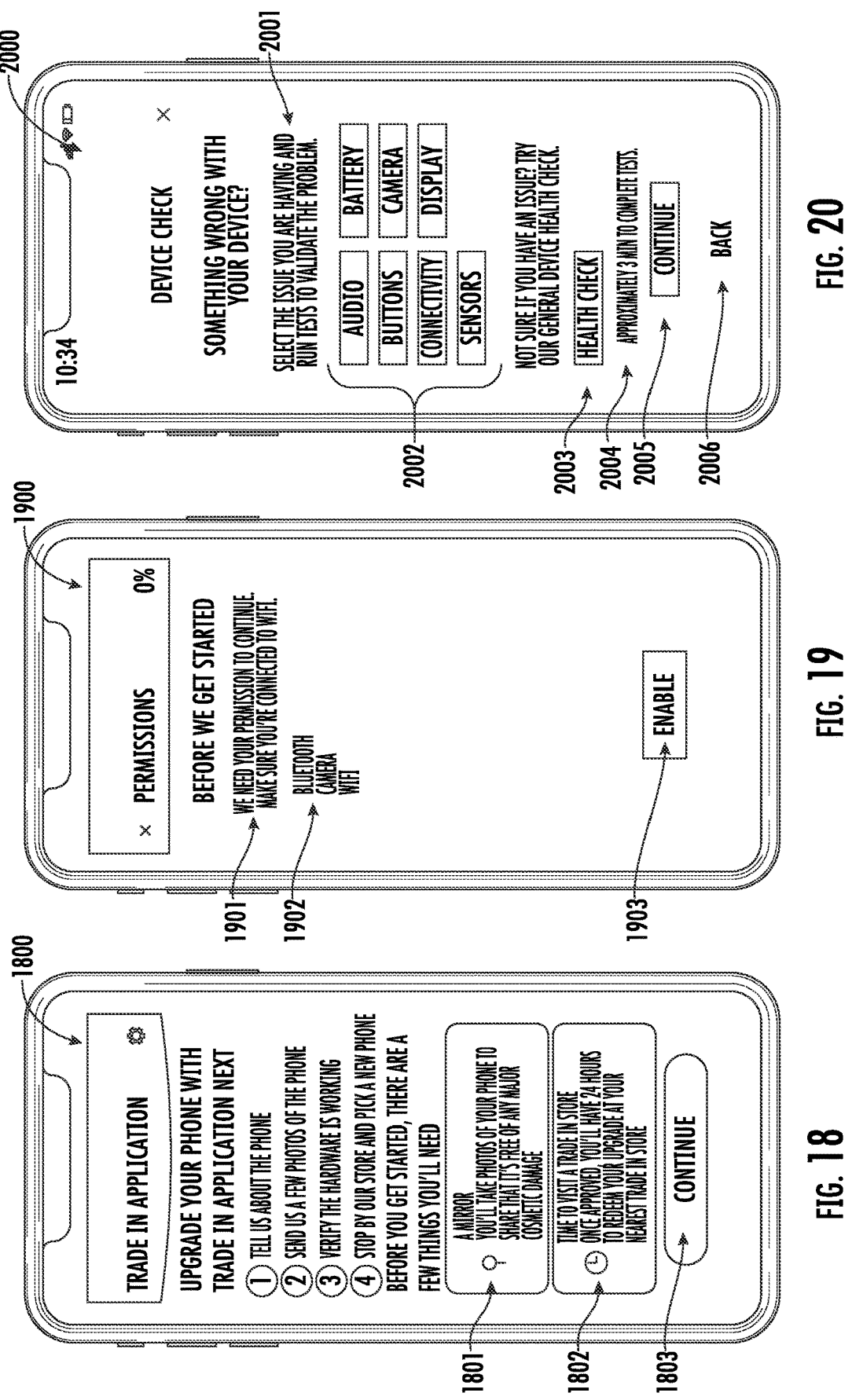

FIG. 20

DEVICE CHECK

SOMETHING WRONG WITH YOUR DEVICE?

SELECT THE ISSUE YOU ARE HAVING AND RUN TESTS TO VALIDATE THE PROBLEM.

AUDIO    BATTERY
BUTTONS    CAMERA
CONNECTIVITY    DISPLAY
SENSORS

NOT SURE IF YOU HAVE AN ISSUE? TRY OUR GENERAL DEVICE HEALTH CHECK.

HEALTH CHECK

APPROXIMATELY 3 MIN TO COMPLETE TESTS.

CONTINUE

BACK

FIG. 19

PERMISSIONS    0%

BEFORE WE GET STARTED

WE NEED YOUR PERMISSION TO CONTINUE. MAKE SURE YOU'RE CONNECTED TO WIFI.

BLUETOOTH
CAMERA
WIFI

ENABLE

FIG. 18

TRADE IN APPLICATION

UPGRADE YOUR PHONE WITH TRADE IN APPLICATION NEXT

1. TELL US ABOUT THE PHONE
2. SEND US A FEW PHOTOS OF THE PHONE
3. VERIFY THE HARDWARE IS WORKING
4. STOP BY OUR STORE AND PICK A NEW PHONE

BEFORE YOU GET STARTED, THERE ARE A FEW THINGS YOU'LL NEED

A MIRROR
YOU'LL TAKE PHOTOS OF YOUR PHONE TO SHARE THAT IT'S FREE OF ANY MAJOR COSMETIC DAMAGE

TIME TO VISIT A TRADE IN STORE
ONCE APPROVED, YOU'LL HAVE 24 HOURS TO REDEEM YOUR UPGRADE AT YOUR NEAREST TRADE IN STORE

CONTINUE

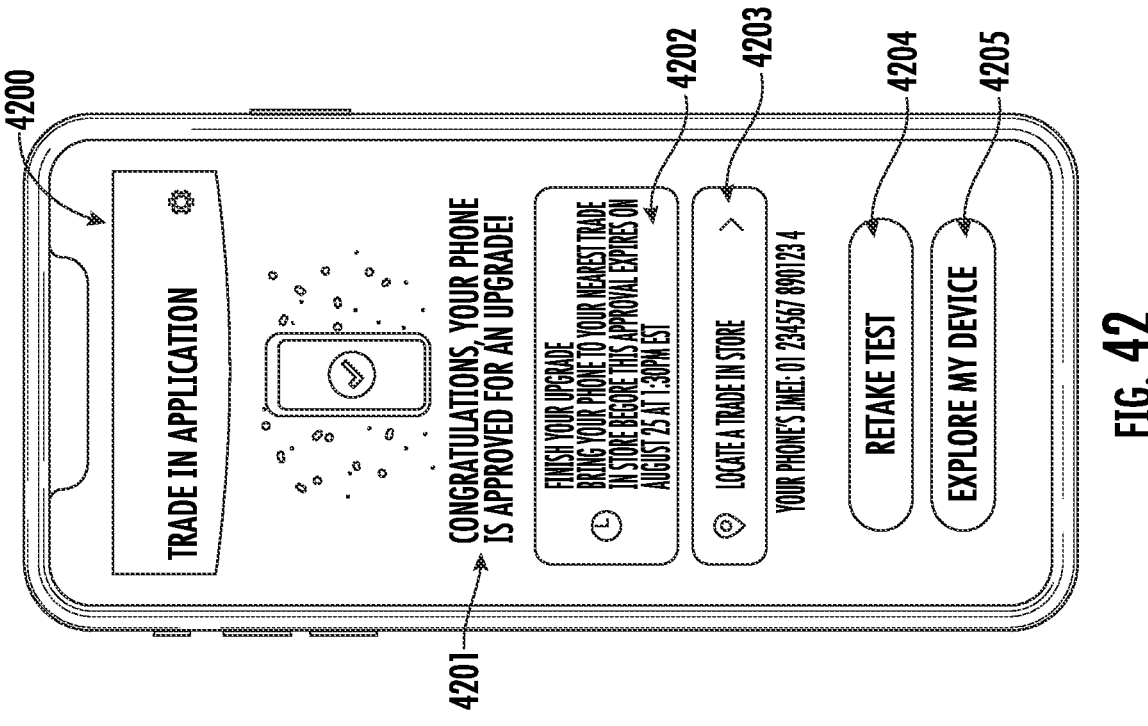

4200

TRADE IN APPLICATION

CONGRATULATIONS, YOUR PHONE IS APPROVED FOR AN UPGRADE!

4201

FINISH YOUR UPGRADE
BRING YOUR PHONE TO YOUR NEAREST TRADE IN STORE BEFORE THIS APPROVAL EXPIRES ON AUGUST 25 AT 1:30PM EST

4202

LOCATE A TRADE IN STORE

4203

YOUR PHONE'S IMEI: 01 234567 890123 4

RETAKE TEST

4204

EXPLORE MY DEVICE

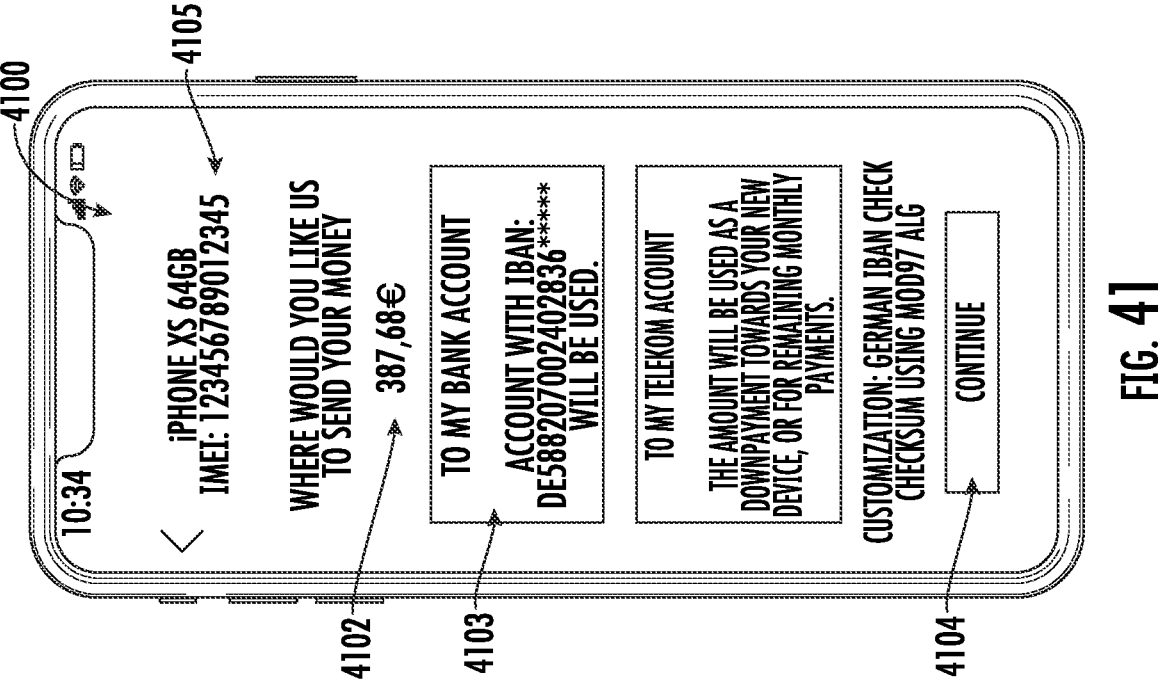

4100

10:34

4105 iPHONE XS 64GB
IMEI: 123456789012345

WHERE WOULD YOU LIKE US TO SEND YOUR MONEY 387,68 €

4102

TO MY BANK ACCOUNT

ACCOUNT WITH IBAN:
DE58820700240283 6*****
WILL BE USED.

4103

TO MY TELEKOM ACCOUNT

THE AMOUNT WILL BE USED AS A DOWNPAYMENT TOWARDS YOUR NEW DEVICE, OR FOR REMAINING MONTHLY PAYMENTS.

CUSTOMIZATION: GERMAN IBAN CHECK CHECKSUM USING MOD97 ALG

REMOTE VERIFICATION OF THE CONDITION OF A MOBILE DEVICE

TECHNOLOGICAL FIELD

Embodiments of the present disclosure generally relate to systems, methods, and apparatuses related to the remote verification of a condition of a mobile device. The remote verification may include performing one or more diagnostics on the mobile device and/or verifying the status of a security feature on the mobile device.

BACKGROUND

Mobile devices, such as smart phones, watches, tablets, and any other computing device, are often in transit or otherwise difficult to locate on demand in a predictable manner. Thus, checking the condition of such mobile devices is unpredictable and often must be delayed until a user ships or hand delivers the device to a testing site or other collection location, where such a delay may cause further problems with the mobile device (e.g., bricking) or otherwise delay the receipt of time-sensitive data about the condition of the mobile device. Through applied effort, ingenuity, and innovation, Applicant has solved many of these identified problems by developing a solution that is embodied by embodiments of the present inventions, which are described in detail below.

BRIEF DESCRIPTION

In general, embodiments of the present disclosure include systems, apparatuses, computer-implemented methods, computer readable media, and computer program products for remote verification of the condition of a mobile device. Other implementations of the remote verification of the condition of the mobile device will be, or will become, apparent to one with skill in the art upon examination of the following figures and detailed description. It is intended that all such additional implementations be included within this description be within the scope of the disclosure and be protected by the following claims.

In accordance with some embodiments of the present disclosure, a computer executable method for remotely verifying a condition of a mobile device may be provided, wherein the method may include receiving a request for verification of the condition of the mobile device; based on the request, causing the mobile device to perform at least one diagnostic via a processor of the mobile device; based on the request, receiving at least one security data object associated with the mobile device; determining that the at least one security data object indicates that a security feature associated with the at least one security data object is enabled; and causing rendering of a graphical user interface for a user of the mobile device configured to facilitate disabling the security feature.

In accordance with some embodiments, the method for remotely verifying a condition of a mobile device may include the embodiment wherein that at least one diagnostic may include a crack detection routine including: directing a user of the mobile device to orient a front-facing camera of the mobile device towards a reflective surface; capturing an image of the mobile device with the front-facing camera; and analyzing the image to determine if a crack is present or transmitting the image from the mobile device for analysis.

In accordance with some embodiments, the method for remotely verifying a condition of a mobile device may include the embodiment wherein the at least one diagnostic may include an internal diagnostic test.

In accordance with some embodiments, the method for remotely verifying a condition of a mobile device may include the embodiment wherein receiving the at least one security data object may include querying at least one external system and receiving the at least one security data object from the external system.

In accordance with some embodiments, the method for remotely verifying a condition of a mobile device may include the embodiment wherein the security data object is transmitted from the mobile device or from an external system to a remote verification system.

In accordance with some embodiments, the method for remotely verifying a condition of a mobile device may include transmitting an indication of an unacceptable condition of the mobile device upon detecting one or more of: failure of the at least one diagnostic; or the at least one security data object indicates that a security feature associated with the at least one security data object is enabled.

In accordance with some embodiments, the method for remotely verifying a condition of a mobile device may include causing a prompt to be displayed on the mobile device, wherein the prompt includes requesting entry of a serial number of the mobile device, receiving an identification data object associated with said mobile device, and determining that said identification data object matches the serial number.

In accordance with some embodiments, the method for remotely verifying a condition of a mobile device may include configuring the mobile device based on the security data object, wherein the security data object may be maintained by a provider system. In accordance with some embodiments, the method for remotely verifying a condition of a mobile device may include an embodiment wherein the security data object is configured to be updated to indicate that the security feature is disabled after an authentication credential is entered into the mobile device or a second interface of a second device having access to an account associated with the user of the mobile device.

In accordance with some embodiments, the method for remotely verifying a condition of a mobile device may include receiving an updated security data object indicating that the security feature is disabled, determining an acceptable condition of the mobile device based upon the updated security data object, and transmitting computer readable instructions from a remote verification server configured to facilitate transfer of the mobile device from the user to a third party. In some embodiments, the remote verification server may be configured to determine the acceptable condition and facilitate transfer of the mobile device from the user to the third party without requiring identifying information associated with the user or the third party.

In accordance with some embodiments, the method for remotely verifying a condition of a mobile device may include receiving an updated security data object indicating that the security feature is disabled, determining an acceptable condition of the mobile device based upon the updated security data object, and changing an indication of an acceptable condition of the mobile device to an unacceptable condition after a predetermined threshold time has lapsed.

In accordance with some embodiments, the method for remotely verifying a condition of a mobile device may include receiving an updated security data object indicating that the security feature is disabled and transmitting an indication of an acceptable condition of the mobile device.

In accordance with some embodiments, the method for remotely verifying a condition of a mobile device may include receiving an indication that the mobile device that the mobile device has passed the at least one diagnostic before transmitting the indication of the acceptable condition of the mobile device. In accordance with some embodiments, the method for remotely verifying a condition of a mobile device may include receiving the indication that the mobile device has passed the at least one diagnostic before receiving at least one security data object associated with the mobile device.

In accordance with some embodiments, the method for remotely verifying a condition of a mobile device may include causing rendering of instructions for executing a transaction for the mobile device based on the acceptable condition.

In accordance with some embodiments, at least one computer readable medium may be provided for remote verification of a mobile device is provided, the computer program product may include at least one non-transitory computer-readable storage medium having a computer program code stored thereon, the computer program code configured, in execution with at least one processor, for: receiving a request for verification of a condition of a mobile device; based on the request, causing the mobile device to perform at least one diagnostic via processor of the mobile device; based on the request, receiving at least one security data object associated with the mobile device, wherein, in an instance a status of the at least one security data object indicates that a security feature associated with the at least one security data object is disabled, transmitting an indication of an acceptable condition of the mobile device; wherein, in an instance in which the status of the at least one security data object indicates that a security feature associated with the at least one security data object is enabled, transmitting an invalid indication of the mobile device; and causing rendering of a graphic user interface for a user of the mobile device configured to display at least an acceptable condition of the mobile device or an invalid indication of the mobile device.

In accordance with some embodiments, the at least one computer readable medium for remote verification of a mobile device may include an embodiment wherein performing at least one diagnostic includes directing a user of a mobile device to orient a front-facing camera of the mobile device towards a reflective surface; capturing an image of the mobile device with the front-facing camera; and analyzing the image to determine if a crack is present or transmitting the image from the mobile device for analysis.

In accordance with some embodiments, the at least one computer readable medium for remote verification of a mobile device may include an embodiment wherein the at least one diagnostic may include an internal diagnostic test.

In accordance with some embodiments, the at least one computer readable medium for remote verification of a mobile device may include an embodiment wherein receiving the at least one security data object may include querying at least one external system and receiving the at least one security data object from the external system.

In accordance with some embodiments, the at least one computer readable medium for remote verification of a mobile device may include an embodiment wherein the security data object is transmitted from the mobile device or from an external system to a remote verification system.

In accordance with some embodiments, the computer program code may be configured, in execution with the at least one processor, for transmitting an indication of an unacceptable condition of the mobile device upon detecting one or more of: failure of the at least one diagnostic; or the at least one security data object indicates that a security feature associated with the at least one security data object is enabled.

In accordance with some embodiments, the computer program code may be configured, in execution with the at least one processor, for causing a prompt to be displayed on the mobile device, wherein the prompt may include requesting entry of a serial number of the mobile device, receiving an identification data object associated with said mobile device, and determining that said identification data object matches the serial number.

In accordance with some embodiments, the computer program code may be configured, in execution with the at least one processor, for configuring the mobile device with the security data object, wherein the security data object is maintained by a provider system. In accordance with some embodiments, the computer program product for remote verification of a mobile device may include the embodiment wherein the security data object is configured to be disabled after an authentication credential is entered into the mobile device or a second interface of a second device having access to an account associated with the user of the mobile device.

In accordance with some embodiments, the computer program code may be configured, in execution with the at least one processor, for receiving an updated security data object indicating that the security feature is disabled, determining an acceptable condition of the mobile device based upon the updated security data object, and transmitting computer readable instructions from a remote verification server configured to facilitate transfer of the mobile device from the user to a third party.

In accordance with some embodiments, the remote verification server may be configured to determine the acceptable condition and facilitate transfer of the mobile device from the user to the third party without requiring identifying information associated with the user or the third party.

In accordance with some embodiments, the computer program code may be configured, in execution with the at least one processor, for receiving an updated security data object indicating that the security feature is disabled, determining an acceptable condition of the mobile device based upon the updated security data object, and changing the indication of an acceptable condition of the mobile device to an unacceptable condition after a predetermined threshold time has lapsed.

In accordance with some embodiments, the computer program code may be configured, in execution with the at least one processor, for receiving an updated security data object indicating that the security feature is disabled and transmitting an indication of an acceptable condition of the mobile device.

In accordance with some embodiments, the computer program code may be configured, in execution with the at least one processor, for receiving an indication that the mobile device has passed the at least one diagnostic before transmitting the indication of the acceptable condition of the mobile device. In accordance with some embodiments, the computer program code may be configured, in execution with the at least one processor, for receiving the indication that the mobile device has passed the at least one diagnostic before receiving at least one security data object associated with the mobile device.

In accordance with some embodiments, the computer program code may be configured, in execution with the at least one processor, for causing the rendering of instructions for executing a transaction for the mobile device based on the acceptable condition.

In accordance with some embodiments, the at least one computer readable medium for remote verification of a mobile device may include an embodiment wherein computer program code may be housed on a Software Development Kit (SDK). In accordance with some embodiments, the SDK may be applied to one or more mobile devices.

In accordance with some embodiments of the present disclosure, a system for remote verification of a mobile device may be provided, the system may include: a processor of the mobile device configured to receive a request for verification of the mobile device; cause, based on the request, the mobile device to perform at least one diagnostic; receive, based on the request, at least one security data object associated with the mobile device; wherein, in an instance a status of the at least one security data object indicates that a security feature associated with the at least one security data object is disabled, transmitting an indication of an acceptable condition of the mobile device; wherein, in an instance in which the status of the at least one security data object indicates that a security feature associated with the at least one security data object is enabled, transmitting an invalid indication of the mobile device; causing the rendering of a graphical user interface for a user of the mobile device configured to display at least an acceptable condition of the mobile device or an invalid indication of the mobile device.

In accordance with some embodiments, the system may be configured to perform any methods, include any apparatuses or computer readable media, or otherwise be configured and structured in accordance with the various embodiments herein.

BRIEF DESCRIPTION OF THE DRAWINGS

Figure 1:
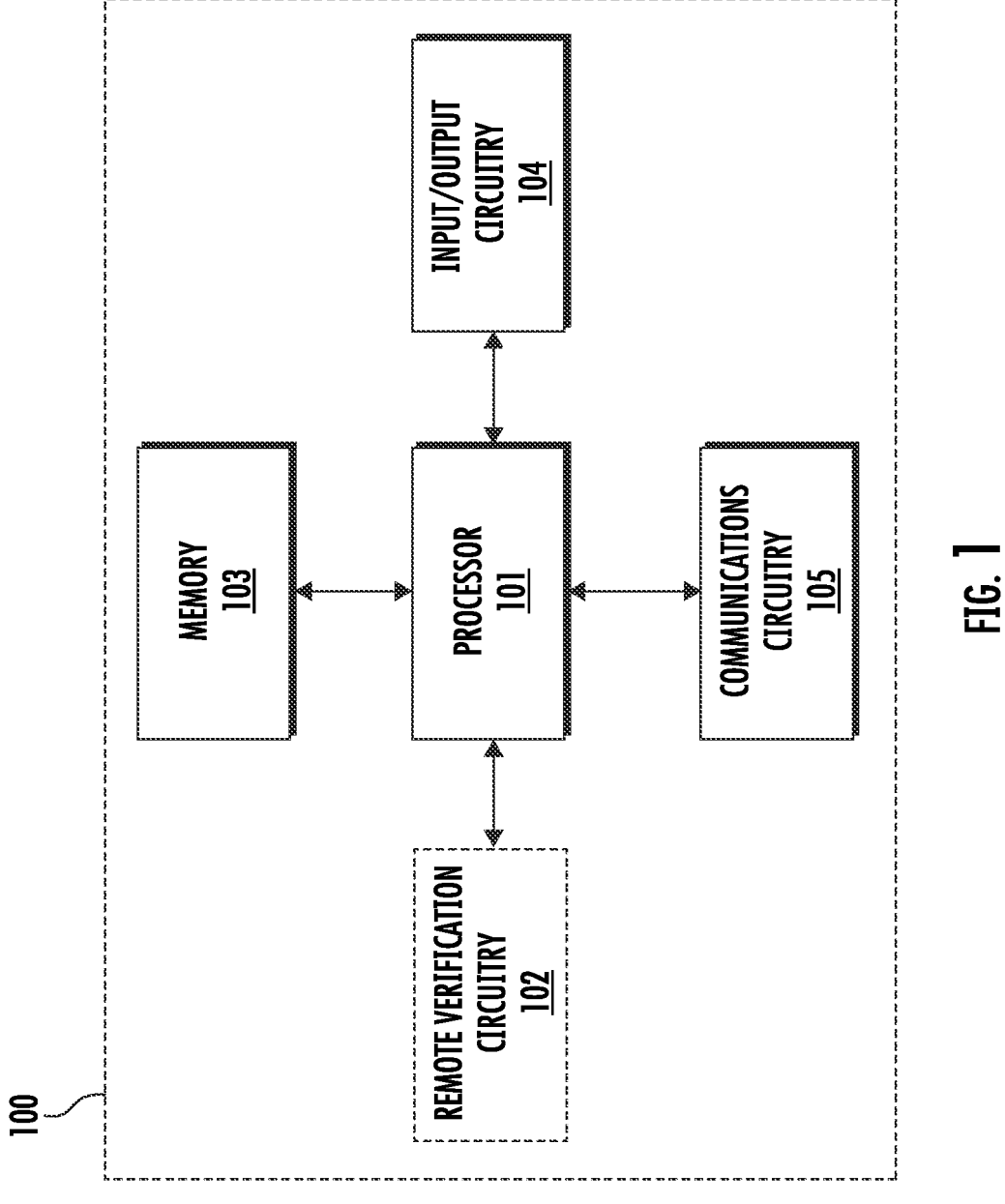
Figure 2:
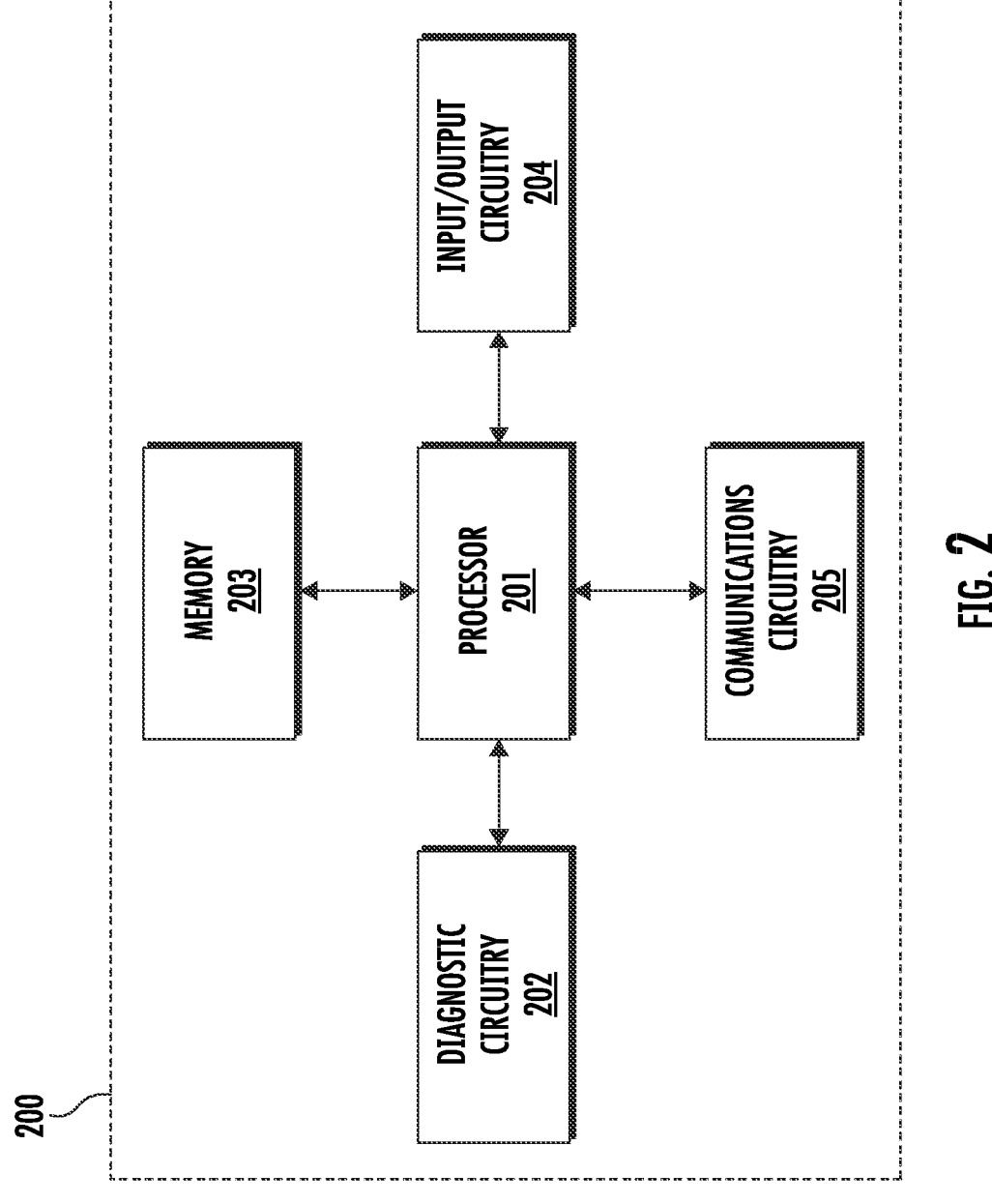
Figure 3:
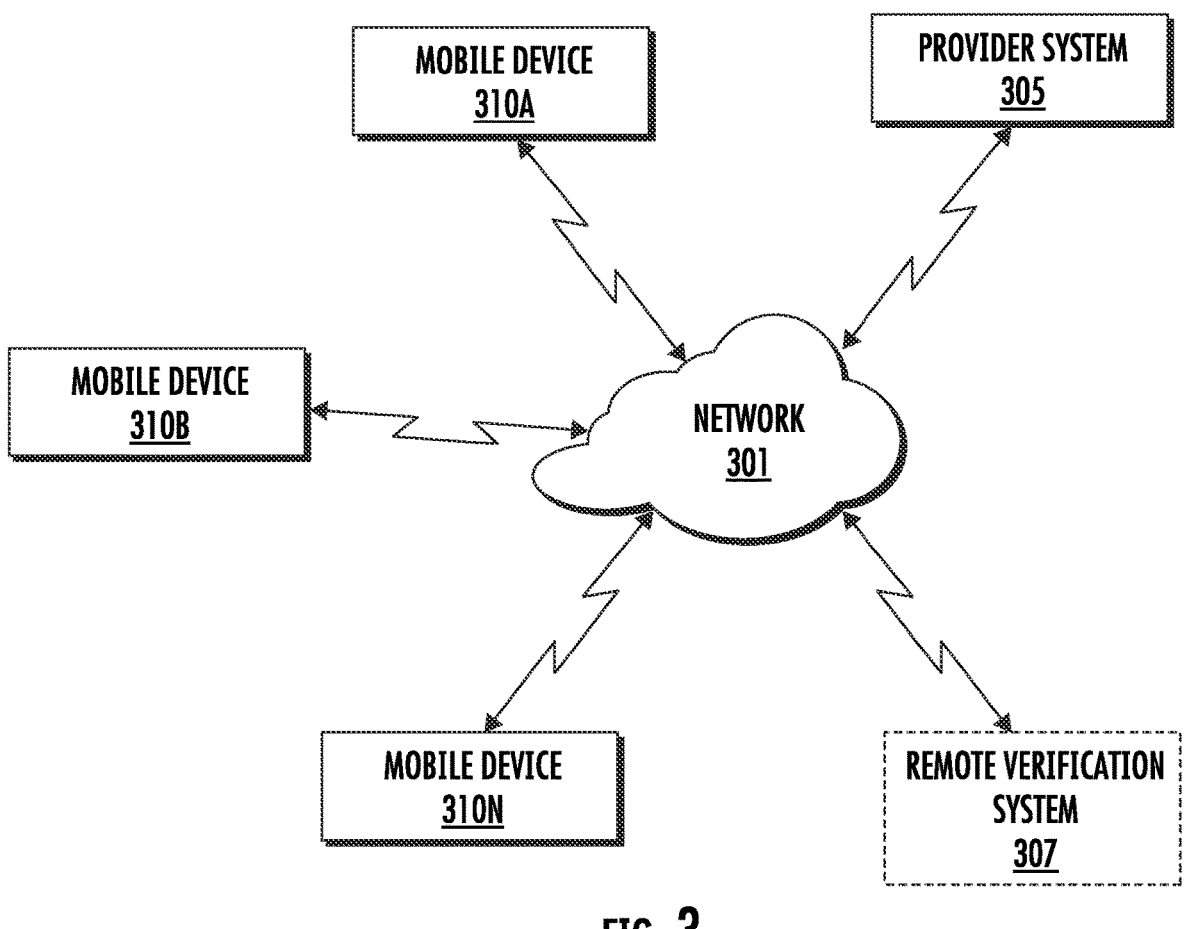
Figure 6:
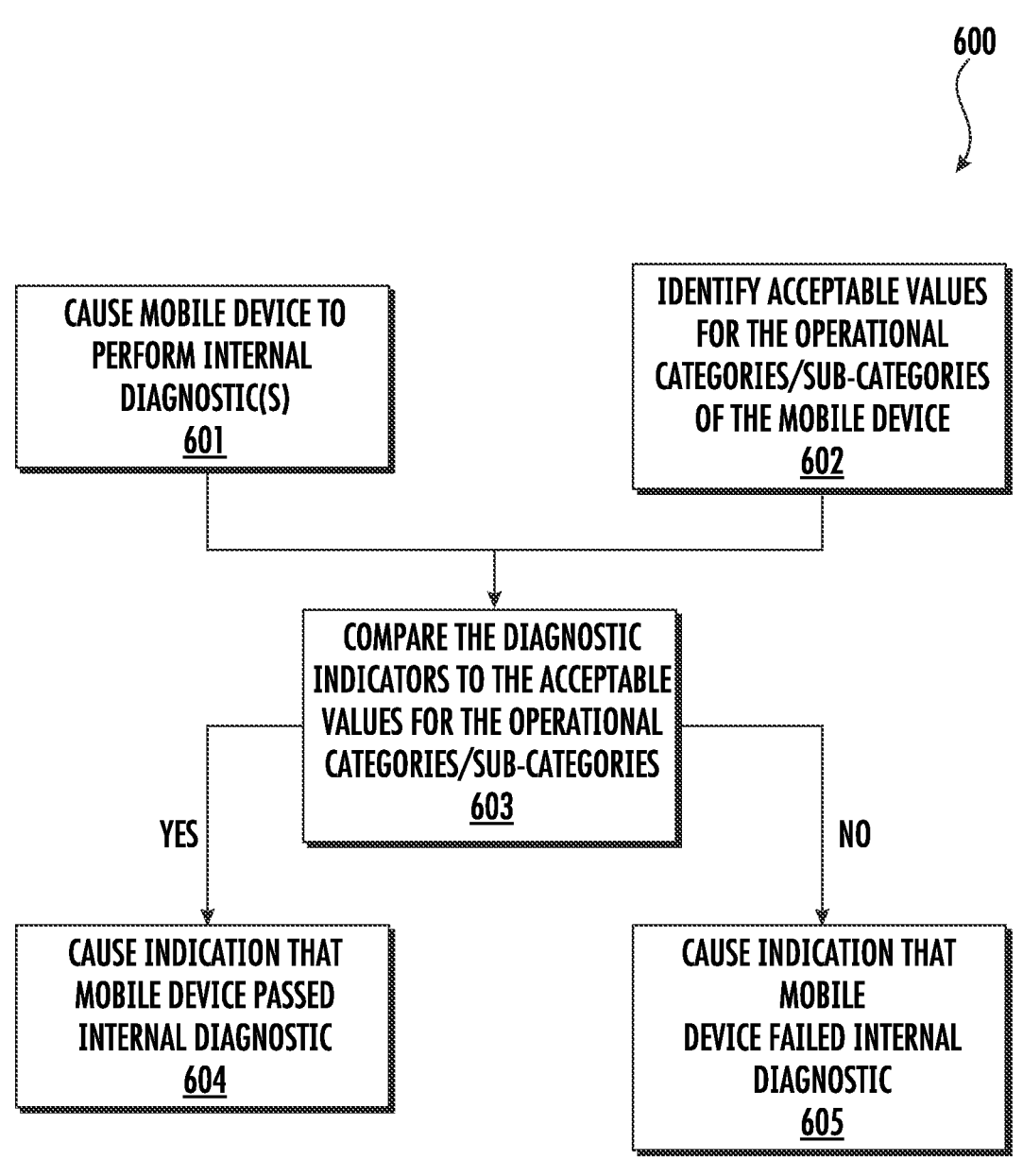
Figure 8:
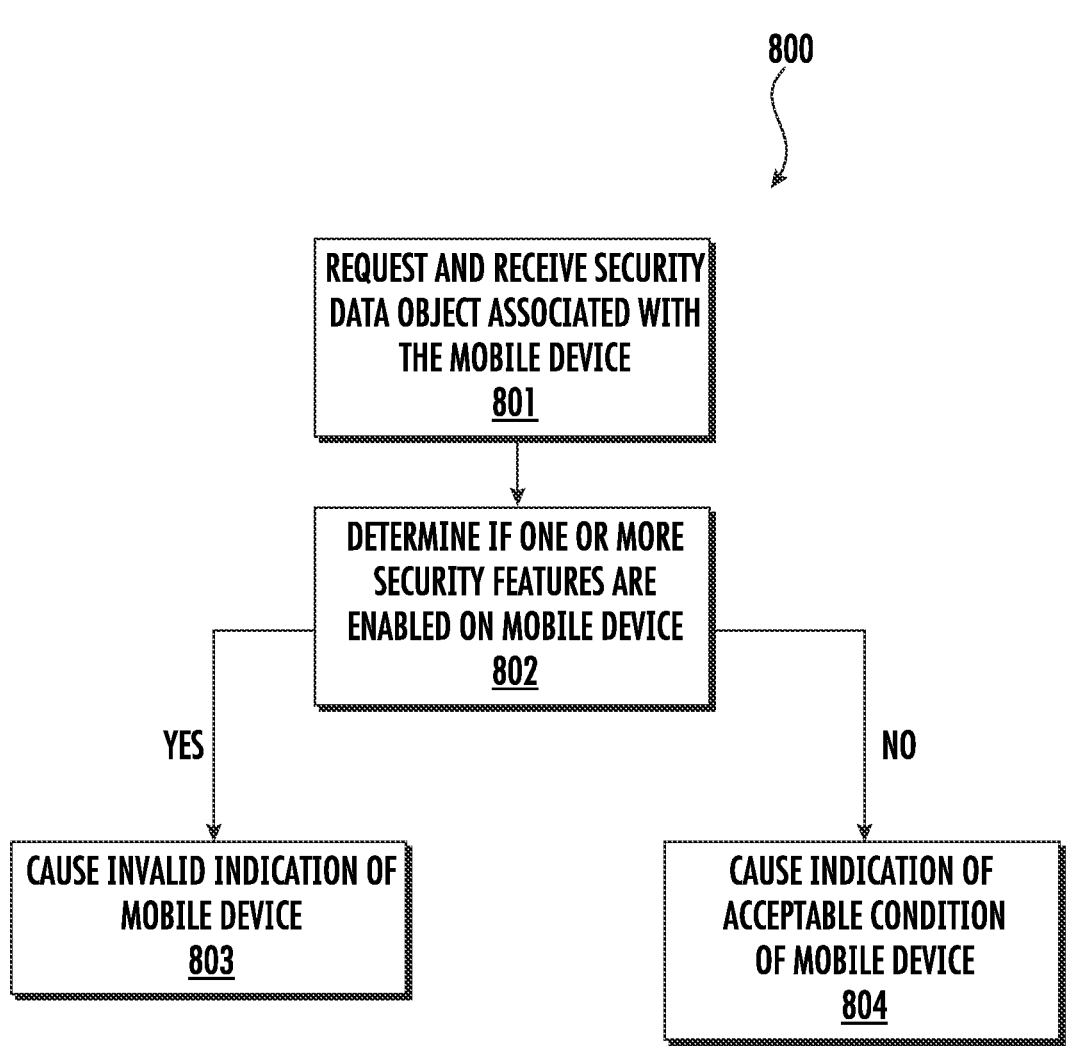
Figure 9:
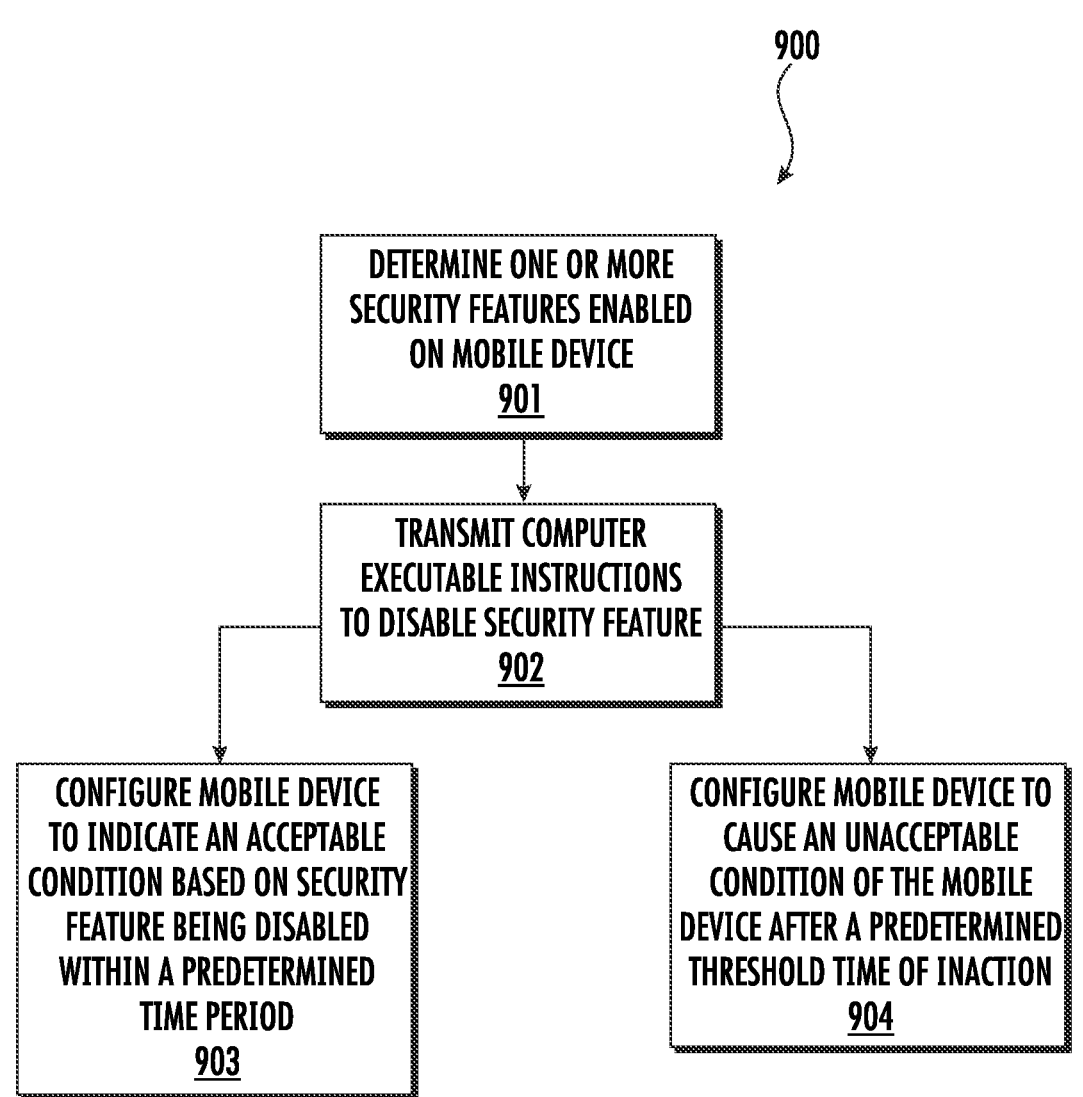
Figure 10:
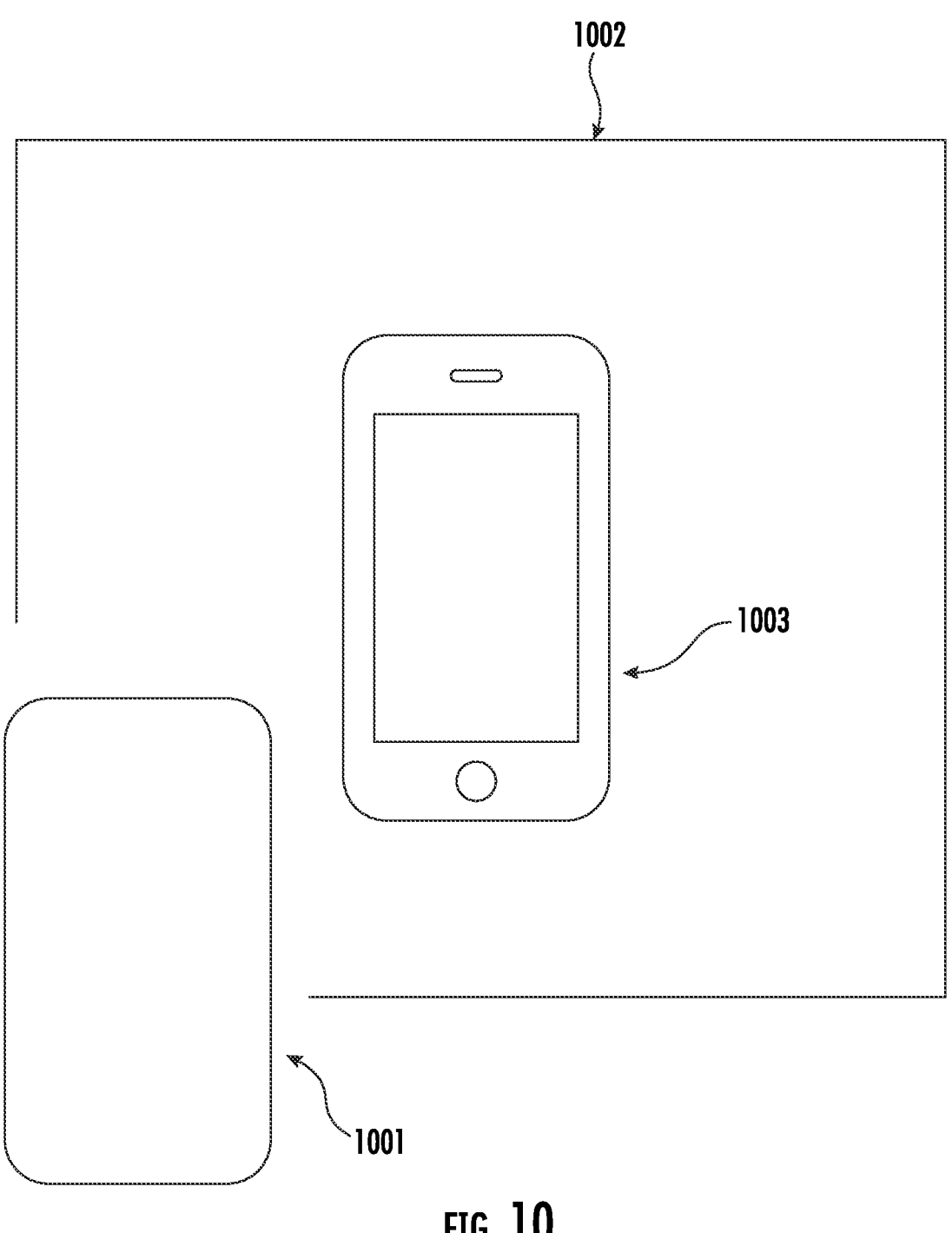
Figure 11:
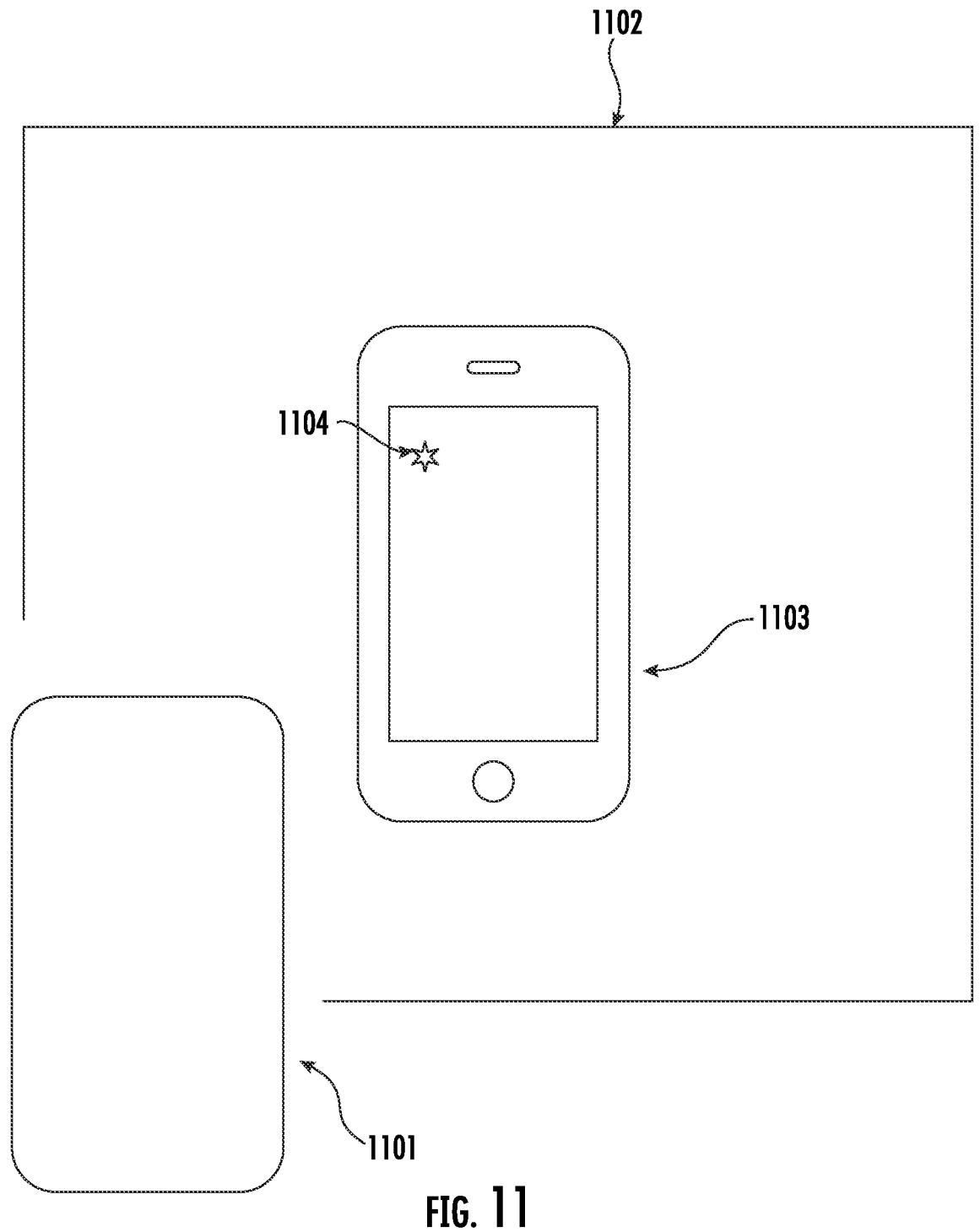
Figure 12:
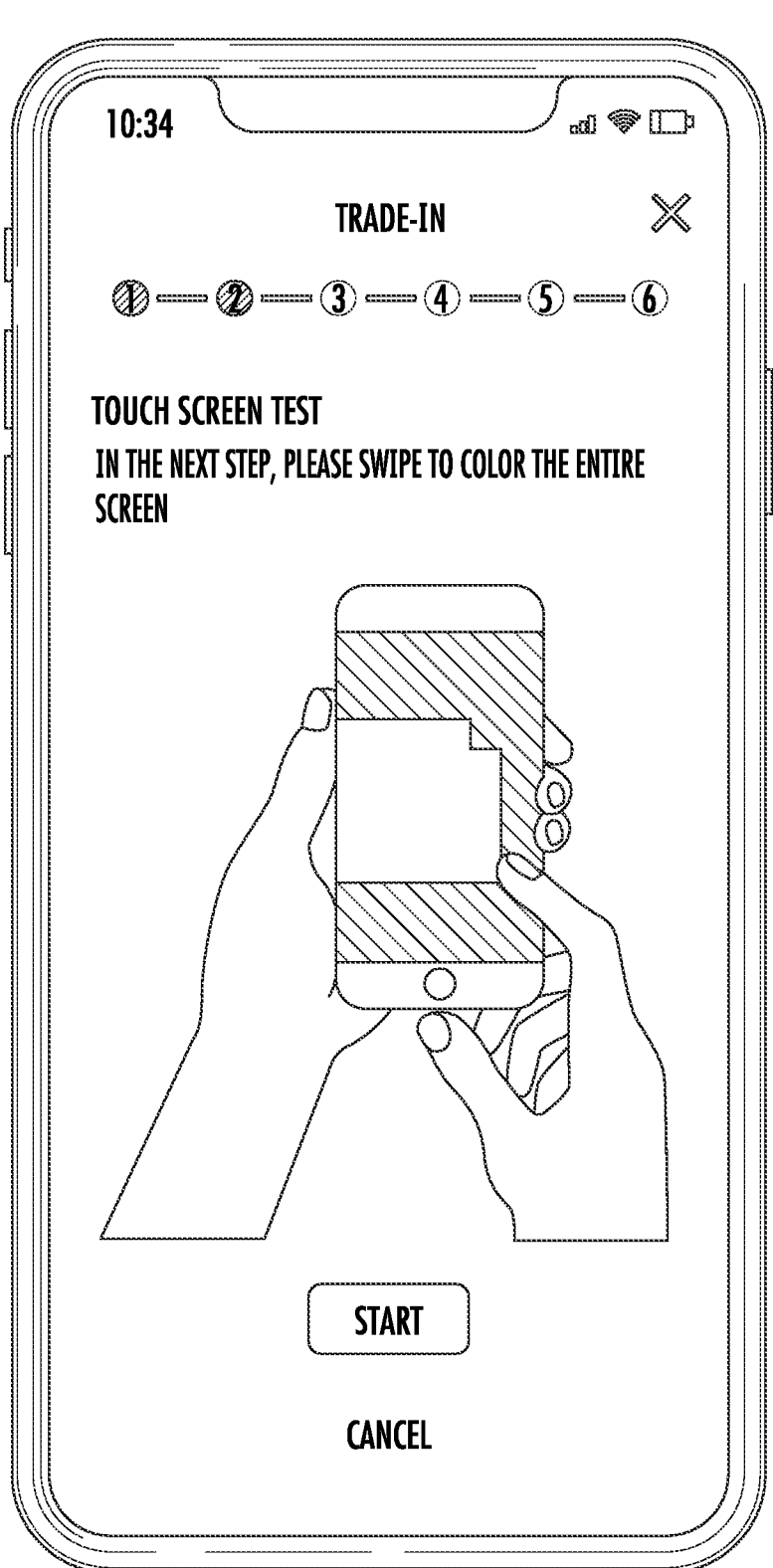
Figure 13:
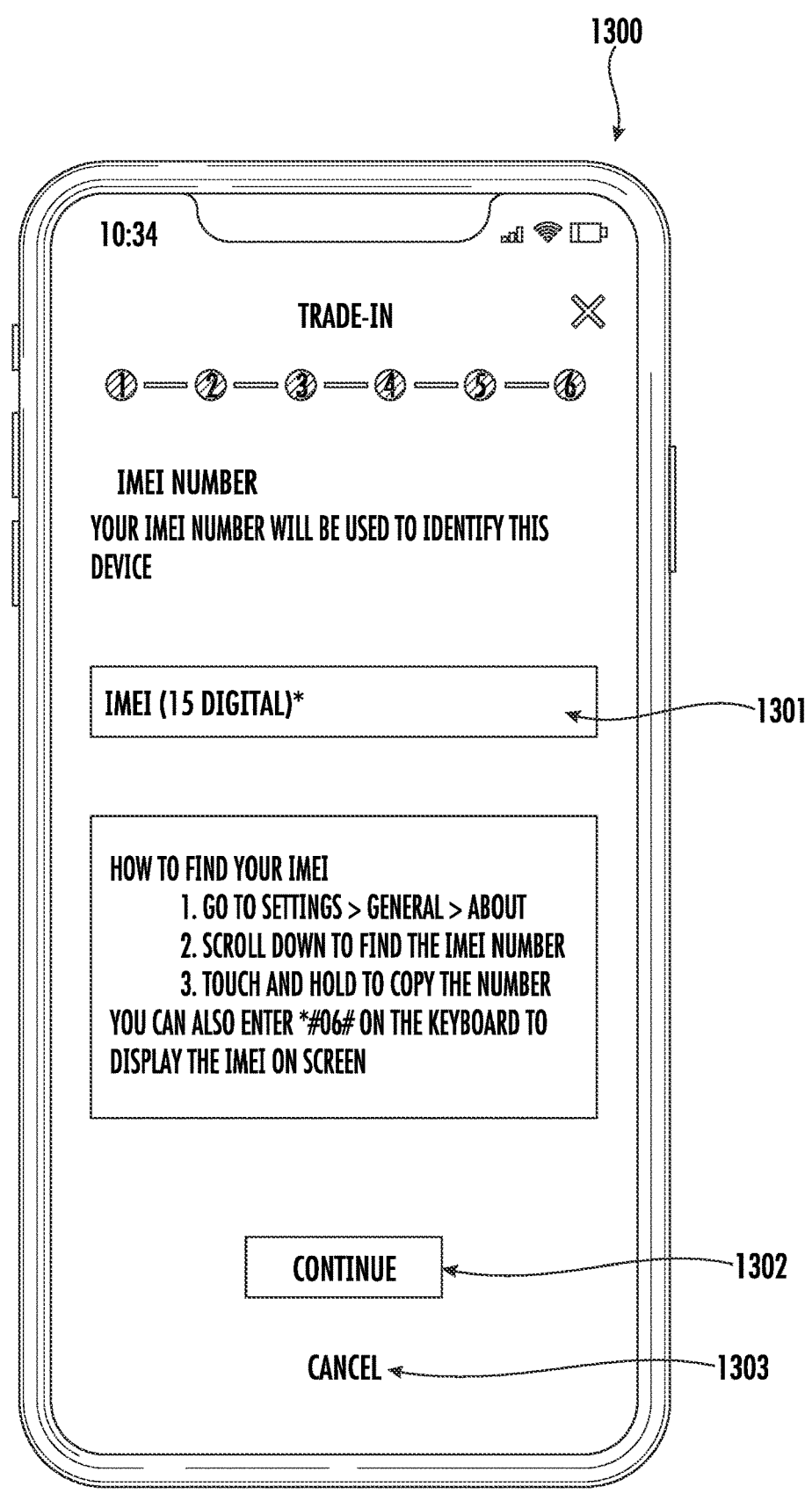
Figure 14:
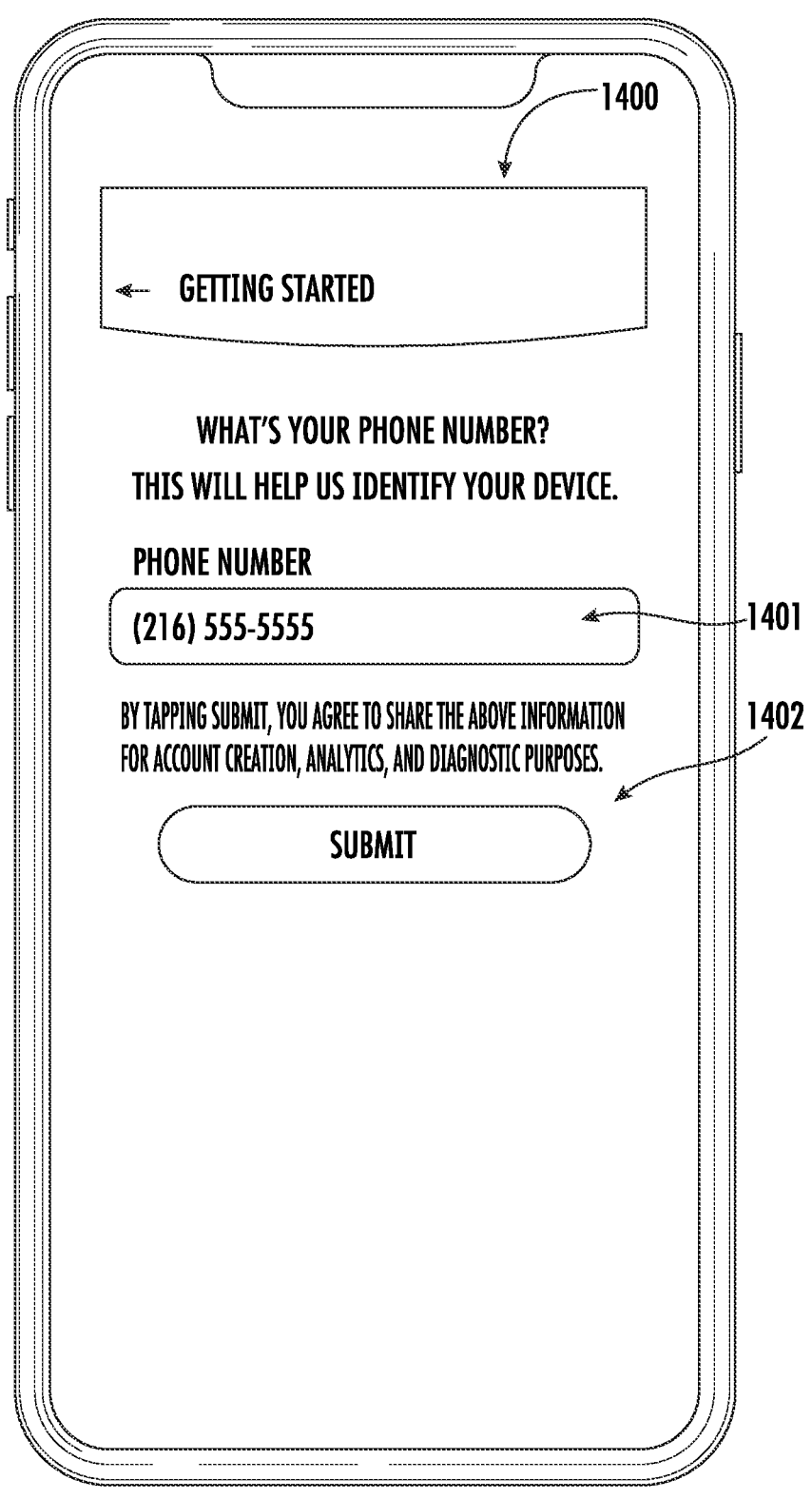
Figure 15:
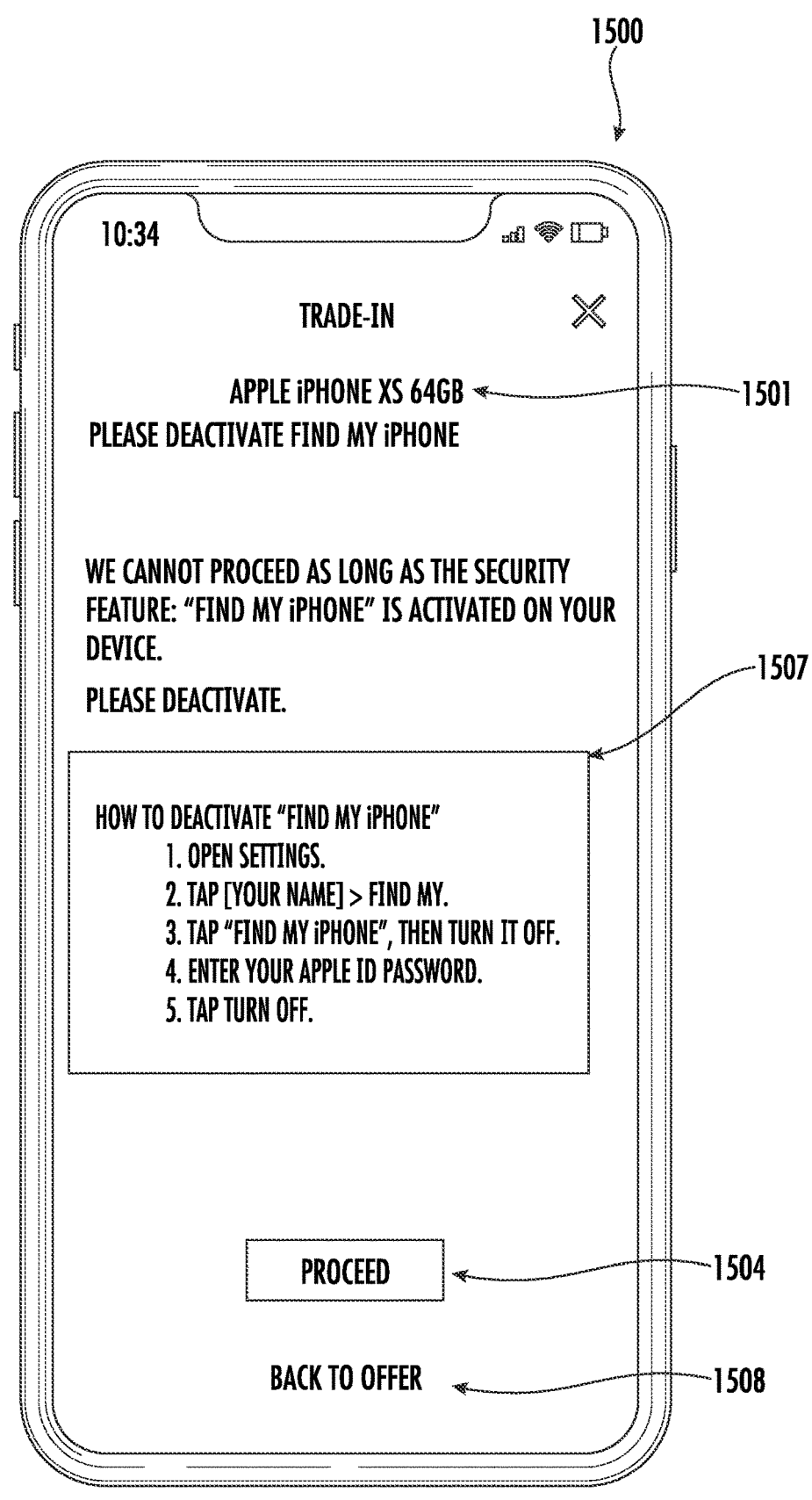
Figure 16:
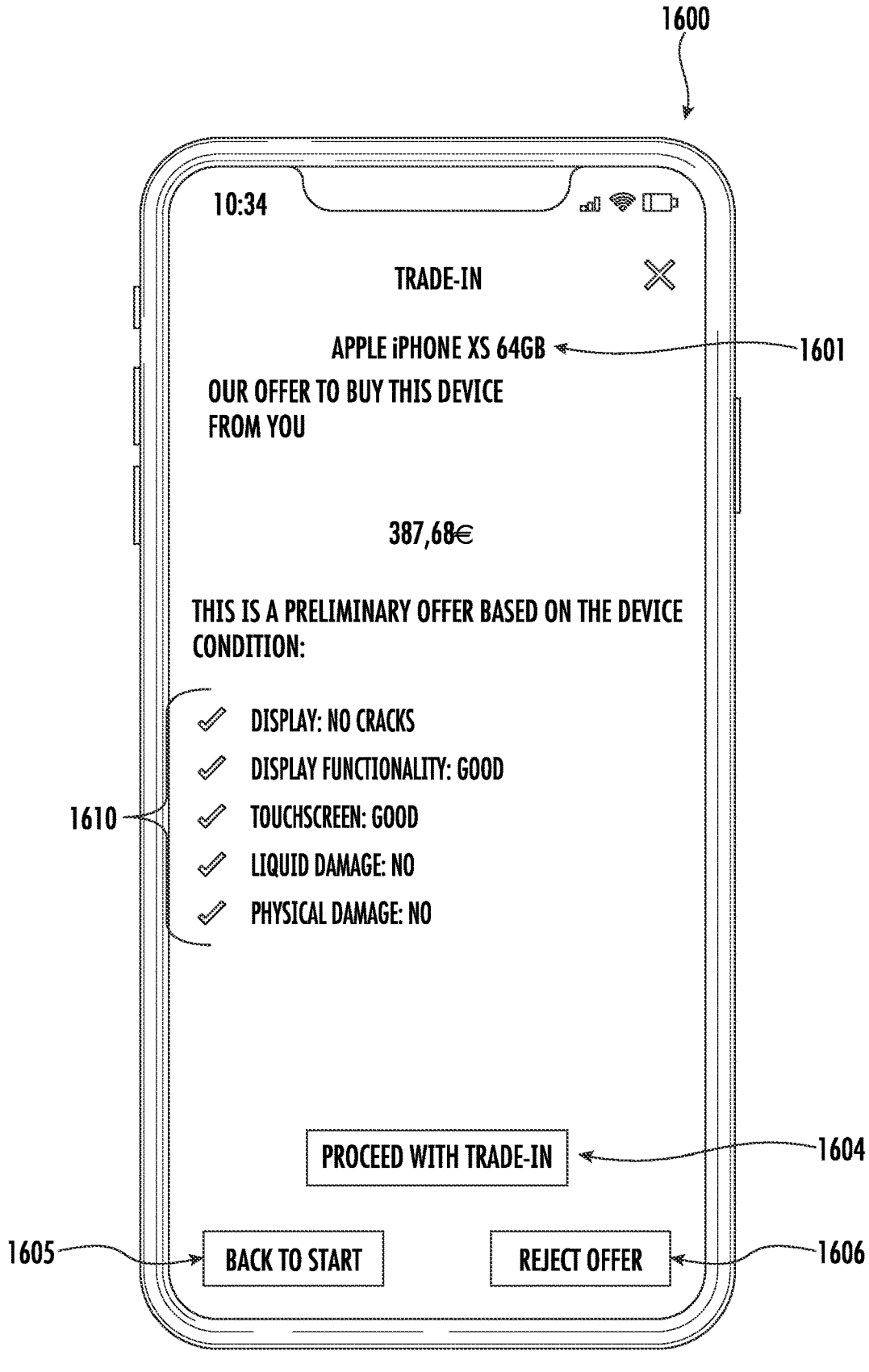
Figure 17:
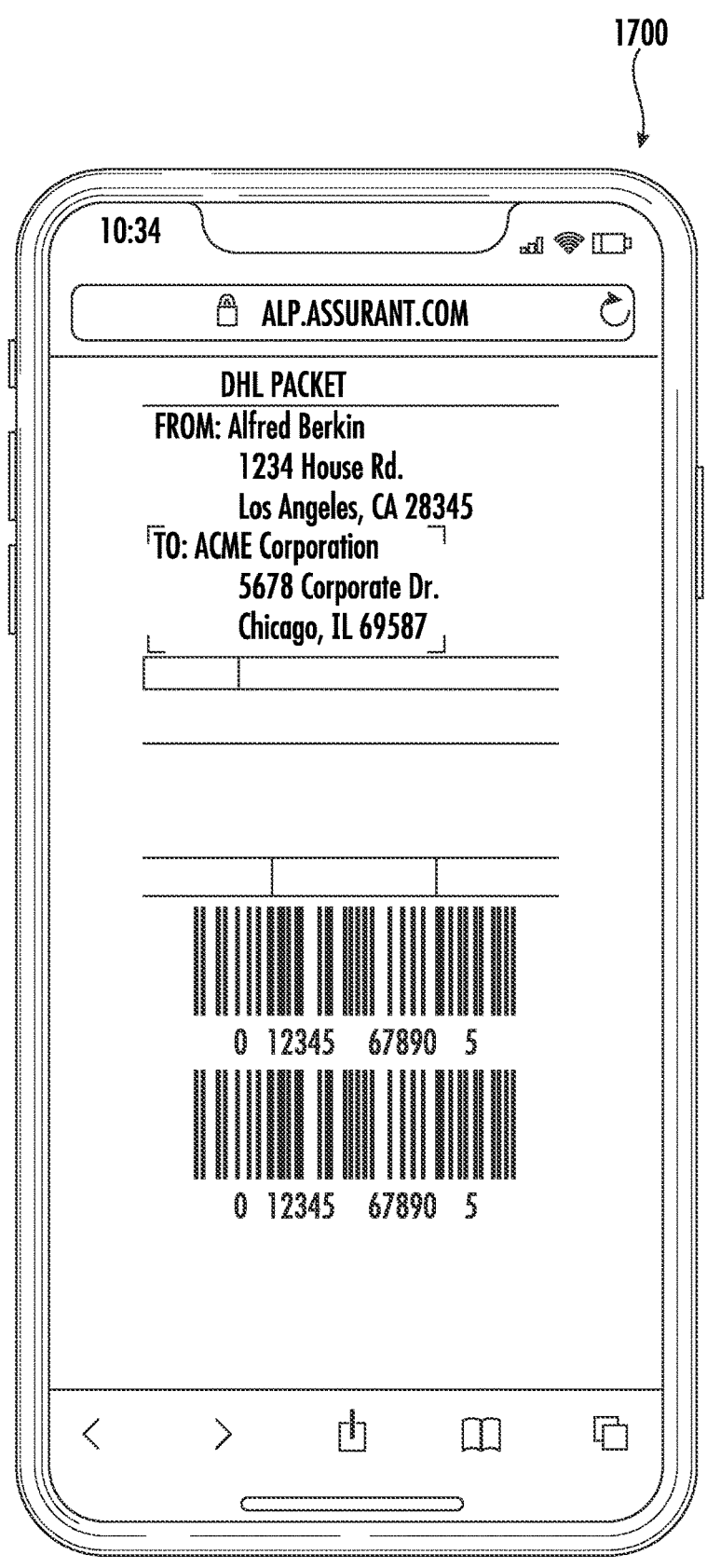
Figures 21, 22, 23:
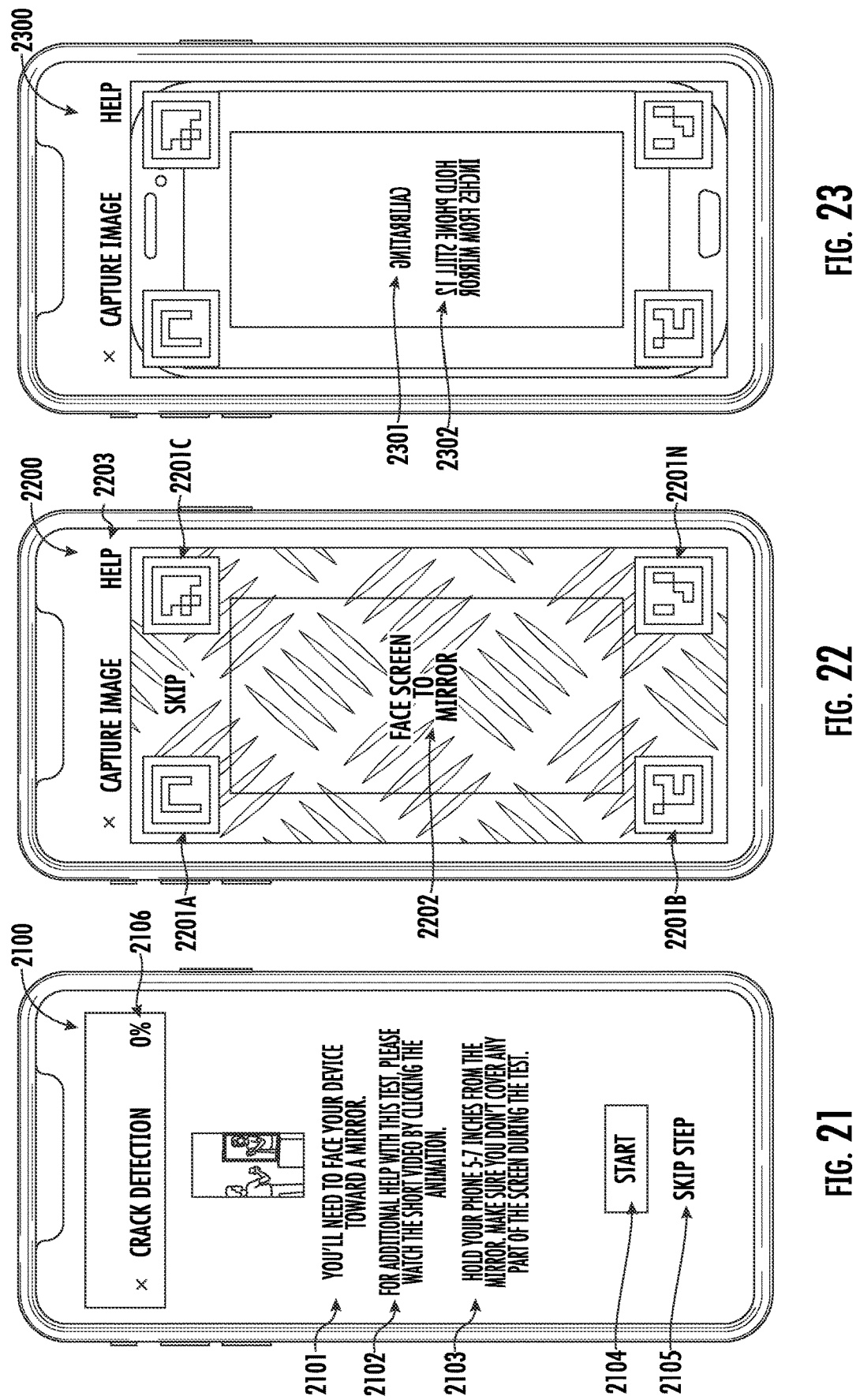
Figures 24, 25, 26:
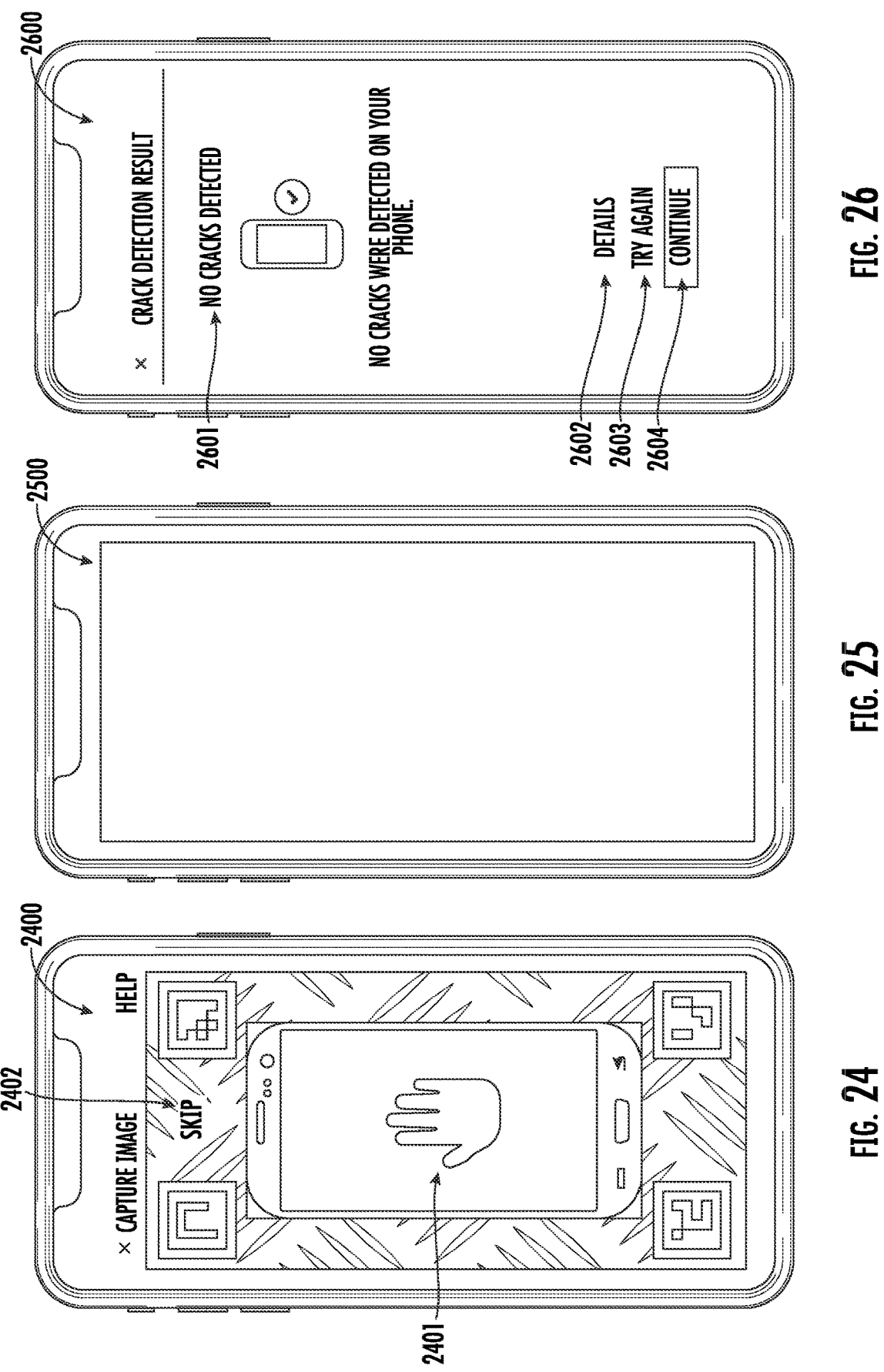
Figures 27, 28, 29:
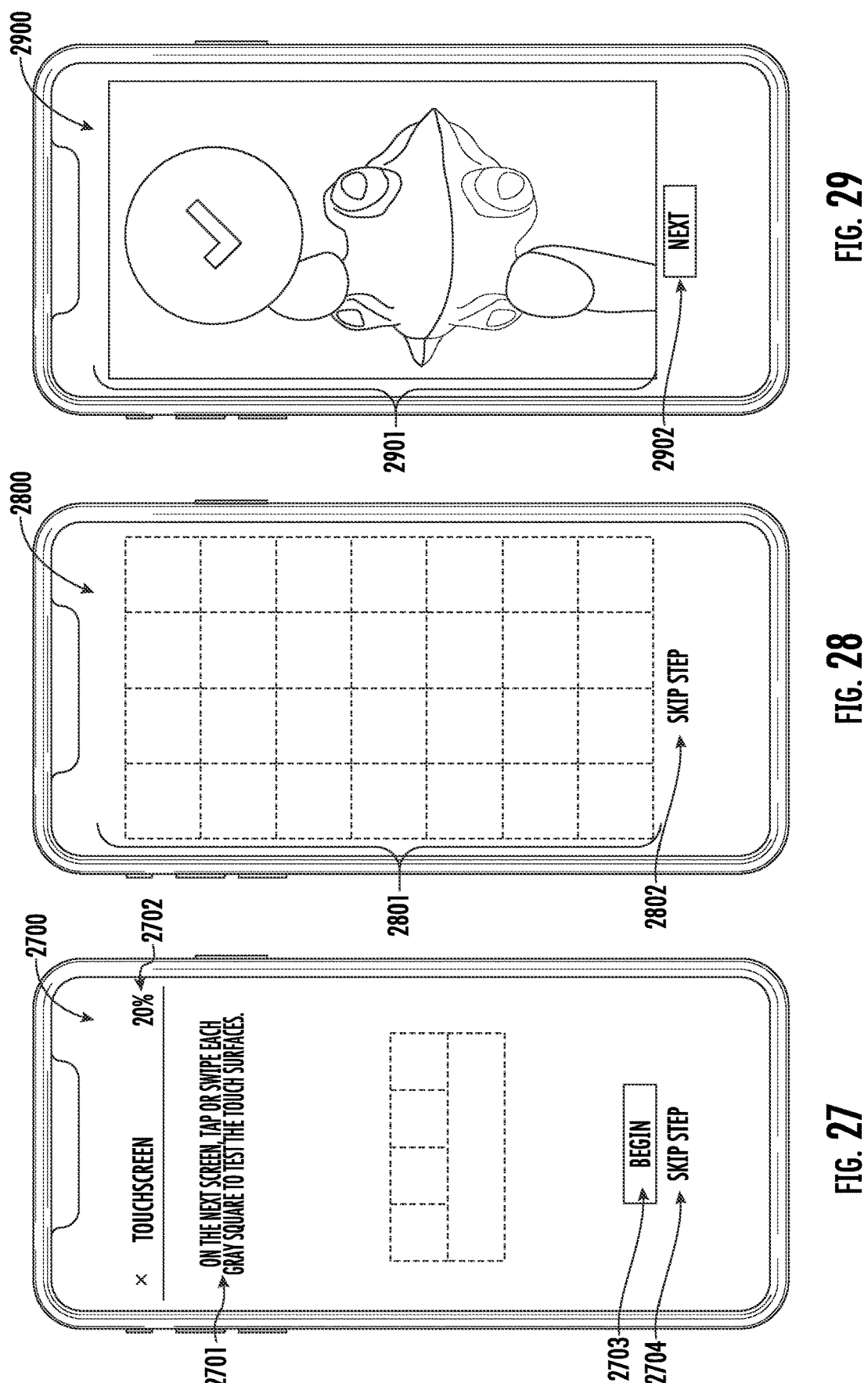
Figures 30, 31, 32:
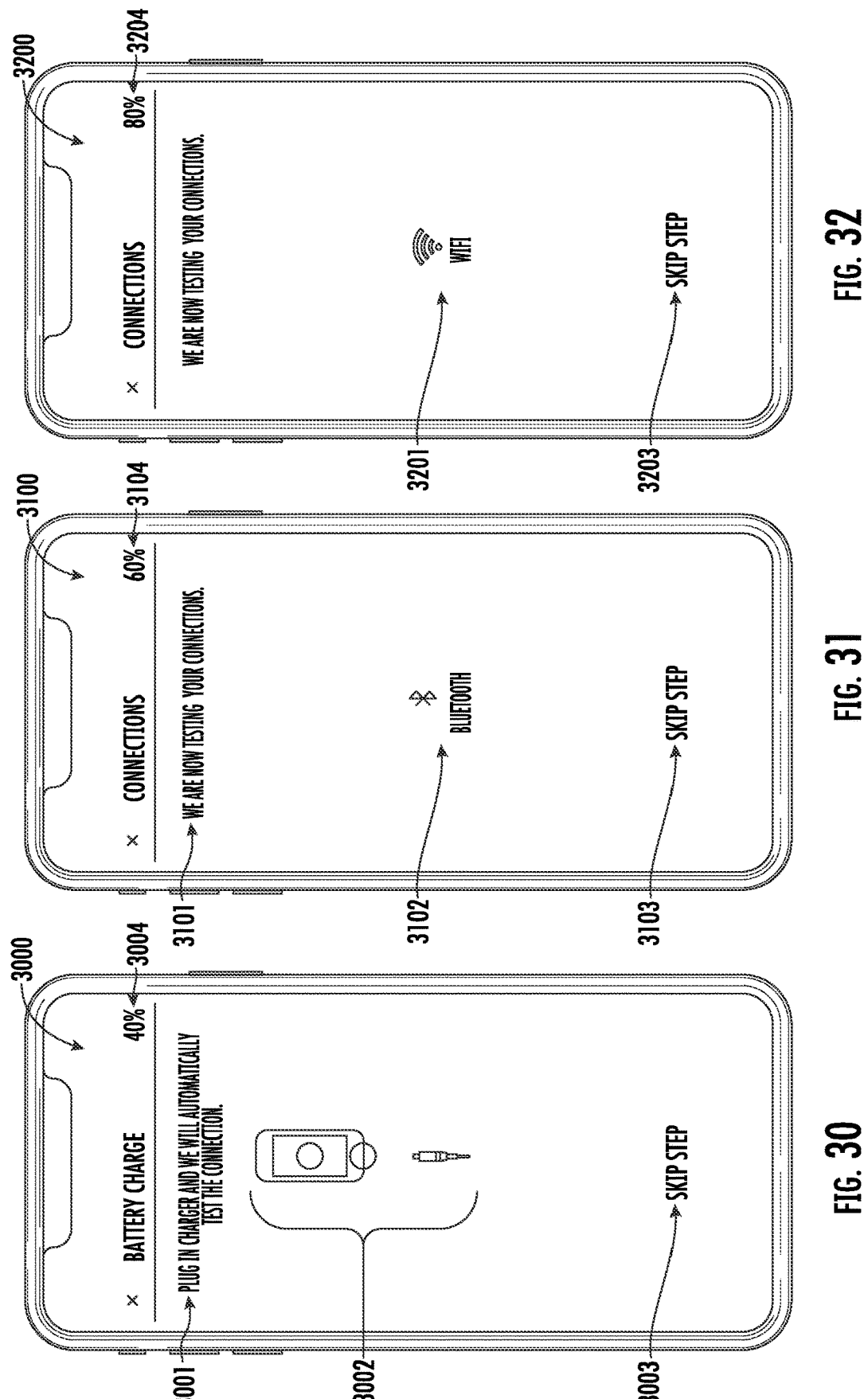
Figures 33, 34, 35:
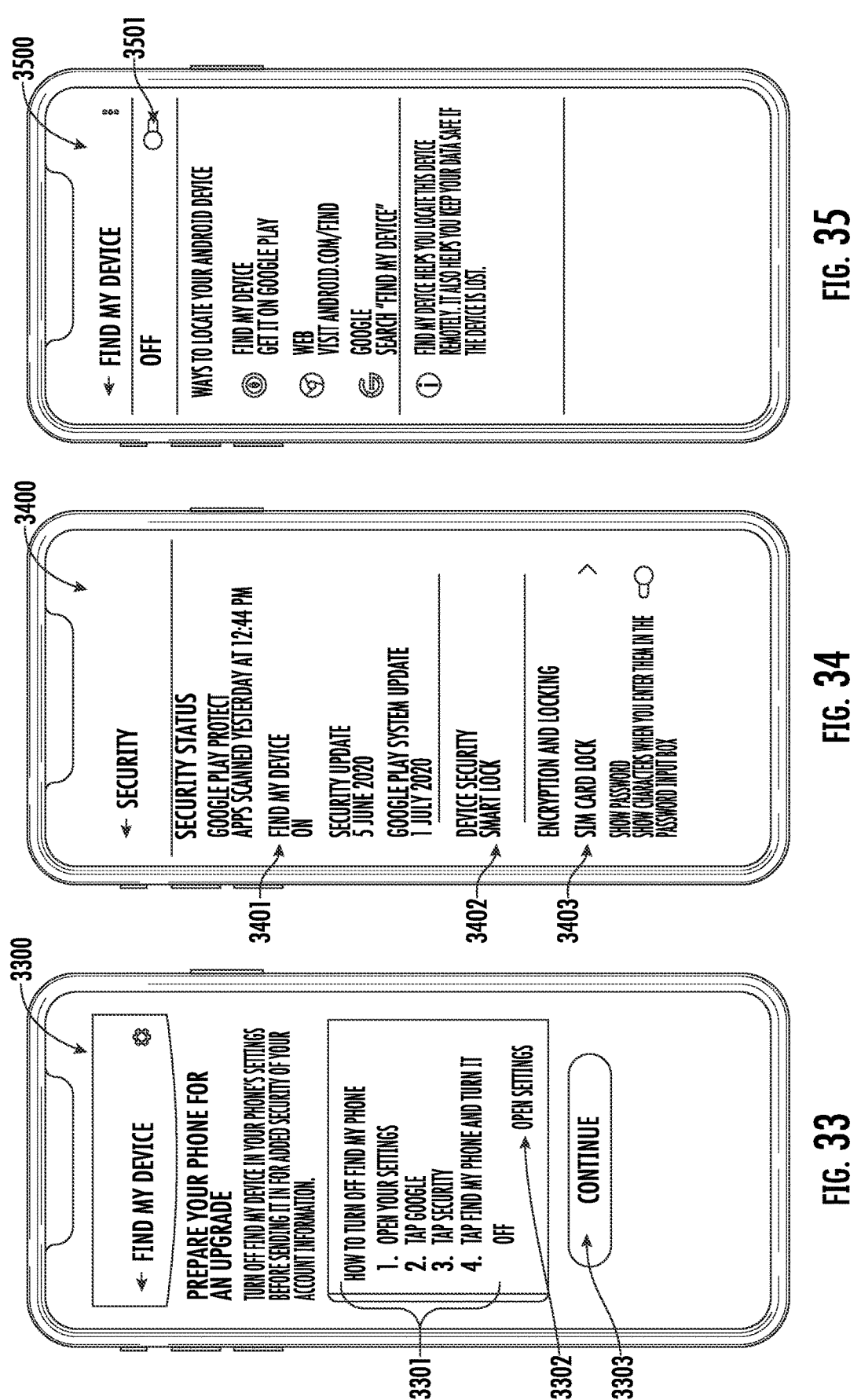
Figures 36, 37, 38:
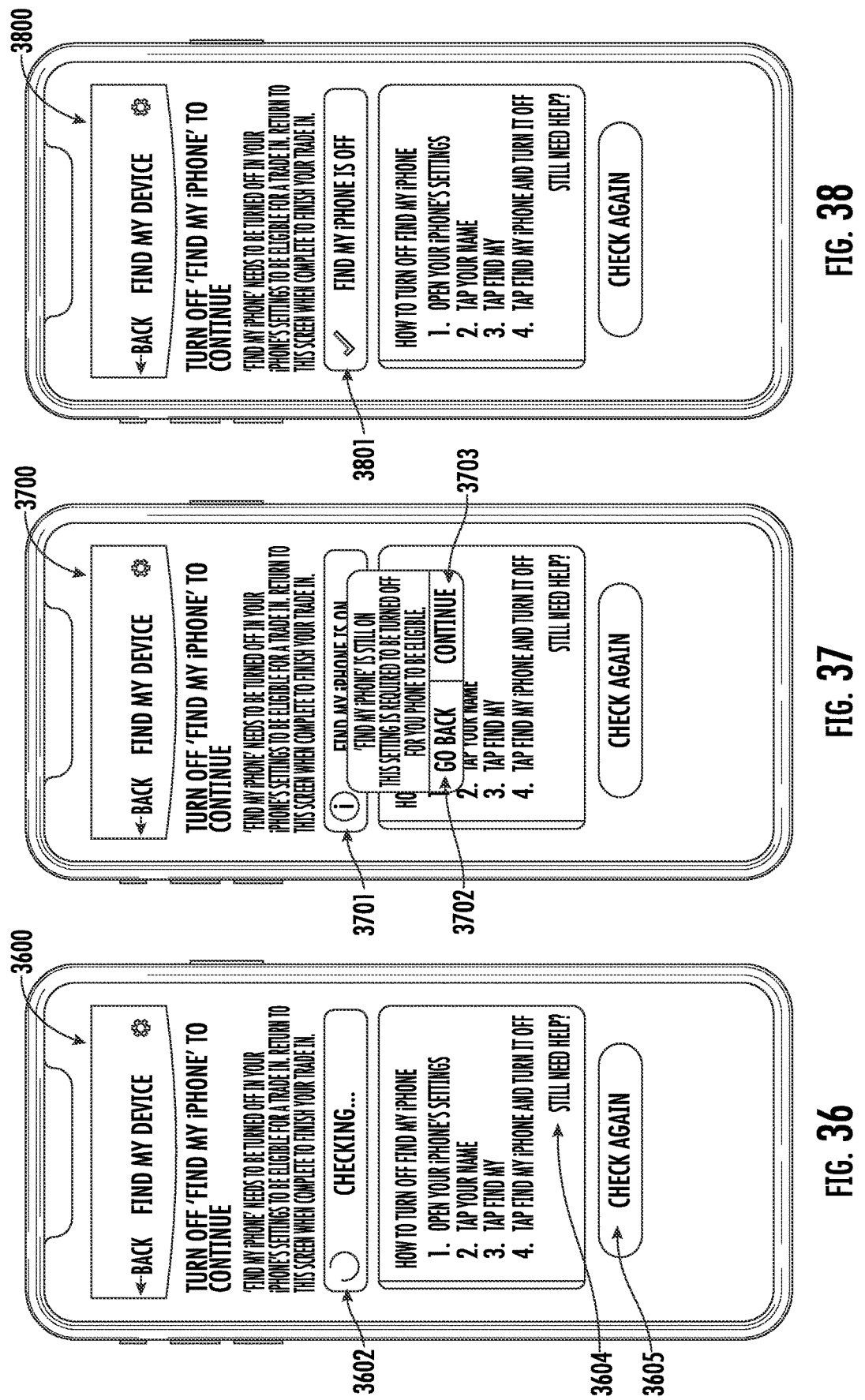
Figures 39, 40:
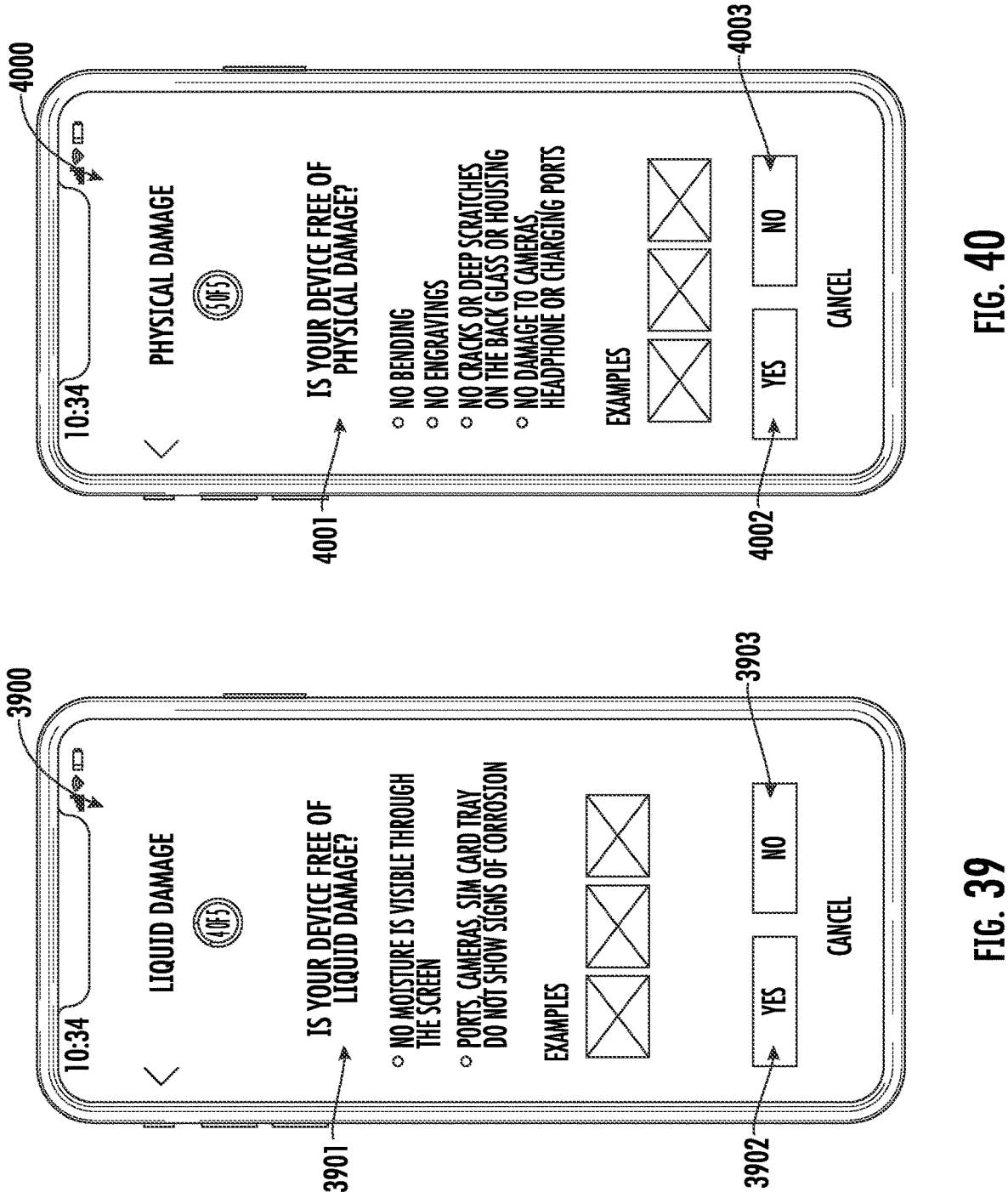
Figure 43:
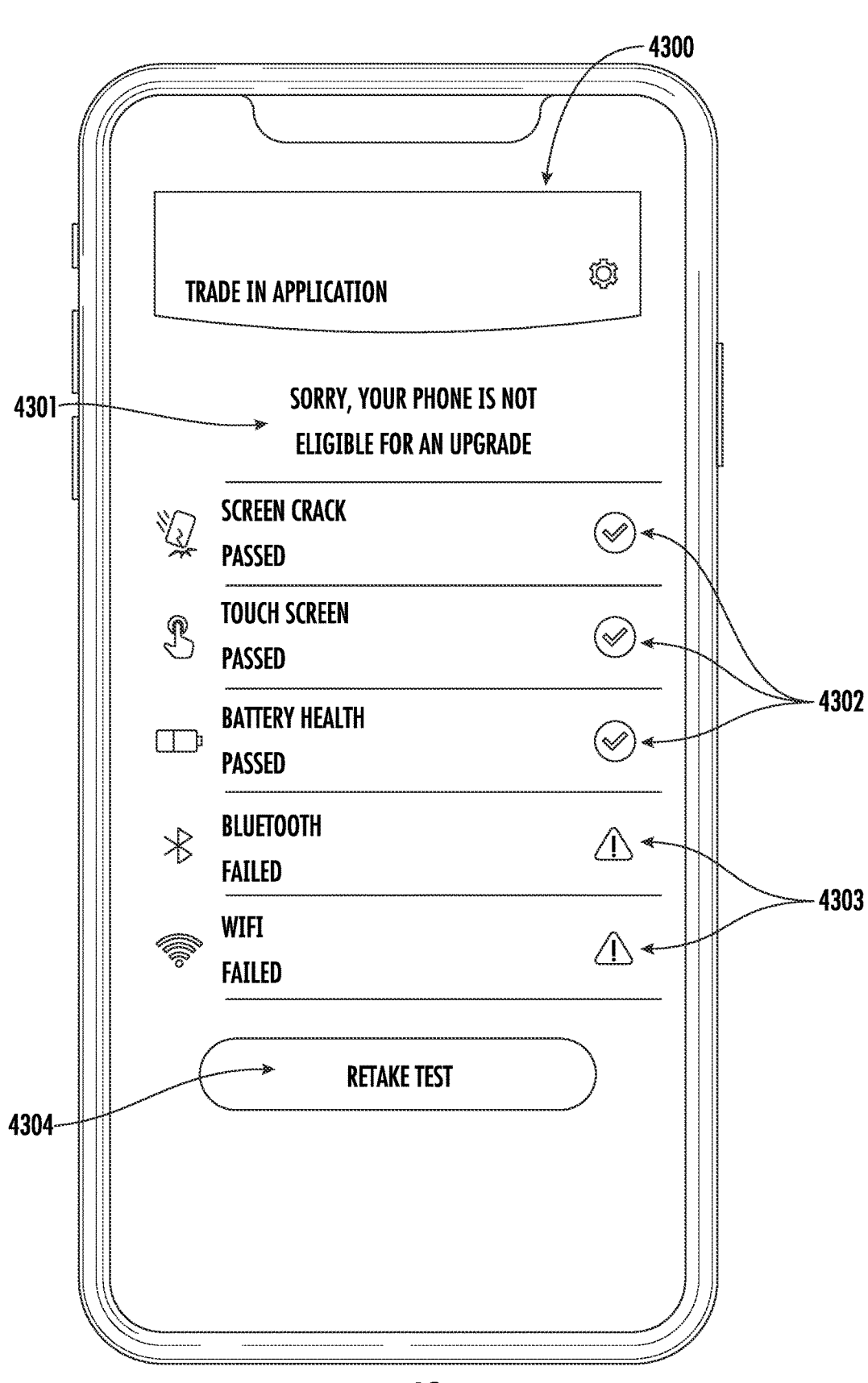

Having thus described the embodiments of the disclosure in general terms, reference now will be made to the accompanying drawings, which are not necessarily drawn to scale, and wherein:

FIG. 1 illustrates a block diagram of an example mobile device remote verification server computing apparatus structured in accordance with at least one example embodiment of the present disclosure;

FIG. 2 illustrates a block diagram of an example client computing device structured in accordance with at least one example embodiment of the present disclosure;

FIG. 3 illustrates an example architecture system for providing remote verification of the condition of a mobile device in accordance with at least one example embodiment of the present disclosure;

FIG. 4 illustrates example operations of an example process for remote verification of the condition of a mobile device in accordance with at least one example embodiment of the present disclosure;

FIG. 5 illustrates example operations of an example process for remote verification of the condition of a mobile device, specifically the performance of an internal diagnostic on the mobile device and/or the determination of a security feature of the mobile device, in accordance with at least one example embodiment of the present disclosure;

FIG. 6 illustrates additional operations for an example process for remote verification of the condition of a mobile device, specifically the performance of an internal diagnostic operation on the mobile device, in accordance with at least one example embodiment of the present disclosure;

FIG. 7 illustrates additional operations for an example process for remote verification of the condition of a mobile device, specifically the performance of a screen crack detection routine on the mobile device, in accordance with at least one example embodiment of the present disclosure;

FIG. 8 illustrates additional operations for an example process for remote verification of the condition of a mobile device, specifically the detection of a security feature of a mobile device, in accordance with at least one example embodiment of the present disclosure;

FIG. 9 illustrates additional operations for an example process for remote verification of the condition of a mobile device, specifically the performance of determining an enabled security feature of a mobile device and configuring the mobile device to disable the security feature, in accordance with at least one example embodiment of the present disclosure;

FIG. 10 illustrates an example mobile device during performance of a screen crack detection, in accordance with at least one example embodiment of the present disclosure;

FIG. 11 illustrates an example mobile device during performance of a screen crack detection, specifically the detection of a crack on a screen of a mobile device, in accordance with at least one example embodiment of the present disclosure;

FIG. 12 illustrates an example mobile device during performance of an internal hardware diagnostic operation on the mobile device, in accordance with at least one example embodiment of the present disclosure;

FIG. 13 illustrates an example mobile device indicating the input of a serial number associated with the mobile device, in accordance with at least one example embodiment of the present disclosure;

FIG. 14 illustrates an example mobile device indicating an input area for a phone number associated with the mobile device, in accordance with at least one example embodiment of the present disclosure;

FIG. 15 illustrates an example mobile device indicating a graphical user interface configured to facilitate disabling the security feature, in accordance with at least one example embodiment of the present disclosure;

FIG. 16 illustrates an example mobile device indicating an acceptable condition of the mobile device based on the remote verification of the condition of the mobile device, specifically a graphical user interface (GUI) configured to show the diagnostic results associated with the mobile device, in accordance with at least one example embodiment of the present disclosure;

FIG. 17 illustrates an example mobile device indicating an acceptable condition of the mobile device based on the remote verification of the condition of the mobile device, specifically shipping information associated with the mobile device, in accordance with at least one example embodiment of the present disclosure;

FIG. 18 illustrates an example mobile device indicating a graphical user interface configured to facilitate the remote verification of the condition of the mobile device, in accordance with at least one example embodiment of the present disclosure;

FIG. 19 illustrates an example mobile device indicating a graphical user interface configured to facilitate the remote verification of the condition of the mobile device, wherein the graphical user interface indicates example permissions for access to the mobile device and its circuitry, in accordance with at least one example embodiment of the present disclosure;

FIG. 20 illustrates an example mobile device indicating options for the input of one or more mobile device diagnostics for user selection of the remote verification of the condition of the mobile device, in accordance with at least one example embodiment of the present disclosure;

FIG. 21 illustrates an example graphical user interface configured to facilitate the screen crack detection routine, wherein instructions of the screen crack detection routine may be shown, in accordance with at least one example embodiment of the present disclosure;

FIG. 22 illustrates an example graphical user interface configured to facilitate the screen crack detection routine, wherein instructions of the screen crack detection routine may include instructions to face the screen of a mobile device toward a mirror, in accordance with at least one example embodiment of the present disclosure;

FIG. 23 illustrates an example screen of a mobile device depicting instructions in reverse for viewing in a mirror in accordance with the screen crack detection routine herein described, in accordance with at least one example embodiment of the present disclosure;

FIG. 24 illustrates an example screen of a mobile device indicating that the mobile device should remain steady while facing the mirror for capture by the front-facing camera of the mobile device, in accordance with at least one example embodiment of the present disclosure;

FIG. 25 illustrates an example screen of a mobile device showing a test pattern for capture by the mobile device camera and for processing to determine if a crack is present, in accordance with at least one example embodiment of the present disclosure;

FIG. 26 illustrates an example graphical user interface configured to facilitate the remote verification process, wherein an indication of a passing screen crack detection routine is shown, in accordance with at least one example embodiment of the present disclosure;

FIG. 27 illustrates an example graphical user interface configured to facilitate a diagnostic comprising a touch screen surface test, in accordance with at least one example embodiment of the present disclosure;

FIG. 28 illustrates an example graphical user interface comprising a test pattern configured to facilitate the input of one or more screen touch inputs associated with surface squares of the screen surface test, in accordance with at least one example embodiment of the present disclosure;

FIG. 29 illustrates an example graphical user interface configured to indicate the passage of the screen surface test, in accordance with at least one example embodiment of the present disclosure;

FIG. 30 illustrates an example graphical user interface configured to facilitate a battery charge connection test, in accordance with at least one example embodiment of the present disclosure;

FIG. 31 illustrates an example graphical user interface configured to facilitate a Bluetooth connection test, in accordance with at least one example embodiment of the present disclosure;

FIG. 32 illustrates an example graphical user interface configured to facilitate a Wi-Fi connection test, in accordance with at least one example embodiment of the present disclosure;

FIG. 33 illustrates an example graphical user interface configured to facilitate the disablement of a security feature of a mobile device, in accordance with at least one example embodiment of the present disclosure;

FIG. 34 illustrates an example graphical user interface configured to facilitate the disablement of a security feature of a mobile device, wherein the security feature is disabled in a settings page associated with the mobile device, in accordance with at least one example embodiment of the present disclosure;

FIG. 35 illustrates an example graphical user interface configured to facilitate the disablement of a security feature of a mobile device, wherein the security feature is disabled, in accordance with at least one example embodiment of the present disclosure;

FIG. 36 illustrates an example graphical user interface configured to facilitate the disablement of a security feature of a mobile device, wherein the graphical user interface comprises instructions to facilitate the disablement of the security feature and the graphical user interface is configured to indicate the remote verification process is checking the status of the security feature, in accordance with at least one example embodiment of the present disclosure;

FIG. 37 illustrates an example graphical user interface configured to facilitate the disablement of a security feature of a mobile device, wherein the graphical user interface is configured to indicate that the security feature is enabled, in accordance with at least one example embodiment of the present disclosure;

FIG. 38 illustrates an example graphical user interface configured to indicate the security feature of the mobile device is disabled, in accordance with at least one example embodiment of the present disclosure;

FIG. 39 illustrates an example graphical user interface configured to facilitate the input of an indication of liquid damage to the mobile device, in accordance with at least one example embodiment of the present disclosure;

FIG. 40 illustrates an example graphical user interface configured to facilitate the input of an indication of physical damage to the mobile device, in accordance with at least one example embodiment of the present disclosure;

FIG. 41 illustrates an example graphical user interface of a mobile device indicating an acceptable condition of the mobile device based on the remote verification of the condition of the mobile device, specifically a graphical user interface configured to show a trade-in value of the mobile device, in accordance with at least one example embodiment of the present disclosure;

FIG. 42 illustrates an example graphical user interface of a mobile device indicating an acceptable condition of the mobile device based on the remote verification of the condition of the mobile device, specifically a graphical user interface configured to show an upgrade of the mobile device, in accordance with at least one example embodiment of the present disclosure; and FIG. 43 illustrates an example graphical user interface of a mobile device indicating an unacceptable condition of the mobile device based on the remote verification of the condition of the mobile device, specifically a graphical user interface configured to show an ineligible upgrade of the mobile device in response to one or more failed diagnostics, in accordance with at least one example embodiment of the present disclosure.

DETAILED DESCRIPTION

Embodiments of the present disclosure will now be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements.

Definitions

As used herein, the term "request" refers to a computer transmission to initiate one or more computer functions. In some embodiments, the request may be a device-to-device transmission (e.g., a message sent from a first computing device to a second computing device) generated at one device and sent (e.g., via a network, wired connection, wireless connection, etc.) to another device. In some embodiments, the request may be a transmission within a single device (e.g., from a first circuitry or routine to a second circuitry or routine). In various example embodiments discussed herein, a request may be sent from a mobile device to verification circuitry external to the mobile device. In various example embodiments discussed herein, a request may be internally sent within a mobile device to carry out various functions of the mobile device. In various example embodiments discussed herein, a request may be transmitted to a mobile device from a third-party computing device with or without verification circuitry. The request may be generated by specialized hardware, firmware, and/or software level processes.

As used herein, the term "verification of the condition of a mobile device" refers to a specialized hardware, firmware, and/or software level process for executing certain diagnostic(s) of a computing device and/or verifying the status of a security feature of the mobile device, such as by detecting whether a security feature is enabled or disabled. In some embodiments, such diagnostics may include, but are not limited to, one or more of a screen crack detection routine or an internal diagnostic. In some embodiments, the verification of the condition of the mobile device may be executed at least in part by the mobile device, and/or in some embodiments, the verification of the condition of the mobile device may be executed at least in part by another computing device. As used herein, the term "condition of a mobile device" refers an electronic data value related to the output of the verification process, including the output of an "acceptable condition of a mobile device" and an "unacceptable condition of a mobile device".

As used herein, the term "acceptable condition" refers to an electronic data value representing a condition of the mobile device for which one or more predefined conditions of acceptability have been met. In some embodiments, the acceptable condition may comprise an output of a diagnostic such that a GUI is configured to show the result of one or more diagnostics. As used herein, the term "unacceptable condition" refers to an electronic data value representing a condition of the mobile device for which one or more predefined conditions of acceptability have not been met. In some embodiments, the unacceptable condition may comprise the opposite and/or inverse of the acceptable condition and may indicate that the condition of the mobile device fails one or more conditions of the acceptable condition.

As used herein, the term "security data object" refers to an electronic data value associated with a security feature of a computing device (e.g., mobile device). In some embodiments, the security data object may include, but is not limited to, an indication of whether the security feature is enabled or disabled. In some embodiments, the security data object may be housed locally on the computing device, and/or in some embodiments, the security data object may be housed on another computing device.

As used herein, the term "security feature" refers to at least one specialized hardware, firmware, and/or software level security function associated with a computing device. In some embodiments, a security feature may include, but is not limited to, a specialized hardware, firmware, and/or software level process for preventing unauthorized access to some or all functionality of a mobile device; providing access to the location of the mobile device (in real-time or at some time previous to the present time); preventing wiping or resetting the memory of the mobile device; configuring the mobile device with password protection, facial recognition, or thumbprint recognition; configuring privacy settings of the mobile device to allow or disallow access of certain data transmitted to or from the mobile device across a communications network to certain recipients; and other security data objects currently understood in the art for such electronic devices. In some embodiments, the security feature may include OEM, carrier, or other provider supplied security features. In some embodiments, the security feature may include the Find My® iPhone® feature associated with Apple® iPhones®. In some embodiments, the security feature may include Find my Device, Google Security, or a similar security feature for Android®, Windows®, or other known devices and operating systems as would be appreciated by a person of ordinary skill in the art in light of the present disclosure. In some embodiments, the security feature may include any security feature associated with a mobile device, including, but not limited to, security features that are capable of rendering the mobile device unusable (i.e., "brick" the mobile device) upon the occurrence of one or more trigger conditions and/or preventing the ownership, operation, and/or access or other use or enjoyment of the mobile device by any person (e.g., persons other than the user authorized by the security feature or requiring password input prior to access). The security feature(s) and their accompanying specialized hardware, firmware, and/or software may be located locally on the mobile device and/or remotely on one or more other computing devices, wherein the mobile device may be in communication with such other devices, for example, over a communications network.

As used herein, the term "crack detection routine" refers to at least one specialized hardware, firmware, and/or software diagnostic process to determine external damage to a mobile device including, but not limited to, screen cracks, camera cracks, and any other surface damage to the mobile device. In some embodiments, the crack detection routine may comprise the process of capturing an image of the mobile device's screen (e.g., taking a photo with a front-facing camera oriented toward a reflective surface, such as a mirror), capturing an image of the back of the mobile device (e.g., taking a photo with a camera housed on the back of the mobile device when the camera is oriented toward the reflective surface), transmitting the one or more images to a processor (either the local processor of the mobile device or an external processor of another device over a communications network), the processor analyzing and/or agent associated with an external device analyzing the one or more images and returning an indication of an invalid indication, an unacceptable condition, or an acceptable condition based on the presence of cracks within the images.

As used herein, the term "internal diagnostic" refers to at least one specialized hardware, firmware, and/or software diagnostic process to determine the operational status and/or performance of any portion of a computing device or any non-peak conditions of the computing device (e.g., slow run times of internal software, applications, etc.). In some embodiments, an output of the internal diagnostic may provide suggestions for a user of a mobile device to improve mobile device performance. In some embodiments, at least a portion of the internal diagnostic may be housed and executed locally on the mobile device and/or the data generated from the internal diagnostic may be transmitted to an external device, such as a remote verification server, for processing.

As used herein, the term "authentication credential" refers to any authentication-related process, data field, and/or input, including data entry and/or stored data value, that may be associated with a user account and/or device and may be configured to permit access to certain features of a computing device.

As used herein, the term "identification data object" refers to one or more items of electronic data capable of being used to identify a computing device as associated with a specific user of the computing device (e.g., a unique identifier). For example, an identification data object may comprise text string(s), numerical character(s), alphabetical character(s), alphanumeric code(s), ASCII character(s), a pointer, an IP address, a MAC address, a memory address, other unique identifier, or a combination thereof.

As used herein, the term "provider system" refers to one or more servers, a computing system, or other computing system associated with a provider. The "provider system" may be in communication with the mobile device to enable the provider to offer the security feature to the mobile device via a communications network. In some embodiments, the security feature of the mobile device may be maintained by the provider system external from the mobile device.

Overview

In various implementations, the condition of one or more mobile devices, including determining an acceptable condition of one or more mobile devices, is determined locally (on a mobile device) or remotely (via a remote verification server). In some embodiments, an acceptable condition may confirm the functionality of the device. In some embodiments, an acceptable condition may determine that the mobile device is serviceable and/or operable by third parties (e.g., that a service center can perform further diagnostics or other functions on the mobile device without bricking the phone or disabling additional security features). In some embodiments, an acceptable condition may allow a user or owner of the mobile device to accept a trade-in offer (e.g., begin a transaction) for the mobile device. In various embodiments, the acceptable condition of the mobile device may be rendered based on one or more diagnostics performed on the mobile device (including at least one of an internal diagnostic and/or a screen crack detection routine) and/or a remote verification that one or more security features have been disabled on the mobile device.

In some embodiments, mobile devices may be equipped with security features that prevent tampering, conversion, or use of the mobile device by unauthorized parties. However, these security features in many instances lack the ability to differentiate between unauthorized users and authorized users who have not been properly onboarded into the mobile device's software, particularly if an authorized user is unavailable to grant the requisite permissions (e.g., in a situation where the mobile device has been sold, traded-in, delivered to a service center, or otherwise properly given to a third party for use).

In some implementations, an acceptable condition may only be rendered if the one or more security features of the mobile device have been determined to be disabled. If the remote verification server and/or remote verification circuitry determine that one or more security features have not been disabled, then the system described herein may configure a GUI of the mobile device to disable the one or more security features.

In some implementations, the method and system described herein may be used to ensure functional continuity of mobile devices by diagnostically testing security-feature-enabled mobile devices and disabling the security features before authorized use by third parties, which may otherwise lead to the mobile devices being "bricked" or un-usable upon reaching the third parties (e.g., the warehouse of the trade-in organization acting as an intermediary between sellers of the mobile devices and buyers of the mobile devices or the end-user/buyer of the mobile device).

In some implementations, if a determination is made that one or more security features are enabled on the mobile device, then an invalid indication may cause the GUI to direct the user to disable the security feature (e.g., via rendering an automatic button/input configured to trigger deactivation and/or by rendering instructions to the user). In some embodiments, the invalid indication may be generated by a determination (e.g., by processors of one or more apparatuses 100, 200) that a security feature of the mobile device is enabled. The invalid indication may be maintained indefinitely to allow the user to rectify the indicated issue and/or abandon the process. In some embodiments, a user of the mobile device may disable the security feature of the mobile device in order for an acceptable condition of the mobile device to be generated and the invalid indication removed. In some embodiments, the invalid indication may be removed upon disabling the security feature and the acceptable condition may be triggered by the detection of removal of the invalid indication and/or one or more additional triggers (e.g., detecting completion of an internal diagnostic, such as a screen crack detection and/or internal hardware diagnostic). The invalid indication may allow time for the detected issue(s) of the mobile device to be disabled (e.g., the disabling of the security feature) or otherwise fixed before an unacceptable condition (e.g., if the issue is not satisfactorily resolved in time or the device is otherwise not in compliance with the requirements of the acceptable condition) or acceptable condition (e.g., if the device is in compliance with the requirements of the acceptable condition) is returned. In some embodiments, the invalid indication may indicate that the mobile device is not configured for use by third parties.

In some implementations, the user may have a limited or unlimited amount of time to disable the security feature to return an acceptable condition. In some embodiments, the remote verification of the condition of the mobile device process may be paused once a security feature has been detected as enabled in order to allow the user to disable the security feature before the generation of an acceptable condition is returned (e.g., either directly after the security feature has been detected as disabled or after one or more diagnostics are run on the mobile device), and the verification process may remain paused until the condition is met or the process is otherwise terminated (e.g., by uninstalling the application, force closing the application, or the like). In some implementations, if the security feature is still enabled after the security feature has been disabled to generate an acceptable condition, then various embodiments may be configured to generate an unacceptable condition. For instance, if the mobile device security feature is not disabled and/or any other detected issue with the mobile device is not corrected, then an unacceptable condition may be returned and the GUI of the mobile device may be configured to terminate the remote verification process, such that the user may either be precluded from completing the process or the process must be restarted. In some embodiments, the remote verification of the condition of the mobile device process may be run by on a mobile device multiple times (e.g., an infinite number of times). In some embodiments, the remote verification of the condition of the mobile device may allow a mobile device to be processed by the remote verification of the condition of the mobile device process until an acceptable condition is returned. In some embodiments, an external device (e.g., the provider system 305 and/or the remote verification system 307) may limit the number of times a mobile device may be processed by the remote verification of the condition of the mobile device process. In some embodiments, the remote verification process may include a carrier profile with parameters established by one or more carriers using the remote verification process (e.g., a cellular phone carrier), which may include optional restrictions on time out and retry count for the remote verification process that may be selected by the participating carrier.

In some embodiments, the remote verification of the condition of the mobile device process may configure the GUI of the mobile device to indicate the reason for the unacceptable condition (e.g., as shown with respect to FIG. 43). For example, the remote verification of the condition of the mobile device process may configure the GUI of the mobile device to indicate to the user a result of the diagnostic (e.g., internal diagnostic and/or screen crack detection routine). In such embodiments, the configured GUI may indicate the specific failure of the mobile device of the diagnostic and indicate instructions to the user via the configured GUI to fix the diagnostic causing the unacceptable condition and return an acceptable condition. In some embodiments, the user may fix a battery life of the mobile device, a screen of the mobile device, a camera of the mobile device, a microphone of the mobile device, and/or another such cause of the one or more failure outputs of the diagnostics run on the mobile device. In some embodiments, the failure of the one or more diagnostics (e.g., internal diagnostic and/or screen crack detection routine) may nonetheless cause the GUI of the mobile device to be configured to return an acceptable condition if the failure is not of a required component of the acceptable condition. For example, in some embodiments, the failure of the one or more diagnostics of the remote verification of the condition of the mobile device process on the mobile device may cause a lower trade-in value, but an acceptable condition of the remote verification of the condition of the mobile device process.

In some embodiments, an unacceptable condition may trigger a failsafe to prevent the device from being sold, shipped to, used, or accepted by third parties (e.g., any transaction involving the mobile device may fail). In some implementations, if the security feature was disabled and the GUI was configured to show an acceptable condition, then the user may have a predetermined threshold time to accept an offer associated with the third party (e.g., a service drop-off, shipment, or trade-in), and if the offer is not accepted within a predetermined threshold time, the acceptable condition may be terminated (e.g., by a processor associated with one or more apparatuses 100, 200) and the status of the device may be reverted to an unacceptable condition and the GUI may be configured to display an unacceptable condition due to inaction by the user. In some embodiments, a user may be permitted to redo the diagnostics (e.g., internal diagnostics and/or screen crack detection). In some embodiments, at least a portion of the internal diagnostics may be redone. In some embodiments, the internal diagnostics may not stop the subsequent downstream processes (e.g., lowering the value of the device or informing the service needed to the device rather than prohibiting the process altogether), which may not require redoing the internal diagnostics upon failure or other negative results.

Example System Architecture

The present disclosure includes various embodiments for a system architecture associated with a remote verification of a condition of a mobile device. FIG. 1 illustrates an example apparatus for verifying the condition of a mobile device (e.g., a server configured to direct the verification), including a processor 101, memory 103, input/output circuitry 104, communications circuitry 105, and remote verification circuitry 102. FIG. 2 illustrates an example apparatus for verifying the condition of a mobile device, including processor 201, memory 203, input/output circuitry 204, communications circuitry 205, and diagnostic circuitry 202. The apparatuses 100 and 200, of FIGS. 1-2, may be configured, using one or more of the circuitry components 101-105 and 201-205, embodied in software, hardware, or a combination of software and hardware, to execute the operations as described below.

Although some components are described at least in part with respect to functional features provided by such components, it should be understood that particular implementations necessarily include the use of particular hardware. It should also be understood that certain of the components described herein may include similar or common hardware. For example, two described components may both leverage use of the same processor, network interface, storage medium, or the like to perform their associated functions, such that duplicate hardware is not required for each circuitry.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

For example, the use of the term "circuitry" as used herein with respect to components of the apparatuses 100 and 200 should therefore be understood to include particular hardware and associated software configured to perform the functions associated with the particular components as described herein. The circuitry should be understood broadly to include hardware and may include processing circuitry, storage media (e.g., non-transitory memory comprising at least some computer program instructions, which may define at least some software), network interfaces (e.g., network 301), input/output devices, and the like. In some embodiments, the other elements of apparatus 100 and 200 may provide or supplement the functionality of the particular component. For example, the processors 101 and 201 may provide processing functionality to the other components, the memories 103 and 203 may provide storage functionality to the other components, the communications circuitry 105 and 205 may provide network interface functionality to the other components, and the like.

In some embodiments, the processors 101 and 201 (and/or co-processors or any other processing circuitry assisting or otherwise associated with the processor or apparatuses) may be in communication with the memories 103 and 203 via a bus for passing information among components of the apparatus. The memories 103 and 203 may be non-transitory and may include, for example, one or more volatile and/or non-volatile memories. For example, the memory may be an electronic storage device (e.g., a computer readable storage medium). The memories 103 and 203 may be configured to store information, data, content, software, applications, instructions, or the like, for enabling the apparatuses 100 and 200 to carry out various functions in accordance with example embodiments of the present disclosure.

The processors 101 and 201 may be embodied in any one of a myriad of ways and may, for example, include one or more processing devices configured to perform independently. Additionally, or alternatively, the processors 101 and 201 may include one or more processors configured in tandem via a bus to enable independent execution of instructions, pipelining, and/or multithreading. The use of the terms "processor," and "processing circuitry" may be understood to include, but not be limited to, a single-core processor, a multi-core processor, multiple processors internal to the apparatus, and/or remote or "cloud" processors.

In an example embodiment, the processors 101 and 201 may be configured to execute computer-coded instructions stored in the memory 103 and 203 or otherwise accessible to the processor. Alternatively, or additionally, the processors 101 and 201 may be configured to execute hard-coded functionality. As such, whether configured by hardware or software methods, or by a combination thereof, the processors 101 and 201 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatuses 100 and 200 may include input/output circuitries 104 and 204, embodied in hardware, software, firmware, or a combination thereof, that may, in turn, be in communication with processors 101 and 201 to provide output to the user and, in some embodiments, to receive an indication of a user input. The input/output circuitries 104 and 204 may comprise a user interface (e.g., a GUI and/or various other tactile, visual, auditory, or other interfaces for allowing a user to interact with and/or receive information from the apparatus) and may include a display (e.g., for rendering one or more user interfaces). The user interfaces comprise a web user interface, a mobile application interface, a desktop application interface, or the like. In some embodiments, the user interface may be operated on a linked or networked client device (e.g., a mobile device), a kiosk, or the like. In some embodiments, the input/output circuitries 104 and 204 may include software configured to enable the intake and/or output of signals and other information to/from a user. In some embodiments, the input/output circuitries 104 and 204 may also include hardware, such as a keyboard, a mouse, a joystick, a display, a touch screen, touch areas, soft keys, cameras, a microphone, a speaker, or other input/output mechanisms. The processors 101 and 201 may be configured to control one or more functions of one or more user interface elements through computer program instructions (e.g., software and/or firmware) stored on a memory accessible to the processor (e.g., memories 103 and 203, and/or the like).

Additionally, or alternatively, in some embodiments, the apparatuses 100 and 200 include communications circuitries 105 and 205. The communications circuitries 105 and 205 may be any means such as a device or circuitry embodied in either hardware or a combination of hardware and software that is configured to receive and/or transmit data from/to a network and/or any other device, or circuitry in communication with the apparatuses 100 and 200. In this regard, the communications circuitries 105 and 205 may include, for example, a network interface for enabling communications with a wired or wireless communications network (e.g. Bluetooth, WLAN, LAN, cellular, fiber, or the like). For example, the communications circuitries 105 and 205 may include one or more network interface cards, antennae, buses, switches, routers, modems and supporting hardware and/or software, or any other device suitable for enabling communications via a network. Additionally, or alternatively, the communications circuitries 105 and 205 may include the circuitry for interacting with the antenna(s) to cause transmission of signals via the antenna(s) or to handle receipt of signals received via the antenna(s).

Memories 103 and 203 may be any suitable local or networked storage device(s) configured to store some or all of the information described herein. In addition to the various software components described herein, memories 103 and 203 may be configured to store, for example, data sets, diagnostic indicators (e.g., output of the internal diagnostic run on the mobile device), screen crack detection results (e.g., output of the screen crack detection routine), and security feature results (e.g., security data objects indicating the enablement or disablement of a security feature associated with a mobile device 310). As such, memories 103 may include, for example, one or more database systems, backend data servers, network databases, cloud storage devices, etc. To avoid unnecessarily overcomplicating the disclosure, memories 103 and 203 is shown and described herein as a single memory system; however, one of ordinary skill in the art will appreciate in light of the present disclosure that any number of memories in any number of connections, arrays, or devices may be used.

In some embodiments, the apparatus 100 may include the remote verification circuitry 102. In some embodiments, the remote verification circuitry 102 is embodied in any of software, hardware, firmware, and/or combination thereof. In this regard, the remote verification circuitry 102 comprise software, hardware, firmware, and/or combination thereof specifically configured for facilitating remote verification of the condition of a mobile device (e.g., apparatus 200) . . . . In some embodiments, the enrollment in a remote verification program may comprise a user downloading an application associated with the remote verification program either locally on the mobile device or externally on a computing device associated with the mobile device (e.g., a computing device with remote access to the mobile device including a wired or wireless connection). In some embodiments, the enrollment in a remote verification program may comprise a user accessing an external computing system (e.g., apparatus 100) via a web browser or other remote communication software on the apparatus 200 or via another computing system (e.g., another computing device associated with the user) to enroll without installing new software on the apparatus 200 (e.g., by accessing existing functionalities associated with the apparatuses 100, 200) or to cause the apparatus 200 to download an application associated with the remote verification program (e.g., via deep linking). In some embodiments, the unenrollment from the remote verification program may comprise deleting the remote verification program locally on the mobile device (e.g., deleting the app).

In some embodiments, the remote verification of the condition of the mobile device process may be started by a user selecting an input on a GUI configured to show a request to perform a remote verification of the condition of the mobile device, such as that shown in FIG. 18 as configured GUI 1800. For example, the GUI may be configured to request input by a user to start (e.g., by way of a "continue" button, 1803) the remote verification of the condition of the mobile device process. In some embodiments, the configured GUI 1800 may indicate how the user may perform one or more diagnostics and may include instructions and/or a roadmap for the process, such as the screen crack detection routine (e.g., at 1801, the configured GUI may indicate to a user that the user will need a mirror to perform the screen crack detection routine). In some embodiments, the configured GUI 1800 may indicate the predetermined threshold time for which a user may act after receiving an indication of an acceptable condition from the remote verification of the condition of the mobile device process, and the GUI 1800 may otherwise provide any information needed prior to starting the verification process. For example, and as shown at 1802, a user may have 24 hours to take the mobile device to a specific location (e.g., a store or a location for the mobile device to be shipped) before an unacceptable condition is returned for inaction by the user.

In some embodiments, the remote verification of the condition of the mobile device process may comprise displaying and facilitating authorization of one or more enhanced permissions to be accepted by the user of the mobile device before one or more diagnostics are started on the mobile device. For example, the remote verification of the condition of the mobile device process may require the mobile device to be connected to at least one of Wi-Fi, Bluetooth, internet, and/or long term evolution (LTE) which may be shown as a configured GUI similar to or identical to the GUI of FIG. 19, such as the GUI 1900 comprising the indicator 1901. In some embodiments, the remote verification of the condition of the mobile device process may comprise one or more permissions to be accepted by the user before one or more diagnostics are started on the mobile device, such as permissions to access at least one of Bluetooth, the mobile device's camera, and/or Wi-Fi, such as that shown at 1902 of FIG. 19. The enhanced permissions may be given by selecting a button (e.g., button 1903) on the GUI 1900 which may use the mobile device OS permissions function to render subsequent interface menus for granting the requested permissions.

In some embodiments, the remote verification of the condition of the mobile device process may be started by a user inputting an identification data object, such as an IMEI number or a phone number associated with the mobile device whose condition is to be verified into the GUI. In some embodiments, the identification data object may be transmitted over a network from either locally on the mobile device 310 to the provider system 305 or from the remote verification system 307 to the provider system 305. In some embodiments, the remote verification system 307 and/or the provider system 305 may match the identification data object input by the user of the mobile device to an identification data object stored in the either a storage subsystem of the provider system 305 and/or a storage subsystem of the remote verification system 307 which is linked to the mobile device. In some embodiments, a new identification data object may be created based on the identification data object input by the user (e.g., in an instance in which a device has no existing data). In some embodiments, the identification data object may be user agnostic and may only be stored in association with the device (e.g., the user may be irrelevant if the device is verified). In some embodiments, the identification data object may be manually entered by a user (e.g., by image capture, typing into a blank, or the like) and a second identification data object may be transmitted from the mobile device from memory (e.g., a coded IMEI from the mobile device software). The two identification data objects may be compared to verify that the user is submitting a verification request for the same device in their possession and to confirm that the request is authentic, which may provide authentication without requiring verification of the identity of the user or a preexisting account or data set stored at the verification system 307.

In some embodiments, the stored identification data object may be stored within a policy linked to at least one of the user and/or the mobile device, itself (e.g., a policy of a warranty, a policy of a carrier plan, etc.), which may be used for offering one or more services associated with the verification, such as a warranty repair. In some embodiments, if the identification data object input by the user does not match the stored identification data object stored and associated with the mobile device in the provider system and/or the remote verification system, then the remote verification of the condition of the mobile device process may halt and exit the remote verification of the condition of the mobile device process. In some embodiments, identification data object input by the user does not match the stored identification data object stored and associated with the mobile device in the provider system and/or the remote verification system, then the remote verification of the condition of the mobile device process may pause and configure the GUI of the mobile device to request a new input by the user of the correct identification data object. In some embodiments, the remote verification of the condition of the mobile device process may allow a user unlimited entries of the identification data object before continuing the remote verification of the condition of the mobile device process (e.g., processing the mobile device using one or more diagnostics and/or determining whether the security feature is enabled or disabled, etc.). In some embodiments, the remote verification of the condition of the mobile device process may limit the user to a specific number of entries of the identification data object before exiting the remote verification process. In some embodiments, the remote verification circuitry 102 may be embodied in any means for enabling initiation of one or more remote verification requests to perform a remote verification of a condition of the mobile device. In some embodiments, the remote verification circuitry 102 may be configured to verify the status of a security feature on the mobile device. In some embodiments, additionally or alternatively, the remote verification circuitry 102 is configured to cause termination of a security feature on the mobile device as a request to perform a remote verification condition of the mobile device initiated and/or processed. In some such embodiments, for example, the remote verification circuitry 102 may be configured to perform one or more diagnostics on the mobile device, including, without limitation, generating and/or transmitting one or more security data objects associated with the mobile device and determining whether a security feature associated with the mobile device is enabled or disabled. In some embodiments, the remote verification circuitry 102 may be configured to cause signals, computer program instructions, and/or other information to be sent to and/or from a mobile device. In some embodiments, the remote verification circuitry 102 may be configured to cause signals, computer program instructions, and/or other information related to the mobile device to be sent to and/or from one or more third party computing devices (e.g., in an instance in which verification of a condition of the mobile device is requested from or reported to a third party, in an instance in which verification of a condition of the mobile device requires a query to a third party system, and/or the like).

In some embodiments, the apparatus 200 includes the diagnostic circuitry 202. In some such embodiments, the diagnostic circuitry 202 is embodied in any of software, hardware, firmware, and/or combination thereof. In this regard, the diagnostic circuitry 202 may be embodied in any means for enabling initiation of and/or execution of a diagnostic performed on the mobile device, processing of the diagnostic indicators (e.g., output of the diagnostic performed on the mobile device), storing the diagnostic indicators of the mobile device, and/or causing transmission of the diagnostic indicators to one or more servers (including internal or external servers to the mobile device) and/or devices (e.g., the remote verification server 307 or provider system 305). In some such embodiments, for example, the diagnostic circuitry 202 may be configured to perform one or more diagnostics on the mobile device, including, without limitation, verifying the condition of a security feature associated with the mobile device, a crack detection routine (described in further detail below), and/or an internal diagnostic test (described in further detail below). Additionally, or alternatively, in at least some embodiments, the diagnostic circuitry 202 is configured to retrieve, for example via communication with a provider system (e.g., as shown in 305 in FIG. 3), the conditions of the mobile device such as mobile device model type, mobile device storage capacity, mobile device software capabilities, and other such information of the mobile device to confirm that the mobile device is running at a predetermined capacity to pass the diagnostic test(s) performed by the diagnostic circuitry 202.

In some embodiments, one or more of the components comprised in apparatuses 100 and 200 may share hardware, to eliminate duplicate hardware requirements. Additionally, or alternatively, in some embodiments, one or more of the components (e.g., 101, 102, 103, 104, 105; 201, 202, 203, 204, 205) may be embodied as a single element, such that a single components includes means configured to perform the operations of two or more of the components (e.g., 101, 102, 103, 104, 105; 201, 202, 203, 204, 205). For example, in at least one embodiment, the remote verification circuitry 102 and the processor 101 are combined into processing circuitry. For example, in at least one embodiment, the diagnostic circuitry 202 and the processor 201 may also be combined into components embodied in processing circuitry. Additionally, or alternatively, one or more of the circuitries (e.g., 101, 102, 103, 104, 105; 201, 202, 203, 204, 205) may be embodied by two or more sub-circuitries, which may be communicable, work in conjunction, or be distinct.

FIG. 3 illustrates an example system architecture in accordance with various embodiments of the present disclosure. The system architecture may include a network 301, one or more mobile devices 310A, 310B, . . . 310N (hereinafter, collectively referred to as 310), a provider system 305, and a remote verification system 307. Mobile device(s) 310, may be communicably connected with a provider system 305 and/or a remote verification system 307 via network 301. The mobile device(s) 310 may include such electronic devices as smart phones, watches, tablets, e-readers, laptops, or any other device. In some embodiments, the mobile device(s) 310 may comprise the circuitries shown and described with respect to apparatus 200 in FIG. 2. In some embodiments, the remote verification system 307 may comprise the circuitries shown and described with respect to apparatus 100 in FIG. 1. In some embodiments, the provider system 305 may comprise the circuitries shown and described with respect to at least a processor 101, memory 103, input/output circuitry 104, and/or communications circuitry 105 of apparatus 100 in FIG. 1. The mobile devices may include hardware and/or software components capable of taking external images of itself (e.g., one or more cameras configured to capture a reflection of the device in a mirror), components capable of locking the mobile device (e.g., security feature(s) of the mobile device), and components capable of running diagnostics on the mobile device (e.g., one or more internal diagnostic programs). The remote verification system 307 may be communicably connected with the provider system 305 and the mobile devices 310 via network 301. In some embodiments, the remote verification system 307 may be the apparatus 100 shown and described with respect to FIG. 1. In some embodiments, the remote verification system 307 may comprise the remote verification circuitry (discussed in detail hereinafter) used to conduct a remote verification of a condition of the mobile device(s) 310. While only remote verification system 307, provider system 305, network 301, and mobile device(s) 310, are depicted in FIG. 3, for clarity, it will be appreciated and understood that numerous additional iterations of each, or any other systems and computing devices relevant to the systems, apparatus, and methods disclosed herein, may be present for purposes of this disclosure.

Network 301 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, network 301 may include a cellular telephone (e.g., mobile device), mobile broadband, long term evolution (LTE), GSM/EDGE, UMTS/HSPA, IEEE 802.11, IEEE 802.16, IEEE 802.20, WiFi, and/or WiMax network. Furthermore, network 301 may include a public network, such as the internet, a private network, such as an intranet, or any combinations thereof, and may utilize a variety of networking protocols now available or later developed including, but not limited to TCP/IP based networking protocols.

The remote verification system 307 may receive data from, transmit data to, and communicate with the mobile device(s) 310 and with provider system 305 via one or more networks 301. The remote verification system 307 may utilize, generate, store, process, request, transmit, modify, and otherwise use and keep track of, among other things, data sets received from mobile devices 310, diagnostic indicators (e.g., output of the internal diagnostic run on the mobile device), screen crack detection results (e.g., output of the screen crack detection routine), and security feature results (e.g., security data objects associated with the enablement or disablement of a security feature associated with a mobile device 310).

The remote verification system 307 may include circuitry, one or more networked processors, or the like configured to perform some or all of the server-based processes described herein and may be any suitable network server and/or other type of processing device. In some embodiments, the remote verification system 307 may include circuitry as described herein (e.g., with respect to the apparatus 100 shown in FIG. 1) configured to transmit instructions to the mobile device(s) 310, a provider system 305, and/or another third party device for instructing the respective device/system to carry out the diagnostics and receive data and information relevant to determining if the mobile device(s) is (are) in an acceptable condition. In some embodiments, some or a portion of the verification processes disclosed herein may be done locally on the mobile device(s) and/or remote on the remote verification system 307, provider system 305, and/or another third-party device without departing from the scope of the disclosure.

In some embodiments, the remote verification system 307 may function as a unified "cloud" with respect to the mobile devices 310 and provider system 305. The remote verification system 307 may include several servers performing interconnected and/or distributed functions. To avoid unnecessarily overcomplicating the disclosure, the remote verification system 307 is shown and described herein as a single remote verification system, however, one of ordinary skill in the art will appreciate in light of the present disclosure that any number of servers and/or similar computing devices may be used. In some embodiments, and with reference to FIG. 1, the remote verification system 307 may comprise processing circuitry 100, processors 101, memories 103, input/output circuitries 104, communications circuitries 105, and remote verification circuitries 102, for facilitating the various functions described herein, which functions may be embodied as hardware, software, or a combination of hardware and software. As described herein, the processing circuitry 100 may comprise one or more processors 101, which may include local, networked, or remote processors or any other processing means known in the art.

Example Data Flows and Operations

FIG. 4 illustrates a flowchart according to an example method 400 for providing a remote verification of a condition of a mobile device when a security feature is enabled according to some example embodiments. In this regard, FIG. 4 illustrates operations that may be performed at and/or by a remote verification system 307 (e.g., such as computing apparatus 100), and/or via cooperation with one or more computing apparatuses 100 and/or 200, including mobile device(s) 310. The operations illustrated and described with respect to FIG. 4 may, for example, be performed by, with the assistance of, and/or under the control of one or more of the apparatuses discussed herein (e.g., apparatuses 100 and/or 200), including processors 101, memories 103, communications circuitries 105, remote verification circuitry 102, or input/output circuitries 104, processors 201, memories 203, communications circuitries 205, diagnostic circuitries

202, and input/output circuitries 204. In some embodiments, processes requiring the operation of the mobile device 310 (e.g., a subset of diagnostic tests instantiated on and/or requiring hardware or software feedback from the mobile device) are to be performed on the mobile device. In some embodiments, processes executed remotely from the mobile device (e.g., requests for verification of the condition of the mobile device initiated by a remote server when the mobile device is unavailable for inspection) may be performed on or by one or more remote device(s) separate from the mobile device being verified (e.g., via a provider system 305, a remote verification system 307, or another third party device). Other processes that are wholly or partly device agnostic (e.g., retrieving or requesting metadata associated with a mobile device from a third-party server) may be performed on any of the aforementioned devices.

At block 401, the apparatuses 100 and/or 200 may include means, such as the remote verification circuitry 102 and/or the diagnostic circuitry 202, communications circuitries 105 and/or 205, input/output circuitries 104 and/or 204, memories 103 and/or 203, and processors 101 and/or 201, and/or the like, or a combination thereof, to receive a request for verification on mobile device condition of a mobile device from a user of the mobile device. In some embodiments, the request for verification may be triggered by a user selecting a certain input on the GUI of the mobile device (e.g., an input may comprise a visual representation of a button indicated on the mobile device interface such as a "Start" or "Proceed" button) or an input on the GUI of a computing device associated with the mobile device, if remote. In some embodiments, the request for verification may be triggered by a user opening and interacting with an application associated with the remote verification program (e.g., an app) on the mobile device or on a computing device associated with the mobile device, if remote. In some embodiments, the request for verification may be triggered by a third party's computing device requesting the verification of a condition of the mobile device. In some embodiments, a third-party request may take place after the user of the mobile device has requested diagnostics run on the mobile device in order to start or complete a remote verification process on the mobile device. For example, the user or a third party may initiate a "trade in", "resell", "warranty", "insurance purchase," or similar function that may require verification of the condition of the mobile device, and the mobile device, another device associated with the user, or a device associated with at third party (e.g., a provider) may initiate the request for verification as part of the requested function. In response to the initiation, either directly on the mobile device or via a third party device or browser The request may be sent to the remote verification circuitry 102 within the apparatus, or it may be sent to the remote verification system 307 which may act in combination with the mobile device to determine the condition of the mobile device (e.g., an invalid indication of the mobile device, an unacceptable indication, or an acceptable condition of the mobile device).

In some embodiments, once a request for verification on the mobile device condition has been received, the operation may continue to cause the mobile device to perform one or more diagnostics at block 402. In some embodiments, at block 408, the apparatus 100, 200 may then determine if the mobile device has passed the diagnostics according to the various embodiments discussed herein. Additionally, or alternatively, once a request for verification of the mobile device condition has been received, a remote verification system 307 and/or the remote verification circuitry 102 may receive at least one security data object associated with the mobile device at block 403. In some embodiments, the security data object may be stored on the mobile device, locally, or the security data object may be stored on another system, such as a provider system (e.g., a memory associated with the provider system 305). For example, when the security feature is first enabled, the mobile device may transmit an indication of the security feature being enabled to another system, such as the provider system, where this indication may be stored as a data object in memory for future retrieval without interacting with the mobile device directly. In some embodiments, the security data object indicating the status of the security feature may be stored external to the mobile device (e.g., in a provider system 305 such as an Apple server to store Find My® iPhone® feature) and a separate program (e.g., Apple® Global Service Exchange (GSX)) may be used to disable said externally stored security feature. In some embodiments, the remote verification system 307 may query a verification API, such as Apple® GSX, to access the security feature of the mobile device, wherein a user of the mobile device may enable and/or disable the security feature of the mobile device by sending a request to an external server housing the data object associated with the security feature (e.g., GSX of Apple®) which may toggle the security feature before transmitting a security data object of the security feature comprising an indication of enablement or disablement to the mobile device and/or the remote verification system for the remote verification of the condition of the mobile device process. In some embodiments, the mobile device and/or remote verification system may transmit computer executable instructions to the verification API (e.g., associated with a third-party server) to cause the third-party server to disable the security feature. In some embodiments, as discussed herein, the security data object controlling the state of the security feature may alternatively be housed on the mobile device such that the setting may be changed locally.

Once a request for verification of the mobile device condition has been received, the remote verification system 307 and/or the remote verification circuitry 102 may determine whether a security feature of the security data object (e.g., a security feature associated with the mobile device) is enabled. In some embodiments, the remote verification system 307 and/or the remote verification circuitry 102 may determine whether the mobile device has been jailbroken or rooted (e.g., whether the software/hardware of the mobile device has been bypassed allowing a user to have control over certain core features of the mobile device), which may serve as a threshold for the processes described herein (e.g., the process will not continue if the device is jailbroken or rooted). In some embodiments, the remote verification system 307 and/or the remote verification circuitry 102 may determine the age of the mobile device and determine a predetermined warranty period of the mobile device. In some such embodiments, if the remote verification system 307 and/or the remote verification circuitry 102 determines the mobile device to be within the predetermined warranty period, a data object comprising an indication that the mobile device is within the warranty period may be transmitted to another system, such as the provider system, where this indication may be stored as a data object in memory for future retrieval without interacting with the mobile device directly. In some embodiments, if the age of the mobile device indicates that the mobile device is outside of the predetermined warranty period, the one or more diagnostics and the processing of the security data object may not be processed by the remote verification system 307.

At block 404, the depicted process determines that the security feature associated with the security data object is enabled. In some embodiments, once a request for verification of the mobile device condition has been received and the security feature is determined to be enabled, a remote verification system 307 or remote verification circuitry 102 may render a GUI configured to facilitate the disabling of the security feature at step 405, wherein the GUI may be displayed locally on the mobile device or displayed remote from the mobile device on an alternative user interface (e.g., an iPad, a computer, etc. which may be associated with the same user of the mobile device or the mobile device itself). In some embodiments, step 405 may be completed without the reception of a security data object associated with the mobile device. For instance, the GUI may be configured to facilitate the disabling of the security feature of the mobile device automatically, without a real-time indication from the remote verification system 307 or remote verification circuitry 102 indicating that a security feature is enabled.

In some embodiments, the steps of 402, 403, 404, and 405 may be rendered sequentially such that once the request for verification on the mobile device condition at 401 is received, the remote verification system may cause the mobile device to perform diagnostic at 402. At block 403, and after the mobile device has performed the diagnostic(s) at block 402, the remote verification system may receive at least one security data object associated with the mobile device. At step 404, and after the remote verification system has received at least one security data object associated with the mobile device at 403, the remote verification system 307 and/or the remote verification circuitry 102 may determine a security feature of the security data object is enabled at block 404. At block 405, and after the remote verification system 307 and/or the remote verification circuitry 102 has determined a security feature of the security data object is enabled, the remote verification system 307 and/or the remote vinification circuitry 102 may render a GUI configured to facilitate the disabling of the security feature.

In some embodiments, the steps of 402, 403, 404, and 405 may be triggered sequentially such that once the request for verification on the mobile device condition at 401 is received, the remote verification system may cause the mobile device to receive at least one security data object associated with the mobile device. At step 404, and after the remote verification system has received at least one security data object associated with the mobile device at 403, the remote verification system 307 and/or the remote verification circuitry 102 may determine a security feature of the security data object is enabled at block 404. At block 405, and after the remote verification system 307 and/or the remote verification circuitry 102 has determined a security feature of the security data object is enabled, the remote verification system 307 and/or the remote vinification circuitry 102 may render a GUI configured to facilitate disabling the security feature. In some embodiments, once the security feature is disabled, the process may then proceed to perform diagnostic at 402. In some embodiments, the system my hold up the process and refuse to move forward with the process until the security feature is disabled. At block 403, and after the mobile device has performed the diagnostic(s) at block 402, the remote verification system may render a GUI configured to show the value of the mobile device (e.g., the trade-in value). In some embodiments, the diagnostic(s) may be performed prior to or in parallel with the verification and disablement of the security feature.

In some embodiments, if the security feature is enabled, the remote verification may fail, and an indication of an unacceptable condition may be transmitted. In some embodiments, if the security feature is enabled, then an invalid indication may be transmitted (e.g., from the remote verification system 307 and/or the remote verification circuitry 102 to the mobile device) and a user of the mobile device may be instructed to disable the security feature to return an acceptable condition and the remote verification of the condition of the mobile device process may be paused or halted until the security feature is determined to be disabled (e.g., the process may halt until a subsequent indication of disabling the security feature is received). If the security feature is disabled, the remote verification of the condition of the mobile device may return an "acceptable condition" of the mobile device, assuming any other criteria are also met, without having to restart the remote verification process (e.g., performing the diagnostic(s) and/or determining the security feature of the mobile device is enabled or disabled). In some embodiments, the acceptable condition of the mobile device may be limited to a predetermined threshold time, wherein if the predetermined threshold time lapses without any further procession through the remote verification process, then the remote verification process may time out even in an instance in which the mobile device has satisfied all of the required conditions for the acceptable condition. For example, if the remote verification process times out from the acceptable condition of the mobile device (after the predetermined threshold time has lapsed), the remote verification process may be restarted at step 401 upon resumption by the user/third party. In some embodiments, once the acceptable condition of the mobile device has timed out (i.e., the predetermined threshold time has expired) an unacceptable condition may be rendered via the GUI.

In some embodiments, the remote verification process may be run in whole or in part through an application (i.e., an "app") downloaded onto the mobile device to be stored locally on the mobile device. For example, the remote verification process may be run by a service-related app (e.g., an application designed to provide a service to the users of the mobile device, such as a trade-in service, warranty service, or insurance service) downloaded onto the mobile device such that the remote verification program may have access to local data within the phone after it has received authorization to access such data or that otherwise queries portions of the mobile device to request the needed data. In some embodiments, the remote verification program run through a mobile device app may continuously run on the mobile device and continuously collect data based on historical and real-time diagnostic data generated by the diagnostics run on the mobile device. In some embodiments, the remote verification of the condition of the mobile device process may store (either locally on the mobile device or externally via transmission of data over a network to an external storage subsystem associated with the application) analytics of the mobile device based one or more historical and current diagnostic(s) run on the mobile device by the remote verification of the condition of the mobile device process of the mobile device. In some embodiments, the remote verification system 307 may store the historical data associated with the mobile device comprising one or more previous diagnostics run on the mobile device and/or current diagnostics run on the mobile device during the current process of the remote verification of the condition of the mobile device process. In some embodiments, the historical data may include normal operating data (e.g., battery life, storage capacity, etc.) stored over time from the mobile device. In some embodiments, the remote verification system 307 and/or the provider system 305 may query the historical data and/or current data stored in the remote verification system 307 to determine past faults of the mobile device, past instances of fraud, and/or past instances failure of the one or more diagnostics of the mobile device. In some embodiments, the storage of the historical and current data of the mobile device in the remote verification system 307 may comprise the identification data object (e.g., IMEI number, phone number, and/or an analytics identifier associated with the specific mobile device) associated with the mobile device to identify and match the current mobile device and/or current remote verification process using the correct identification data object with stored historical and current data of the mobile device within the remote verification system. As described herein, in some embodiments, the identification data object may be associated with the device only, with the user, or with both.

In some embodiments, the remote verification process may be run at least partially external to the mobile device. In some embodiments, the remote verification process may be run in whole or in part on an information system accessible over the internet (e.g., the Web). For example, software associated with the remote verification program may be installed and run on a computing device with access to the mobile device via a network 301. In some embodiments, the remote verification program may not require any download, but may only require the mobile device (or a computing device associated with the mobile device) to access a webpage or website and authorize the webpage or website to access data associated with the mobile device.

In some embodiments, the remote verification process may include a combination of locally executed functions on the mobile device and externally executed functions. For example, in some embodiments, diagnostics or other data collection processes that must be run on the mobile device or that are otherwise executed or executable on the mobile device may be run on the mobile device, and processes utilizing one or more of these types of data (e.g., analysis of the data and/or coordination with third party systems) may be performed remotely based on electronic communication with the mobile device. In some embodiments, an external computing device may direct or instruct one or more diagnostics or other data collection processes, which may then be executed on the mobile device.

In some embodiments, software associated with the remote verification program may be packaged in a Software Development Kit (SDK) for use in creating an application of the remote verification program on specific platforms. For example, a remote verification program may be regenerated on specific platforms such as Android™, iOS™, and other such platforms known in the art. The SDK package may comprise libraries, code sample, processes, and guides of the remote verification program in order for users of the SDK to develop their own remote verification program apps.

In some embodiments, if the security data object indicates that a security feature on the mobile device is enabled, then the remote verification may cause the security feature of the security data object to be disabled at step 406. In some embodiments, and after blocks 406, the remote verification system may determine an acceptable condition of the mobile device at block 407 once the security feature of the security data object has been disabled on the mobile device. In some embodiments, such disablement of the security feature may be performed locally (e.g., on the mobile device) or remotely (e.g., on a separate computing device associated with the mobile device via an account associated with a user of the mobile device).

In some embodiments, a GUI may be configured to facilitate disabling the security feature of the mobile device at step 406, like that seen in the example embodiment of FIG. 15. In the depicted embodiment, GUI 1500 shows information about the mobile device on which the software is installed, including mobile device manufacture, type, model, and storage as seen at 1501. In some embodiments, the GUI 1500 may show instructions 1507 to disable a security feature of the mobile device. In some embodiments, the GUI 1500 may include an input, which may comprise a visual representation of a button indicated on the mobile device interface, such as a "Proceed" button, to proceed through the remote verification of the condition of the mobile device, like the input shown at 1504. In some embodiments, the GUI 1500 may display written instructions to enable the user to manually disable the security feature. In some embodiments, the GUI 1500 may facilitate programmatically or semi-programmatically disabling of the security feature. For example, the user may select "Proceed" or another input, and the software associated with the GUI may then open the settings application, which then allows the user to access the security feature enablement/disablement screen to disable the security feature (e.g., semi-programmatically). In some embodiments, the security settings of the operating system of the mobile device may limit the degree of settings changes and interface options that can be programmatically accessed without user input, and the systems and software disclosed herein may be configured to adjust the disablement process to get the user as close to the correct interface as possible within the restrictions of the operating system. In some embodiments, an authentication prompt may be displayed in connection with any of the aforementioned disabling processes to cause the user to verify her or his identity prior to disabling the security feature (e.g., a password, fingerprint, facial recognition, passcode such as a pin, or any other authentication). In some embodiments, once the security feature has been disabled, the GUI may be configured to show a "Proceed" button 1504 (e.g., as shown in FIG. 15), which button may be selected to configure the GUI as shown, for example, in FIG. 16. For example, once a user has selected the input of 1504 and the security feature is determined to be disabled, the GUI may be configured to show a post-acceptable condition like the example GUI shown in FIG. 16, which is described in further detail below. In some embodiments, the GUI may be configured with a input for a GUI to be configured to show an offer for the mobile device or any other subsequent step of analysis, maintenance, or other operation associated with the mobile device, which may be based on the disablement of the security feature.

In some embodiments, the remote verification of the condition of the mobile device process may comprise a GUI configured to show the security feature is being checked and or verified to make sure the security feature is disabled, such as a dynamic graphic showing the security feature is being checked like that shown at 3602. In some embodiments, the remote verification of the condition of the mobile device process may configure the GUI of the mobile device in a similar or identical manner to that shown in GUI 3600 of FIG. 36. In some embodiments, the GUI 3600 may comprise a link to retrieve for display or otherwise access a help page in order to instruct the user to disable the security feature of the mobile device. In some embodiments, the GUI 3600 may comprise a button (e.g., "Check Again" button, 3605) to recheck the status of the security feature in an instance in which the security feature is determined to be enabled, wherein the security feature may be rechecked an infinite number of times during the remote verification of the condition of the mobile device process.

In some embodiments, the GUI may be configured to show the security feature is still enabled following checking of the status of the security feature via retrieval of the security data object, such as that shown in GUI 3700 of FIG. 37. In some embodiments, the GUI 3700 may comprise a pop-up window comprising one or more options for continuation through the remote verification of the condition of the mobile device process. For example, the pop-up window of FIG. 37, or another similar display, may comprise an indication that the security feature is still enabled and may comprise an input for the user to select comprising a function to go back to the previous step of the remote verification of the condition of the mobile device process (e.g., a "Go Back" button, 3702) and/or an input for the user to continue with attempting to disable the security feature (e.g., the "Continue" button, 3703), which may be configured to direct the user to a settings menu or other process for disabling the security feature in accordance with the various embodiments discussed herein. In some embodiments, a GUI may be configured to indicate the security feature has been disabled. For example, the GUI 3800 of FIG. 38 may indicate by a graphic and/or text, such as shown at 3801, that the security feature has been disabled. Following the display of the indication 3801, the GUI 3800 may redirect to a next step in the verification process according to the various embodiments discussed herein or a button may be displayed allowing the user to continue with the process.

In some embodiments, a GUI may be configured to facilitate disabling the security feature of the mobile device at step 406, like that seen in the example embodiment of FIGS. 33-35. In some embodiments, the GUI 3300 may show instructions 3301 to enable the user to disable a security feature of the mobile device. In some embodiments, the GUI 3300 may comprise a link (e.g., link 3302) to open the settings of the mobile device in order to at least semi-programmatically disable the security feature of the mobile device. In some embodiments, the GUI 3300 may include an input, which may comprise a visual representation of a button indicated on the mobile device interface, such as a "Continue" button, to continue through the remote verification of the condition of the mobile device, like the input shown at 3303. In some embodiments, if the user selects the link 3302 to advance to the settings of the mobile device and the GUI may be configured to show GUI 3400. In some embodiments, the GUI of 3400 may comprise an indication that a security feature is enabled (e.g., "On"), such as the security feature indicator of 3401. In some embodiments, the settings page of GUI 3400 may comprise one or more types of security features, such as a smart lock (e.g., 3402) and/or a SIM Card lock (e.g., 3403). In some embodiments, the security feature may be disabled by a toggle button such as that shown at 3501 in the GUI 3500 of FIG. 35 following selection on the menu (e.g., the GUI 3400). In some embodiments, a user may select the security feature to be enabled or disabled using a toggle, button, and/or binary switch (e.g., toggle 3501).

In some embodiments, the diagnostic test(s) of block 402 may comprise an external diagnostic, such as a screen crack detection routine (as described in further detail below) or a digitizer/touch screen test (as described in further detail below) and/or an internal diagnostic (as described in further detail below).

Diagnostic Test

FIG. 5 illustrates a flowchart according to an example method 500 for providing a remote verification of a condition of a mobile device according to some example embodiments. In this regard, FIG. 5 illustrates operations that may be performed at and/or by a mobile device remote verification system 307 (e.g., such as computing apparatus 100) and/or by or via cooperation with one or more computing apparatuses 100 and/or 200, including mobile device(s) 310. The operations illustrated and described with respect to FIG. 5 may, for example, be performed by, with the assistance of, and/or under the control of one or more of the apparatuses discussed herein (e.g., apparatuses 100 and/or 200), including processors 101, memories 103, communications circuitries 105, remote verification circuitry 102, or input/output circuitries 104, processors 201, memories 203, communications circuitries 205, diagnostic circuitries 202, and input/output circuitries 204. In some embodiments, processes requiring the operation of the mobile device 310 (e.g., a subset of diagnostic tests instantiated on and/or requiring hardware or software feedback from the mobile device) are to be performed on the mobile device. In some embodiments, processes executed remotely from the mobile device (e.g., requests for verification of the condition of the mobile device initiated by a remote server when the mobile device is unavailable for inspection) may be performed on or by one or more remote device(s) separate from the mobile device being verified (e.g., via a provider system 305, a remote verification system 307, or another third party device). Other processes that are wholly or partly device agnostic (e.g., retrieving or requesting metadata associated with a mobile device from a third-party server) may be performed on any of the aforementioned devices.

At block 501, the apparatuses 100 and/or 200 may include means, such as the remote verification circuitry 102 and/or the diagnostic circuitry 202, communications circuitries 105 and/or 205, input/output circuitries 104 and/or 204, memories 103 and/or 203, and processors 101 and/or 201, and/or the like, or a combination thereof, to receive a request for verification on mobile device condition of a mobile device from a user of the mobile device or some communication generated by the mobile device or by the remote verification system 307. The request may be sent to the remote verification circuitry 102 within the apparatus, or it may be sent to the remote verification system 307 which may act in combination with the mobile device to provide an invalid indication of the mobile device, to provide an unacceptable condition of the mobile device, and/or to provide an acceptable condition of the mobile device. For example, in some embodiments, a user may start a claim, trade-in, or other process with a third party (e.g., a provider system), and/or with the remote verification system, which may then communicate with the respective devices and systems described herein to initiate the remote verification process. The user may start the process either via the mobile device (e.g., by downloading an app such as the service-related app described above), via other communication to the party(ies) identified herein (e.g., via web browser or other communications interface on a separate computer), or via direct communication with the party(ies) (e.g., visiting a retailer or calling a help line and initiating the remote verification process from the retailer/help line computing system). In some embodiments, a third party computing system (e.g., a computing system associated with the party(ies) identified herein, which may include retailers of the mobile device) may determine the eligibility of the mobile device for the process(es) described herein based on the identification data object associated with the mobile device. In some embodiments, the identification data object may comprise the IMEI number of the mobile device. In some embodiments, the process(es) described herein may be device and/or user agnostic, such as by allowing a user to initiate remote verification of the mobile device with no preexisting account or verification of the eligibility of the mobile device for participation in the process(es). In such embodiments, the remote verification system may return an acceptable or unacceptable condition and provide the results to a third-party computing system for determination of eligibility and/or next steps. In some embodiments, eligibility may be verified manually. At block 502, and in some embodiments, once a request for verification on the mobile device condition has been received, the operation may continue to cause the mobile device to perform the diagnostic(s) at block 502. Blocks 501 and 502 may operate in substantially the same manner as blocks 402 and 408 of FIG. 4. In some embodiments, the diagnostic test(s) of block 502 of FIG. 5 may comprise a screen crack detection routine and/or an internal diagnostic according to any of the embodiments or combinations thereof described herein. FIG. 6 illustrates a flowchart according to an example method for performing an internal diagnostic according to some example embodiments. FIG. 7 illustrates a flowchart according to an example method for performing a screen crack detection routine according to some example embodiments.

FIG. 6 may be performed at and/or by example apparatuses 100 and/or 200 as seen in FIGS. 1 and 2, respectively. For example, the operations illustrated in and described with respect to FIGS. 6 and 7 may be performed by, with the assistance of, and/or under the control of one or more of the apparatuses 100 and/or 200, processors 101 and/or 201, communications circuitries, memories 103 and/or 203, input/output circuitries 104 and/or 204, remote verification circuitry 102, and/or diagnostic circuitry 202. In some embodiments, some or all of the operations illustrated in FIG. 6 may be initiated by a remote verification system 307 (e.g., such as computing apparatus 100), and/or by or via cooperation with one or more a computing apparatuses 100 and/or 200, including mobile device(s) 310. For example, the diagnostics themselves may be performed by the mobile device(s) in some embodiments in response to a command from the remote verification system, and the results may be transmitted back to the system for further analysis. Similarly, the operations illustrated in and described with respect to FIG. 7 may be performed by, with the assistance of, and/or under the control of one or more of the apparatuses 100 and/or 200, processors 101 and/or 201, communications circuitries, memories 103 and/or 203, input/output circuitries 104 and/or 204, remote verification circuitry 102, and/or diagnostic circuitry 202.

In some embodiments, the diagnostic(s) performed on the mobile device at blocks 402/502 may comprise an internal diagnostic, which may determine the status of one or more internal diagnostic indicators associated with one or more operational parameters of the mobile device. The operational parameters associated with the internal diagnostic indicators may be associated with operational categories of the mobile device (e.g., the operational parameters may comprise performance data associated with categories such as battery life, signal, processor, storage, audio, settings, commands, status updates, applications, physical damage to the mobile device, liquid damage to the mobile device, etc.). The actual measured operational parameters of the mobile device may be compared with acceptable values of the same parameters to determine if the mobile device passes the diagnostics for each tested parameter. The acceptable values may be predetermined (e.g., stored in memory following empirical testing in a controlled environment) or may be determined by a computing system (e.g., apparatus 100) by aggregating operational parameters from a plurality of other mobile devices. In some embodiments, the operational parameters of the associated internal diagnostic indicators may be compared with acceptable values determined at the mobile device (e.g., the acceptable values may be determined by the provider/manufacturer of the mobile device, by a third party associated with the process, or the like). In some embodiments, the acceptable value may be updated remotely from the mobile device by the provider system 305 and/or the remote verification system 307 and may be released immediately after update (e.g., asynchronously) or released at predetermined intervals with other software and/or hardware updates at a standard release cadence. In some embodiments, the internal diagnostic test may also include extracting background data of the mobile device, including the mobile device serial number, make and model of the mobile device, storage capabilities of the mobile device, and any other data contained in a specification of the mobile device. In some embodiments, an operational category may refer to a single layer of data associated with a mobile device. In some embodiments, an operational category may comprise a layer of data having one or more layers of data within the category (e.g., operational sub-categories, further comprising a second layer of information within any operational category). For example, audio may be an operational category and call volume, ringer volume, music volume, alarm volume, system volume, Bluetooth, Bluetooth volume, or other volumes of audio may be the operational sub-categories. For example, the operational category of battery may comprise operational sub-categories of battery health, battery capacity, firmware health, battery state, performance, consumption, low battery, charging, charging alert, charge rate, discharge rate, battery charging type, battery charging rate, discharge when asleep, discharge when awake, average battery life, current battery life, battery usage, voltage, current, power, temperature, current level, or level drop. As a further example, the operational sub-categories for the operational category of signal may be, but are not limited to, signal strength, noise, signal quality, average signal quality, receive strength signal indicator, reference signal received power, reference signal received quality, reference signal signal-to-noise ratio, cell identity, physical cell ID, tracking area code.

In some embodiments, the internal diagnostic indicators associated with one or more operational parameters may be generated and transmitted from the mobile device to the remote verification system 307 for storage and processing. For example, the remote verification system 307 may process the internal diagnostic indicators in order to return data objects comprising a passing (e.g., the internal diagnostic indicators and associated operational parameters are indicated as meeting the acceptable values) or failing (e.g., internal diagnostic indicators and associated operational parameters are indicated as failing to meet the acceptable values) score. In some embodiments, both the internal diagnostic indicators transmitted to the remote verification system 307 and the generated data objects comprising the passing or failing score may be stored, such as in memory 103. In some such embodiments, the historical internal diagnostic indicators and associated data objects of passing or failing scores may be retrieved from the remote verification system 307 for later analysis. In some embodiments, the associated data objects comprising passing or failing scores for the internal diagnostic indicators and/or the diagnostic indicators themselves may be transmitted back to the mobile device 310 and used for various downstream processes, including to configure the GUI of the mobile device with an indication that the mobile device has met the acceptable condition.

In some embodiments, the diagnostic(s) performed at blocks 402/502 may be performed remotely from the mobile device. For example, the remote verification system 307 or a system associated with the remote verification system 307 (e.g., an agent of the remote verification system 307) may determine the status of one or more internal diagnostic indicators associated with one or more operational parameters of the mobile device. For example, the remote verification system 307 or a system associated with the remote verification system 307 may receive the one or more internal diagnostic indicators and may determine if the operational parameters of the mobile device meet one or more acceptable values. The internal diagnostic indicators may comprise data indicative of a diagnostic run for an operational category of the mobile device and/or an operational sub-category. The internal diagnostic indicators may comprise one or more data objects including data values, such as numerical values, messages, and/or other data values associated with the performance of the mobile device in a particular operational category/sub-category (e.g., good, normal, bad, charging, discharging, working, not working). Further, the internal diagnostic indicators may include comparative performance, which may be based on a comparison of data of an operational category or operational sub-category for the mobile device, as compared to one or more predetermined acceptable values for the operational categories and/or sub-categories of the mobile device. For instance, the optimal battery life of the mobile device may be 12 hours, and a predetermined acceptable value for the operational category of battery life may be 50% or 6 hours. An internal diagnostic may be performed on the mobile device, and in an instance wherein the battery life of the mobile device is returned to be 5 hours, then the internal diagnostic indicator may return an indication that the mobile device has failed. In the alternative, if the internal diagnostic is performed on the mobile device and a battery life of 6.5 hours is returned, then the internal diagnostic indicator may return an indication that the mobile device has passed.

In some embodiments, the GUI may be configured to render an interface requiring or optionally requesting the user of the mobile device to input an indication if the mobile device is free of certain types of damage, such as liquid damage and/or physical damage (including screen or glass damage). In some embodiments, the configured GUI may require or optionally request the user of the mobile device to input an indication if the mobile device is free of liquid damage as shown, for example in FIG. 39. This process may occur in addition to or as an alternative to the other diagnostic processes disclosed herein. For example, the configured GUI 3900 of FIG. 39 may comprise selectable options allowing the user to input an indication of whether the device is "free of liquid damage" at 3901 (e.g., a user may select a "yes" button at 3902 if the mobile device is free of liquid damage, or a user may select a "no" button at 3903 if the mobile device is not free of liquid damage). In some embodiments, the configured GUI may require or optionally request the user of the mobile device to input an indication of whether the mobile device is free of physical damage as shown, for example, in FIG. 40. For example, the configured GUI 4000 of FIG. 40 may comprise request asking whether the device is "free of physical damage" at 4001, and may provide inputs for a user to verify the physical damage condition (e.g., a user may select a "yes" button at 4002 if the mobile device is free of physical damage, or a user may select a "no" button at 4003 if the mobile device is not free of physical damage). This process may occur in addition to or as an alternative to the other diagnostic processes disclosed herein.

In some embodiments, the GUI may be configured to request the user to input background data associated with the mobile device, such as a serial number associated with the mobile device (e.g., such as an IMEI number and/or phone number). The user may input this serial number as an identification data object associated with the mobile device, which the apparatuses 100 and/or 200, and/or remote verification system 307, may compare to the correct serial number of the mobile device based on a separate identifier (e.g., the serial number may be listed within the provider system 305 which may be accessed via network) to identify the mobile device. An example GUI configured to request a serial number 1300 associated with the mobile device may be shown in FIG. 13. For instance, a user may input the serial number data into the text box 1301, and then the user may click the input 1302 to continue through the GUI configured to advance through the remote verification process (e.g., the serial number verification may be a precursor to the remote verification process, such as the processes shown in FIGS. 4-5). In some embodiments, the GUI configured to request a serial number 1300 may comprise an input to cancel (e.g., input 1303) and, if selected, may take a user back to the beginning of the remote verification process (e.g., block 401 of FIG. 4 and/or block 501 of FIG. 5). The serial number may be compared with a serial number registered to the user and/or a serial number associated with the device (e.g., either a specific device or a type of device, such as a particular make and model) that the user is purporting to process. In some embodiments, the remote verification may only proceed or may return an unacceptable condition if the serial number is invalid or does not match.

In some embodiments, the GUI may be configured to request the user to input background data associated with the mobile device, such as a phone number associated with the mobile device and/or an IMEI associated with the mobile device. FIG. 14 shows an example GUI configured to request a phone number 1400 associated with the mobile device. For instance, a user may input the phone number into the text box 1401, and then the user may click the input 1402 (e.g., a "submit" button) to continue through the GUI configured to advance through the remote verification process (e.g., the phone number may be a precursor to the remote verification of the condition of the mobile device process, such as the processes shown in FIGS. 4-5).

In some embodiments, current data of a mobile device, associated with operational categories (e.g., battery, storage, volume, etc.) may be extracted from the mobile device and processed by the diagnostic circuitry 202 of FIG. 2. The diagnostic circuitry 202 of FIG. 2 may process the current data of the mobile device and compare the current data to the acceptable values for the operational category/sub-category's data in order to output one or more internal diagnostic data objects of the mobile device. The internal diagnostic of the mobile device may comprise one or more internal diagnostic data objects associated with one or more operational categories and/or sub-categories such that the internal diagnostics are an aggregate of each operational category and/or sub-category of the mobile device.

In some embodiments, if the diagnostic indicators meet (or exceed) the acceptable values of the operational categories and/or sub-categories, then an indication that the mobile device has passed the internal diagnostic may be generated. In some embodiments, if the diagnostic indicators do not meet the acceptable values of the operational categories and/or sub-categories, then an indication that the mobile device failed the internal diagnostic may be generated. In some embodiments, the acceptable values may be predetermined acceptable values programmed into the remote verification system 307 and/or the mobile device. In some embodiments, the acceptable values may be determined by aggregating data from a plurality of other mobile devices. For example, an average diagnostic indicator associated with a particular operational category or sub-category may be taken from data collected from a plurality of other mobile devices. This average value (or a predetermined deviation therefrom, such as a 10% range above and below this value) may be used as the acceptable value. In some embodiments, the plurality of other devices may be a group of devices sharing similarities with the mobile device being analyzed (e.g., same make, model, etc.).

In some embodiments, the diagnostic circuitry, such as the diagnostic circuitry 202 shown in FIG. 2, may process the current data of the mobile device and return one or more diagnostic indicators (e.g., internal diagnostic data objects) of the mobile device without comparing the diagnostic indicators to acceptable values for the operational category/sub-category's data. In some embodiments, the diagnostic indicators may be raw and/or processed data from the mobile device. In some embodiments, the diagnostic circuitry 202 may output the one or more diagnostic indicators for transmission to the remote verification system 307 for processing. Once received by the remote verification system 307, the remote verification system 307 may use the one or more diagnostic indicators to determine whether the mobile device meets the acceptable values associated with the tests related to the one or more diagnostic indicator. In some embodiments, the remote verification system 307 may determine if the mobile device is affected by any faults using the one or more diagnostic indicators. In some embodiments, the remote verification system 307 may determine a value for the mobile device (e.g., trade-in value) using the one or more diagnostic indicators. The remote verification system 307, in some embodiments, may process the specific age of the mobile device and the one or more diagnostic indicators to generate the value of the mobile device (e.g., the older the mobile device, the lower the value; the older the mobile device and the lower the one or more diagnostic indicators, the lower the value; the lower the one or more diagnostic indicators, the lower the value; the newer the mobile device, the higher the value; the newer the mobile device and the higher the one or more diagnostic indicators, the higher the value; the higher the one or more diagnostic indicators, the higher the value; etc.). Once the value for the mobile device has been generated by the remote verification system 307, the remote verification system 307 may transmit the value back to the mobile device 310 via network 301. In some embodiments, the value may be used to configure the GUI of the mobile device to show the user the value of the mobile device. The user of the mobile device may accept the value of the mobile device and continue with the remote verification process or restart the remote verification process after fixing the one or more components of the mobile device associated with the one or more diagnostic indicators.

In some embodiments, such as at blocks 402, 502, 601, and/or 701, a remote verification system 307 may be used to perform at least some diagnostics on the mobile device from a remote location. In some embodiments, the current and/or historical data of a mobile device associated with operational categories (e.g., battery, storage, volume, etc.) may be extracted from the mobile device and processed by the remote verification system 307, wherein the remote verification system 307 may comprise circuitries such as that shown with respect to apparatus 100 of FIG. 1, including the equivalent of the processors 101 and/or 201, communications circuitries, memories 103 and/or 203, input/output circuitries 104 and/or 204, remote verification circuitry 102, and/or diagnostic circuitry 202. In some embodiments, once the current and/or historical data of the mobile device has been processed and compared to the acceptable values of the operational category/sub-category's data and internal hardware diagnostic data objects are generated, the internal hardware diagnostic (e.g., the aggregate of the one or more internal hardware diagnostic data objects) may be sent back to the mobile device(s) 310 via network 301.

FIG. 6 shows an example embodiment of an internal diagnostic operation 600. For example, at block 601, the apparatuses 100 and/or 200 include means such as the remote verification circuitry 102 and/or the diagnostic circuitry 202, communications circuitries 105 and/or 205, input/output circuitries 104 and/or 204, memories 103 and/or 203, and processors 101 and/or 201, and/or the like, or a combination thereof, to cause the mobile device to perform an internal diagnostic. In some embodiments, and at block 602, acceptable values for the operational categories and/or sub-categories are identified. In some embodiments, the acceptable values are stored in memory (e.g., memory local to the mobile device and/or memory local to the remote verification system). Once the acceptable values for the operational categories and/or sub-categories are identified, and after the internal diagnostics are performed on the mobile device to generate diagnostic indicators, the diagnostic indicators are compared to the acceptable values of the operational categories and/or sub-categories at block 603.

In some embodiments, the diagnostic indicators may include pre-existing data (e.g., either raw or pre-processed data) on or associated with the mobile device that is retrieved in connection with performing the diagnostic (e.g., making an API call for battery health information, which may be predetermined by the mobile device and/or stored over time by the mobile device or a third party system in connection with the mobile device). In some embodiments, the diagnostic indicators may include current or historical data associated with one or more operational categories or sub-categories that may already exist or may be generated in response to the diagnostic(s). In some embodiments, the diagnostic indicators may include the results or other output of a pre-programmed test stored on the mobile device which runs in response to the start of the diagnostic(s) (e.g., running a stress test on the processor). In some embodiments, the diagnostic indicators may include data collected by the mobile device following the start of the diagnostic(s) (e.g., tracking cellular reception following the initiation of the diagnostic(s)). In some embodiments, generation of one or more of the diagnostic indicators may require enhanced permissions, and a prompt may be displayed to the user of the mobile device to grant the enhanced permissions on the mobile device prior to generating and/or retrieving the diagnostic indicators (e.g., access to sensors and/or data not previously authorized by the user).

In some embodiments, the diagnostic test(s), such as the diagnostic of block 402 of FIG. 4 or block 502 of FIG. 5, may comprise a screen crack detection routine and/or one or more internal diagnostics. FIG. 7 illustrates a flowchart according to an example method for performing a screen crack detection routine according to some example embodiments. FIG. 7 may be performed at and/or by example apparatuses 100 and 200 as seen in FIGS. 1 and 2, respectively. For example, the operations illustrated in and described with respect to FIG. 7 may be performed by, with the assistance of, and/or under the control of one or more of the apparatuses 100 and/or 200, processors 101 and/or 201, communications circuitries, memories 103 and/or 203, input/output circuitries 104 and/or 204, remote verification circuitry 102, and/or diagnostic circuitry 202. For example, in some embodiments, at least steps requiring local operations (e.g., image capture) may be performed by the mobile device (e.g., apparatus 200), and additional processing steps may be performed by any apparatus, either locally or remotely (e.g., apparatuses 100, 200).

In some embodiments, the diagnostic(s) performed on the mobile device may comprise a screen crack detection routine such as the process shown in FIG. 7. For instance, at block 701, the apparatuses 100 and/or 200, and/or the remote verification system 307, include means such as the remote verification circuitry 102 and/or the diagnostic circuitry 202, communications circuitries 105 and/or 205, input/output circuitries 104 and/or 204, memories 103 and/or 203, and processors 101 and/or 201, and/or the like, or a combination thereof, to cause the mobile device 310 to initiate a screen crack detection routine (e.g., via processor 201, a camera of the mobile device, and/or additional components of the mobile device). After the screen crack detection routine is initiated, an image of the mobile device may be captured at block 702.

In some embodiments, the image capture of the mobile device may proceed by instructing the user (e.g., via GUI text or visual instructions on the mobile device screen) to place the mobile device in front of a mirror such that the front-face (e.g., screen) of the mobile device is facing the mirror, wherein the mobile device comprises one or more front-facing cameras. A similar process may be used to capture an image of the rear surface (e.g., rear glass) of a mobile device with a rear-facing camera. An example of such placement may be shown in FIG. 10, wherein a mobile device 1001 is placed in front of a mirror 1002 and the reflection of the mobile device's front-face 1003 is placed in view of one or more of the mobile device's front-facing cameras (not pictured) for capture. In some embodiments, one or more images may be captured by the mobile device for analysis. In some embodiments, a graphic, test pattern, code, or blank screen may be displayed during the image capture. In some embodiments, a second device (e.g., another mobile device or separate camera) may be used in connection with one or more of the apparatuses (e.g., via USB connection, Ethernet, or the like) to capture the image(s).

In some embodiments, and once an image of the mobile device has been captured at block 702, the image may be reviewed either by the mobile device or an external computing system (e.g., by the provider system 305 or the remote verification system 307) to determine if the image shows damage to the device (e.g., screen damage). In some embodiments, analysis of the image may comprise the image of the front-face of the mobile device may be divided into parts to determine if one or more parts shows damage at blocks 703-704. In some embodiments, the algorithm may further determine if one or more parts adjacent to parts showing damage also show damage. In some embodiments, a neural network or machine learning model may be trained to determine if one or more parts of the image(s) show damage. In some embodiments, the neural network or machine learning model used to determine if the image contains damage may be stored in the mobile device on a local memory or external to the mobile device (e.g., in a provider system 305 and/or a remote verification system 307). In some embodiments, the images of the mobile device may be transmitted to an external system (e.g., a provider system 305 and/or a remote verification system 307) for image analysis by the remote verification system or a system associated with the remote verification system. In some embodiments, the neural networks herein may include those used and described in U.S. Pat. No. 10,332,249, which was issued Jun. 25, 2019 and is entitled "Screen damage detection for devices", which patent is hereby incorporated by reference herein in its entirety.

Such neural networks and/or machine learning models may be subjected to and/or implement unsupervised training, supervised training, semi-supervised training, reinforcement learning, deep learning, and/or the like in order to analyze images of the mobile device and in turn, determine and utilize relationships for such screen crack predictions (e.g., if such mobile devices show damage). During training of such a neural network and/or machine learning model (e.g., artificial/convolutional neural network or the like), the neural network(s) and/or machine learning model(s) may be iteratively supplied with a plurality of screen crack detection data such that the neural network(s) and/or machine learning model(s) may be configured to, over time, determine patterns amongst the plurality of parameters, values, and data points defined by the screen crack detection data and the screen crack predictions. Said differently, the neural network(s) and/or machine learning model(s) may be configured to determine a correlation or pattern associated with the image data of a mobile device (e.g., screen crack detection data) so as to determine a more accurate prediction of damage to the mobile device.

In some embodiments, and as can be seen in FIG. 11, by facing the mobile device 1101 in front of a reflective surface 1102, a crack 1104 in the screen may be shown in the reflection of the mobile device 1103. Once an image is captured of the mobile device facing the mirror, the internal diagnostic may return an indication that the mobile device shows screen damage at block 705. In some embodiments, the images of the screen of the mobile device may be transmitted to an external system (e.g., a provider system 305 and/or a remote verification system 307) for image analysis by a remote system (e.g., the remote verification system or a system associated with the remote verification system). Additional examples of acceptable screen crack detection processes and other external device integrity checking are described in U.S. Pat. No. 10,332,249, which was issued Jun. 25, 2019 and is entitled "Screen damage detection for devices", which patent is hereby incorporated by reference herein in its entirety.

In some embodiments, a touch screen test, as shown in FIG. 12, may be done in addition or alternatively to capturing an image of the mobile device to detect screen cracks. The touch screen test may include, for example, instructing the user to follow a test pattern on the screen with their finger or instructing the user to color in the screen with their finger to verify that the entirety of the touch surface of the screen is operational. For instance, during a touch screen test, a user of the mobile device may be tasked with both testing calibration of the mobile device's touch screen and testing whether there are any cracks in the screen to prevent a user from accessing the entirety of the touch screen (e.g., areas of the touch screen that cannot register physical contact) when filling in the screen with the pixel values of the mobile device or, alternatively, generally interacting with the touch screen test through touch screen (e.g., failing to select certain areas on the mobile device's screen due to screen cracks). Flaws in the touch screen may be detected, for example, in an instance in which the user is unable to completely fill the screen because a portion of the screen fails to register the touch input. Thus, as with various other embodiments detailed herein, the touch screen may be verified remotely with only the user of the mobile device in physical contact with the mobile device.

In some embodiments, the screen crack detection routine may be embodied by the configured GUIs of FIGS. 21-26, as configured GUIs 2100-2600. In some embodiments, the screen crack detection routine may begin at configured GUI 2100, wherein one or more indicators may show the user how to complete the screen crack detection routine. For example, the configured GUI 2100 may indicate that the user should face the mobile device (e.g., the screen of the mobile device) toward a mirror at 2101. In some embodiments, the configured GUI 2100 may comprise instructions to select a link to a video tutorial of how to complete the screen crack detection routine at 2102. In some embodiments, the configured GUI 2100 may comprise instructions for the user to hold the mobile device a predetermined distance (e.g., 5 to 7 inches) from the mirror and/or instructions for the user to show the mobile device to the mirror without blocking any portions of the mobile device, such as the instructions shown on the configured GUI at 2103. In some embodiments, the configured GUI 2100 may comprise a button (e.g., a "start" button at 2104) for the user to select on the configured GUI in order to advance the configured GUI to the next screen in the screen crack detection routine (e.g., FIG. 22). In some embodiments, the configured GUI 2100 may comprise a button (e.g., a "Skip" button, 2105) for the remote verification of the condition of the mobile device process to skip the screen crack detection routine and continue on to one or more other diagnostics. The skip option may be presented either in an instance in which the user is permitted to not perform the crack detection routine or in an instance in which the user is permitted to delay the crack detection and proceed with other portions of the remote verification process.

In some embodiments, the screen crack detection routine may comprise another configured GUI, such as configured GUI 2200 of FIG. 22, to indicate the user should face the screen of the mobile device toward a mirror (e.g., as shown by graphics on the configured GUI at 2202). In some embodiments, the configured GUI 2200 may comprise one or more graphics and/or fiducials (e.g., 2201A, 2201B, 2201C, . . . 2201N) in order to align and recognize the image of the screen taken by the camera of the mobile device. In some embodiments, the configured GUI of the screen crack detection routine may comprise one or more indicators, such as text and/or graphics, backwards (e.g., reading right to left) such that when the screen of the mobile device is shown in the mirror, the text and/or graphics is shown forwards (e.g., reading left to right), such an embodiment may be shown in configured GUI 2300 of FIG. 23 as 2301 in reading "calibrating" backwards. In some embodiments, the front-facing camera of the mobile device may be collecting image data during the processes of FIG. 22 and/or FIG. 23, such that when the fiducials or other graphics are detected in the camera data, the reversed text and/or start of the screen crack detection image data may be initiated automatically, such that the mobile device seamlessly keeps its text readable to the user and initiates the crack detection process. In some embodiments, the configured GUI of the mobile device may comprise an indication for the user to hold the mobile device toward the mirror for a specified distance (e.g., 15 inches), like that shown at 2302. In some embodiments, the configured GUI of the mobile device for the screen crack detection routine may comprise an indication that some predetermined requirement has happened (e.g., the capturing of an image with good image quality, successful calibration, a specified time period, etc.).

In some embodiments, the screen crack detection routine may comprise a configured GUI comprising an indication for the user to hold the mobile device still for a specific time period (e.g., by use of a graphic or text), wherein the graphic may comprise a stamp of a hand such as that shown at 2401 in configured GUI 2400 of FIG. 24. For example, the graphic of the hand shown at 2401 may be shown on the configured GUI until a test pattern, such as a flash of color (e.g., white or green) and/or light is shown on the mobile device (such as the configured GUI 2500 of FIG. 25). The camera may capture the test pattern (e.g., the green image of FIG. 25) for analysis of the screen for cracks and other damage, which image may be processed locally and/or transmitted to the remote verification system 307 for review. In some embodiments, the screen crack detection routine may comprise a configured GUI (e.g., configured GUI 2600 of FIG. 26) to indicate that there were no screen cracks detected in the screen crack detection routine in an instance in which the device passes the test. For example, the configured GUI 2600 may comprise text or graphics indicating that no damage to the screen of the mobile device was found, such as the text, "No Cracks Detected" at 2601. In some embodiments, the configured GUI 2600 may comprise a link to further details of the output of the screen crack detection routine, which may configure the GUI to take the user to another page comprising the details of the screen crack detection routine, such as that shown at 2602. In some embodiments, the screen crack detection routine may configure the GUI to comprise a link to allow the user of the mobile device to re-run the screen crack detection routine, as shown at 2603 of configured GUI 2600, which option may be present only in the case of failure or in the case of both failure and passage of the screen crack detection routine. In some embodiments, the screen crack detection routine may comprise a button (e.g., "Continue" button at 2604) for the user to select on the configured GUI to continue to the next step of the remote verification process.

In some embodiments, the diagnostics may include a touchscreen diagnostic (e.g., a digitizer test) like that shown in FIGS. 27-29. In some embodiments, the touchscreen diagnostic may comprise a GUI 2700 configured to explain the process to the user and request one or more inputs by the user in order to begin the touchscreen diagnostic. For example, the configured GUI 2700 may comprise an indication for the user to tap, select, or swipe one or more grid squares on a configured GUI (e.g., configured GUI 2800 of FIG. 28) in order to determine that the touchscreen of the mobile device is in working order in each respective grid square (e.g., by detecting touch input at the location of the square, the operability of the touchscreen at that location may be confirmed) and/or to determine that one or more areas of the touchscreen on the mobile device are correctly calibrated to receive inputs by a user. In some embodiments, the configured GUI 2700 may comprise a button (e.g., a "Begin" button, 2703) to start the touchscreen diagnostic process which may advance the touchscreen diagnostic process to a configured GUI similar to or identical to the configured GUI 2800 of FIG. 28. In some embodiments, the configured GUI 2700 of FIG. 27 may comprise a button (e.g., a "Skip" button, 2704) for a user to select in order to skip the touchscreen diagnostic and continue to the next diagnostic in the remote verification of the condition of the mobile device process and/or continue to the next process step of the remote verification of the condition of the mobile device process. The skip option may be presented either in an instance in which the user is permitted to not perform the test or in an instance in which the user is permitted to delay the test and proceed with other portions of the remote verification process.

In some embodiments, once the user has selected to start the touchscreen diagnostic (e.g., through selection of button 2703), the configured GUI 2800 of FIG. 28 may be shown on the mobile device and may comprise one or more grid squares (e.g., grid squares shown in 2801) for selection of the user using the touchscreen of the mobile device. In some embodiments, the configured GUI 2800 may comprise a button (e.g., "Skip Step" button, 2802) for the user to select in order to skip the touchscreen diagnostic and continue on to the next process step of the remote verification of the condition of the mobile device process. In response to selection of individual grid squares 2801 in the embodiment shown in FIG. 28, portions of an image, such as the image 2901 shown in FIG. 29, may be displayed to visually indicate to the user that the respective grid square is functional and has been verified. In some embodiments, once the user has selected each of the grid squares of 2801 and each has been verified, the configured GUI may return an indication that the touchscreen diagnostic has been passed, such as the configured GUI 2900 of FIG. 29. In some embodiments, the configured GUI 2900 may comprise an image comprising a checkmark or other graphic indicator that the touchscreen diagnostic has passed. The completed graphic 2901 may also intuitively confirm for the user that the test has passed. In some embodiments, the size/number of the grid squares may be selected based on a desired sensitivity of the test (e.g., a preset number of pixels, a preset number of screen fractions, or similar option), which may be configurable by the carrier or other provider that is directing or otherwise associated with the remote verification process. In some embodiments, the configured GUI 2900 may comprise a button (e.g., a "Next" button, 2902) which may be selected by a user in order to continue the remote verification of the condition of the mobile device process to the next diagnostic and/or process step. In some embodiments, the touchscreen diagnostic may comprise a digitizer test (e.g., a pixel test) such as that described in U.S. Pat. No. 10,810,732, filed May 7, 2019, and titled "SCREEN DAMAGE DETECTION FOR DEVICES," which is incorporated herein by reference in its entirety.

In the embodiment depicted in FIG. 5, the verification steps associated with the security feature may proceed in accordance with any embodiment disclosed herein (e.g., the flow shown in FIG. 4 in an instance in which the security feature is enabled.). In the depicted embodiment of FIG. 5, the security data object is shown as indicating that the security feature is disabled, which may not require further action by the user or computing devices/mobile devices with respect to at least the security feature. In some embodiments, and in reference to block 503, once a remote verification system 307, and/or apparatuses 100 and/or 200, has received at least one security data object associated with the mobile device, the remote verification system 307 or remote verification circuitry 102 may determine the status of the security feature. In block 504, the security feature of the security data object is determined to be disabled in the depicted embodiment, whereas FIG. 4 shows an example in which the security feature is not initially disabled. Once a request for verification of the mobile device condition has been received at block 501, a remote verification system 307 or a remote for verification circuitry 102 may render GUI configured to indicate an acceptable condition of the mobile device, assuming other required criteria are also met, for a predetermined threshold time at block 505. In some embodiments, steps 504 and 505 may happen in sequential order such that a remote verification system 307 or remote verification circuitry 102 may determine a security feature of the security data object is disabled at step 504, then the remote verification system 307 or remote verification circuitry 102 may render a GUI configured to indicate an acceptable condition of the mobile device for a predetermined threshold time at step 505. As described herein, in instances in which a security feature is not disabled, the user may also be given a predetermined time in which to disable the security feature before an unacceptable condition is determined.

In some embodiments, the verification steps associated with FIG. 5 may also comprise determining whether the mobile device has passed the one or more diagnostics (e.g., screen crack detection and/or internal hardware diagnostic) at step 506. In some embodiments, the remote verification circuitry 102 and/or diagnostic circuitry 202 may cause the mobile device to render a GUI configured to indicate an acceptable condition of the mobile device for a predetermined threshold time at step 505 if the mobile device has passed the diagnostic(s) at step 506. In some embodiments, only the security feature is dispositive for the acceptable condition to be determined. In some embodiments, both the security feature and one or more diagnostics (e.g., screen crack detection and/or one or more internal hardware diagnostics) must each be confirmed (e.g., security feature disabled, no screen cracks (or a predetermined acceptable level of screen cracking), and/or diagnostics which pass the respective diagnostic tests (e.g., by meeting the acceptable values) may collectively be required before the acceptable condition is determined.

[Question for Inventors: Are there any other processes that occur during the sequence leading up to acceptance and trade-in of the device?]

In some embodiments, the predetermined threshold time is a period of time chosen before or at the time when a verification of a condition of a mobile device is requested. For instance, the predetermined threshold time may represent the time period for an acceptable condition of time to remain valid (e.g., during the period for which an offer associated with the mobile device is valid), and it may comprise units of time including, but not limited to, milliseconds, minutes, hours, days, or any other units of time. In some embodiments, the predetermined threshold of time may be set external to the mobile device using a remote verification circuitry 102 or remote verification system 307, which may then be communicated to the mobile device(s) 310 over a network 301. In some embodiments, the predetermined threshold of time may be defined by external conditions, such as the time to accept a service, offer, remote connection, trade-in, or any other interaction between the user of the mobile device and a third-party system. In some embodiments, the predetermined threshold time may differ based upon the client of the remote verification system 307 (e.g., selectable by a provider of a carrier service using the remote verification system for its users/customers of the carrier service) and may be predetermined by the client of the remote verification system 307 before the one or more diagnostics are run. The predetermined threshold time may configure the GUI of a mobile device to show a countdown or other indication of time remaining of the predetermined threshold time for which a user may accept by continuing through the steps outlined in the GUI, or, the user may decline by exiting a request for verification circuitry GUI or by allowing the predetermined threshold time to lapse without further action on the part of the user. Once the predetermined threshold time has lapsed, a signal of an unacceptable condition may be sent from the mobile device to the remote verification system 307 over a network 301, or the signal of the unacceptable condition may be transmitted to the remote verification circuitry 102 within the mobile device. In some embodiments, the unacceptable condition may be transmitted from the remote verification system 307 (e.g., from a server within the remote verification system 307) to the mobile device. In such embodiments, the remote verification system 307 may indicate the predetermined threshold time has lapsed or the remote verification system 307 may continuously indicate a countdown of the predetermined threshold time by continuous transmission of the predetermined threshold time, in real-time, to the mobile device.

In some embodiments, once the acceptable condition has become an unacceptable condition, either from inaction by the user or declining the acceptable condition by an overt action by the user (e.g., exiting the request for verification circuitry GUI, if this action is configured to trigger an unacceptable condition, declining the offer, leaving a designated area, engaging a virtual private network (VPN) or other network signal routing program, or performing an unacceptable action on the mobile device (e.g., turning the device off or uninstalling or blocking the verification software), a user may restart the request for verification of a condition of the mobile device. In some embodiments, the remote verification system 307 may save the data objects and acceptable condition indicators in its own memory or the remote verification circuitry 102 may save the data objects of the previous process or acceptable condition indicators in its memory (e.g., memory 103 of apparatus 100), such that the diagnostic(s) does not have to be re-performed. In some embodiments, in order to avoid the re-performance of diagnostic(s) on the mobile device, a second period of time, the time function, must be determined in order to save the diagnostic results and indicate that those diagnostic results are still valid. The time function may also be used to store the results of the diagnostic results when a user stops the remote verification process described herein after a diagnostic test has been performed, but before the security feature(s) have been determined as enable or disabled.

Security Feature Verification

FIG. 8 illustrates a flowchart according to an example method 800 for determining whether a security feature of a mobile device is enabled (e.g., a process which may be performed as part of the processes of FIG. 4 and/or FIG. 5). In this regard, FIG. 8 illustrates operations that may be performed by a remote verification system 307 (e.g., such as computing apparatus 100), and/or by cooperation with one or more computing apparatuses 100 and/or 200, including mobile device(s) 310. The operations illustrated and described with respect to FIG. 8 may, for example, be performed by, with the assistance of, and/or under the control of one or more of the apparatuses discussed herein (e.g., apparatuses 100 and/or 200), including the processors 101, memories 103, communications circuitries 105, remote verification circuitry 102, or input/output circuitries 104, processors 201, memories 203, communications circuitries 205, diagnostic circuitries 202, and input/output circuitries 204. In some embodiments, processes requiring the operation of the mobile device 310 (e.g., a subset of diagnostic tests instantiated on and/or requiring hardware or software feedback from the mobile device) are be performed on the mobile device. In some embodiments, processes executed remotely from the mobile device (e.g., requests for verification of the condition of the mobile device initiated by a remote server when the mobile device is unavailable for inspection) may be performed on or by one or more remote device(s) separate from the mobile device being verified (e.g., via a provider system 305, a remote verification system 307, or another third party device). Other processes that are wholly or partly device agnostic (e.g., retrieving or requesting metadata associated with a mobile device from a third-party server) may be performed on any of the aforementioned devices.

At block 801, the remote verification server 307 and/or mobile device(s) 310 (e.g., embodied as apparatuses 100 and/or 200) may include means, such as the remote verification circuitry 102 and/or the diagnostic circuitry 202, communications circuitries 105 and/or 205, input/output circuitries 104 and/or 204, memories 103 and/or 203, and processors 101 and/or 201, and/or the like, or a combination thereof, to receive a security data object associated with a mobile device which may contain data indicative of whether a security feature is enabled. The security data object may be requested from one or more locations in which it may be stored, and the security data object may be requested by one or more of the apparatuses (e.g., mobile device and/or remote verification system) as discussed herein. For example, the mobile device itself (e.g., apparatus 200) may comprise the security data object indicative of the status of the security feature. In some embodiments, a remote storage location may additionally or alternatively comprise the security data object. For example, a third-party system (e.g., provider system 305) may store the security data object indicative of the status of the security feature. For example, in embodiments in which Find My iphone is used by the mobile device as a security feature, a server associated with the phone manufacturer (e.g., Apple) may be queried for the security data object. At block 802, the apparatuses 100 and/or 200, or a combination thereof, may determine if one or more security features are enabled on the mobile device based on the security data object.

In some embodiments, if the security data object indicates that at least one security feature is enabled on the mobile device, then an invalid indication of the mobile device may be transmitted/to the remote verification system 307 (e.g., apparatus 100) over a network, such as the network 301. In some embodiments, the invalid indication may also be returned to the mobile device (e.g., over a network, such as the network 301), from the remote verification system 307, in the form of a configured GUI to disclose the invalid indication to the user of the mobile device, along with rendering a configured GUI or other computer executable instructions to disable said security feature of the mobile device (e.g., FIG. 14). In some embodiments, the invalid indication may be a temporary status associated with the security feature while the user is given time to disable the security feature prior to the indication of either an acceptable or an unacceptable condition.

In some embodiments, if the security data object indicates that the security feature(s) of the mobile device are disabled on the mobile device, then an indication of an acceptable condition of the mobile device may be transmitted to the remote verification system 307 (e.g., apparatus 100), assuming any other criteria for acceptability, if any, are also met (e.g., if a diagnostic is required, such as a screen crack detection, the diagnostic may also be determined to be acceptable prior to the determination of the acceptable condition). In some embodiments, the acceptable condition of the mobile device may also be returned to the mobile device (e.g., over a network, such as the network 301) in the form of a configured GUI to disclose the acceptable condition of the mobile device from the remote verification system 307 (e.g., apparatus 100).

FIG. 9 illustrates a flowchart according to an example method 900 for configuring a mobile device to disable a security feature of the mobile device (e.g., in conjunction with the invalid indication 803 of FIG. 8). In this regard, FIG. 9 illustrates operations that may be performed by a mobile device 310, remote verification system 307 (e.g., such as computing apparatus 100), and/or by cooperation with one or more of the computing apparatuses 100 and/or 200. The operations illustrated and described with respect to FIG. 8 may, for example, be performed by, with the assistance of, and/or under the control of one or more of the apparatuses discussed herein (e.g., apparatuses 100 and/or 200), including processors 101, memories 103, communications circuitries 105, remote verification circuitry 102, or input/output circuitries 104, processors 201, memories 203, communications circuitries 205, diagnostic circuitries 202, and input/output circuitries 204. In some embodiments, processes requiring the operation of the mobile device 310 (e.g., a subset of diagnostic tests instantiated on and/or requiring hardware or software feedback from the mobile device) are be performed on the mobile device. In some embodiments, processes executed remotely from the mobile device (e.g., requests for verification of the condition of the mobile device initiated by a remote server when the mobile device is unavailable for inspection) may be performed on or by one or more remote device(s) separate from the mobile device being verified (e.g., via a provider system 305, a remote verification system 307, or another third party device). Other processes that are wholly or partly device agnostic (e.g., retrieving or requesting metadata associated with a mobile device from a third-party server) may be performed on any of the aforementioned devices.

Following receipt of the security data object, at block 901, the remote verification system 307 (e.g., such as apparatus 100) and/or mobile device (e.g., apparatus 200) may include means, such as the remote verification circuitry 102 and/or the diagnostic circuitry 202, communications circuitries 105 and/or 205, input/output circuitries 104 and/or 204, memories 103 and/or 203, and processors 101 and/or 201, and/or the like, or a combination thereof, to determine one or more security features are enabled on the mobile device. In some embodiments, once a security feature has been determined to be enabled, the remote verification system 307 and/or the mobile device 310 may be configured to transmit computer executable instructions configured to cause the security feature to be disabled. In some embodiments, the computer executable instruction may facilitate manual (e.g., a printed set of instructions) or guided-manual (e.g., automatically opening a settings menu or disabling interface, asking the user for authorization and/or credentials to be transmitted for allowing the remote verification system 307 to disable the security feature, or the like) disabling of the security feature. In some embodiments, once a security feature has been determined to be enabled, the GUI of the mobile device may be configured to give instructions to disable the security feature of the mobile device. In some embodiments, the user may be given a predetermined threshold time period for the security feature to be disabled in order for an acceptable condition to be returned, and if the security feature is not disabled within the predetermined threshold time, the invalid condition may be converted into an unacceptable condition.

In some embodiments, once a security feature has been determined to be enabled on a mobile device, and at block 902, the mobile device 310 may be configured to disable the security feature(s). In some embodiments, a security data object may be configured to show that a security feature, associated with the mobile device, is enabled. The security feature(s) on the mobile device may be disabled locally (e.g., on the mobile device a user may access the security feature and turn it off from an interface of the mobile device like the touch screen or keyboard/keypad) or externally (e.g., using an account associated with the user of the mobile device, such that the user may use another computing device to log in to an account associated with the mobile device which may allow access to the security features of the mobile device). For example, if the mobile device is associated with a user's account on a provider's system, then a remote computing device (e.g., personal computer, iPad, another mobile device, or some other computing device which may communicate over a network), the remote computing device may be used to access the mobile device or an account associated with the mobile device, such as an account on a provider system, to cause remote disablement of the security feature. In some embodiments, the user may input an authentication credential, such as a username and a password, into the mobile device locally or into a second computing device having access to an account associated with the user of the mobile device and/or the mobile device itself. In some embodiments, an account of the user may be based on the phone number associated with the mobile device, wherein by the user inputting in the phone number during the remote verification of the condition of the mobile device process, the remote verification system and/or provider system may associate the current remote verification of the condition of the mobile device process with one or more previous remote verification of the condition of the mobile device processes previously run using the same phone number. The account may be linked solely to the mobile device, solely to the user, and/or to both the user and mobile device. In the aforementioned example, the security feature may be maintained locally and/or remotely (e.g., on a provider system) and may be updated in its respective location. In such embodiments, the provider system or other remote computing system may transmit an indication of the disabling of the security feature (e.g., via an updated security data object) back to the mobile device and/or remote verification system 307 for updating the mobile device and proceeding with the process(es) described herein. For example, in an instance in which the security feature is controlled by a provider system (e.g., provider system 305), the mobile device may be required to communicate with the provider system to determine the status of the security feature and to enable or disable the security feature. In such an example, the security feature may be disabled locally by instructing, via interaction with the mobile device GUI, the mobile device to request deactivation from the provider system. Similarly, in such an example, the security feature may be disabled externally by instructing, such as via the remote verification system 307, the third-party system (e.g., provider system 305) to disable the feature. In some embodiments, the security data object, which may have previously indicated that a security feature was enabled, may be updated to indicate that the security feature is disabled, and in response, the acceptable condition may be determined upon the satisfaction of any other criteria, if any, as discussed herein.

After it has been determined that one or more security features has been disabled, and at block 903, the mobile device, and/or its GUI, may be configured to indicate an acceptable condition if the security feature has been disabled. In some embodiments, and at block 904, after a predetermined threshold time has passed and the security feature is still enabled or not affirmatively indicated to be disabled, the mobile device may be configured to return an unacceptable condition of the mobile device.

In some embodiments described herein, a user of a mobile device may start the process of FIGS. 4 and/or 5 (e.g., at blocks 401 or 501) by accessing a remote verification program on a mobile device or a computing device associated with the mobile device. Such mobile device(s) include those shown as 310 in FIG. 3. The remote verification program may be accessed through the downloading of an app, through the accessing of a webpage or website, through an app created through SDK means, or through the accessing of a provider system (e.g., accessing a webpage associated with said provider). In some embodiments, the remote verification system 307 may direct at least a portion of the remote verification process. Once the remote verification process has been accessed, an API call or other computer executable instruction is provided from either the mobile device 310 or the remote verification system 307 to the provider system 305 and/or the mobile device 310 requesting that the provider systems 305 and/or the mobile device 310 access the security feature of the mobile device to retrieve and identify the status of a security data object. The security data object may be used as described herein to determine that the security feature is disabled or enabled and direct (e.g., via computer executable instructions from the remote verification system 307 and/or mobile device 310) disabling of the security feature prior to determining the acceptable condition or unacceptable condition and prior to any downstream processes discussed herein. In some embodiments, the mobile device 310 and/or remote verification system 307 may transmit computer executable instructions configured to cause the GUI of the mobile device to indicate an acceptable condition (i.e., the security data object indicates that the security feature is disabled) or an unacceptable condition/invalid condition (i.e., the security data object indicates that the security feature is enabled). In some embodiments, the security feature of the mobile device may be stored external from the mobile device, such that the enablement and disablement of the security feature may be controlled by transmitting requests from the mobile device to the provider system 310 (e.g., the Find My® iPhone® feature of Apple® may be stored in Apple® iCloud® external from the mobile device itself). In some embodiments, the security feature may be stored locally on the mobile device.

In some embodiments, where the security data object indicates that the security feature is enabled, the GUI of the mobile device may be configured to show an invalid indication for disabling the security feature. The user of the mobile device may then be prompted to disable the security feature and/or the remote verification system 307 or mobile device 310 may automatically disable the security feature. In some embodiments, once the security feature has been disabled, a computer executable instruction may be sent to the mobile device 310 and/or remote verification system 307 to indicate disabling of the security feature. In some embodiments, the mobile device 310 and/or remote verification system 307 may continually or periodically check the status of the security data object again to confirm whether the security data object has been disabled. The updated security data object may be processed to identify the acceptable condition (e.g., by the mobile device 310 and/or remote verification system 307), and computer executable instructions may be sent (e.g., by the mobile device 310 and/or remote verification system 307) to configure the GUI of the mobile device to indicate an acceptable condition (e.g., if the security data object indicates that the security feature has been disabled). In some embodiments, upon determination of the acceptable condition, the remote verification system 307 and/or mobile device 310 may then proceed with downstream processing of the mobile device (e.g., transmitting an offer to the user for service, trade-in, or the like).

Example Use Cases

In one example use case, a user and/or remote system may detect some flaw or defect with a mobile device and trigger a mobile device repair workflow (e.g., servicing a warranty claim or a repair outside of warranty). The mobile device repair workflow may include one or more predetermined requirements that must be satisfied before the servicer accepts the mobile device for repair. For example, the predetermined requirements may include requiring disabling of the security feature to permit access to the software of the mobile device by a service technician and/or to facilitate replacement of the mobile device without locking or bricking the mobile device. In such an example use case, the "acceptable condition" may be determined upon satisfaction of the predetermined requirement (e.g., determining that the security feature is disabled). In some embodiments, one or more additional diagnostic datapoints may optionally be collected (e.g., screen crack detection and internal diagnostics) to detect and inform the remote verification system and repair technician of the preexisting defects (if any) with the mobile device, without the additional diagnostic datapoints affecting the determination of the acceptable condition.

In one such example repair workflow, the system (e.g., the mobile device and/or remote verification system according to the various embodiments herein) may follow the process of FIGS. 4 and/or 5 to receive a request for verification of the mobile device condition in connection with the repair workflow. The mobile device 310 may then, in response to instruction from local software and/or instruction from the remote verification system 307, perform a screen crack detection process (e.g., process 700 described with respect to FIG. 7), an internal diagnostic (e.g., process 600 described with respect to FIG. 6), and verification of the status of the security feature (e.g., processes 800 and 900 described with respect to FIGS. 8-9). Upon determination that the security feature is disabled, the repair workflow may transmit the acceptable condition and proceed with transmitting instructions for the user to transport (e.g., ship) the mobile device to a repair provider and transmitting computer executable instructions to the repair provider with the additional diagnostic datapoints from the screen crack detection and internal diagnostics.

In some embodiments, the remote verification system may facilitate one or more verification processes based on inputs provided by the user of the mobile device. For example, a user may report one or more issues or request a general health check (e.g., running a broad diagnostic check of the mobile device), such as via the GUI 2000 shown in FIG. 20, which may trigger a remote verification. In some embodiments, the remote verification system 307 and/or the mobile device may select one or more diagnostics based on information provided by the user at the GUI 2000. For example, the remote verification system 307 and/or the mobile device may select the one or more diagnostics run on the mobile device (e.g., a screen crack detection, a digitizer, a battery diagnostic, a diagnostic on the microphone of the mobile device, etc.) based on the user's feedback. For example, a user may select from a menu of diagnostics including at least one of an audio diagnostic, a battery diagnostic, a buttons diagnostic for hardware on the mobile device, a camera diagnostic, a connectivity diagnostic, a display diagnostic, a sensor(s) diagnostic, such as the menu of diagnostics shown in FIG. 20 as configured GUI 2000 comprising diagnostics list 2002. Such a diagnostic menu may include an indicator for the user to select one or more diagnostics for the mobile device, such as the indication of 2001.

In some embodiments, when the one or more diagnostics are run on the mobile device via any process discussed herein, the remote verification of the condition of the mobile device process may configure the GUI of the mobile device to indicate that the one or more diagnostics are running and explain the process as it progresses. For example, and as shown in FIG. 30, as configured GUI 3000, a battery diagnostic may configure the GUI of the mobile device to instruct the user of the mobile device to plug the device in to test the connection of the charger and charging port to the mobile device and/or to ensure that the device does not inadvertently power off during the verification process, such as the instruction shown at 3001. In some embodiments, the configured GUI may indicate a picture and/or graphic of the charger of the mobile device being plugged into the mobile device, such as the graphic shown at 3002. In some embodiments, the configured GUI 3000 may comprise a button for a user to select to "Skip" the battery diagnostic (e.g., "button" 3003). The skip option may be presented either in an instance in which the user is permitted to not perform the diagnostic or in an instance in which the user is permitted to delay the diagnostic and proceed with other portions of the remote verification process.

In some embodiments, the remote verification of the condition of the mobile device process may configure the GUI of the mobile device to indicate a Bluetooth diagnostic is running on the mobile device, such as the configured GUI shown in FIG. 31 as configured GUI 3100. In some embodiments, the configured GUI 3100 may comprise an indication that the remote verification of the condition of the mobile device process is testing the Bluetooth connection of the mobile device at 3101. In some embodiments, the configured GUI 3100 may comprise a graphic and/or picture to indicate the type of diagnostic being run on the mobile device (e.g., graphic 3102 comprising a Bluetooth graphic). In some embodiments, the remote verification of the condition of the mobile device process may configure the GUI of the mobile device, such as that shown in FIG. 32 at configured GUI 3200, an indication of a Wi-Fi diagnostic being run on the mobile device by way of using a graphic to indicate the type of diagnostic (e.g., graphic 3201 comprising a Wi-Fi graphic). In some embodiments, the configured GUIs 3000, 3100, and 3200, of FIGS. 30, 31, and 32, respectively, may comprise an indication of the percentage of completion of the one or more diagnostics selected by a user and/or selected by the remote verification of the condition of the mobile device process, such as the percentages shown at 3004, 3104, and 3204, for FIGS. 30, 31, and 32, respectively. In the diagnostics, the mobile device may be instructed to perform one or more functions associated with the feature or functionality being tested and/or one or more data sets from the feature or functionality being tested may be collected to determine functionality of the device. In some embodiments, as described herein, an internal diagnostic of the mobile device may be instructed to carry out a pre-programmed diagnostic for the respective feature or functionality being tested. In some embodiments, current and/or historical data associated with the feature or functionality being tested may be collected to determine functionality of the device (e.g., WiFi signal strength, transmission/receipt rates, etc. in the case of a WiFi test).

In some embodiments, a user may select a more general diagnostic to run on the mobile device or may indicate that a check needs to be run without an indication of the potential fault, such as a health check of the mobile device like that shown at 2003 of configured GUI 2000. In some embodiments, the configured GUI of FIG. 20 may further comprise a time for which the one or more diagnostics to run and return one or more diagnostic outputs. For example, and as shown at 2004, the one or more diagnostics 2002 may take up to and including 3 minutes to complete each diagnostic and/or all the diagnostics chosen by the user, concurrently. In some embodiments, the configured GUI 2000 may comprise a "Continue" button (e.g., "button" 2005) which may take the user to one or more configured GUIs indicating the results of the one or more diagnostics run on the mobile device. In some embodiments, the configured GUI 2000 may comprise a "Back" button (e.g., "button" 2006) which may take the user to one or more configured GUIs indicating the start of the remote verification of the condition of the mobile device process, such as that shown in FIGS. 13, 14, 18 and 19. In some embodiments, the aforementioned diagnostics may be run in connection with one or more of the workflows described herein (e.g., trade in or repair/warranty) or as a standalone function for diagnosis purposes. Although described with respect to a repair workflow, one of ordinary skill in the art will appreciate, in light of the present disclosure, that the described process may also be used for other instances in which the user must allow access to the mobile device by a third party.

In another example use case, a user may transmit, either directly or indirectly, an indication of a registration update request to the remote verification system 307. The registration update request may be associated with, for example, a trade-in, sale, gift, or other transfer of the mobile device from the user to a subsequent user or intermediate recipient. In combination with the non-user based identification data objects discussed herein, whereby the mobile device may be identified based on one or more identifiers without requiring association with a particular user, the mobile device may be transferred to a third party without "bricking" the phone or causing other faults and while also allowing both users to remain anonymous (e.g., not providing user identifying information other than the mobile device identification data object) and have their data protected.

The mobile device registration update workflow (e.g., trade-in or the like as discussed above) may include one or more predetermined requirements that must be satisfied before the registration update can be completed and the mobile device transferred. For example, the predetermined requirements may include requiring disabling of the security feature to permit access to the software of the mobile device by the subsequent user or intermediate recipient without locking or bricking the mobile device. The predetermined requirements may also include one or more diagnostics, including a screen crack detection and internal diagnostics. In some embodiments, the one or more diagnostics run on for a registration update workflow (e.g., trade-in, sale, or other disposition of the device to a third party) may be selected by one or more clients (e.g., carriers of the mobile device or other service providers, such as OEMs) associated with the remote verification system, such that one or more of the diagnostics require a specific outcome (e.g., battery capacity must be equal to or greater than 50%, screen crack detection much return no cracks detected in mobile device screen, internal diagnostics must return one or more other acceptable indicators, etc.) before an indication of an acceptable condition is transmitted to the mobile device. In some embodiments, the one or more diagnostics run on the registration update workflow may be selected by one or more clients of the remote verification system, such that one or more diagnostics determine a trade-in value or other status of the mobile device without halting the process entirely. The respective effect of the diagnostics and the set of diagnostics performed may be selected by the clients and/or a third party (e.g., a first carrier providing trade-in functionality may select their own predetermined diagnostics separately from a second carrier providing a second trade-in functionality). In some embodiments, the failure of one or more diagnostics on the mobile device may not halt the registration update workflow, but may instead return a lower trade-in value (e.g., for reasons such as lower battery capacity, screen cracks detected on the mobile device, etc.) or may return a higher trade-in value (e.g., for reasons such as higher battery capacity, no screen cracks detected on the mobile device, etc.). In such an example use case, the "acceptable condition" may be determined upon satisfaction of the predetermined requirements (e.g., determining that the security feature is disabled, the screen is not cracked or satisfies a minimum level of damage, and the internal diagnostics are acceptable/pass). In some embodiments, one or more additional diagnostic datapoints may optionally be collected without the additional diagnostic datapoints affecting the determination of the acceptable condition. In some embodiments, the diagnostic test results may be provided to the client, a third party, or another designee without further processing.

In one such example workflow, the system (e.g., the mobile device and/or remote verification system according to the various embodiments herein) may follow the process of FIGS. 4 and/or 5 to receive a request for verification of the mobile device condition in connection with the registration update workflow. The mobile device 310 may then, in response to instruction from local software and/or instruction from the remote verification system 307, perform a screen crack detection process (e.g., process 700 described with respect to FIG. 7), an internal diagnostic (e.g., process 600 described with respect to FIG. 6), and verification of the status of the security feature (e.g., processes 800 and 900 described with respect to FIGS. 8-9). Upon determination that the security feature is disabled, the screen is not cracked or satisfies a minimum level of damage, and the internal diagnostics are acceptable/pass, the registration update workflow may transmit the acceptable condition. Upon receipt of the acceptable condition, the user may be provided with one or more downstream processing options. For example, the remote verification system 307 or an associated system may transmit an offer to the user (e.g., via the mobile device GUI) for the user to trade-in the device or otherwise dispose of the device.

In some embodiments, diagnostic data generated from the diagnostic(s) performed on the mobile device may be generated and/or received in parallel to the reception of the security data object associated with the mobile device. For example, an acceptable condition of the mobile device may be returned when either the diagnostic data generated meets or exceeds the acceptable values for the operational category/sub-category's data and/or the screen crack detection routine returns an indication that no screen cracks or damage to the surface of the mobile device were detected. In some embodiments, if an unacceptable condition and/or invalid indication is returned for the mobile device with respect to the diagnostic(s) performed on the mobile device, then an acceptable condition may still be generated if it is determined that the security feature of the mobile device is disabled. In some embodiments, the indication of an acceptable condition may only require a determination that the security feature is disabled.

In some embodiments, an acceptable condition may only be returned when the diagnostic(s) is (are) performed and the diagnostic data generated meets or exceeds the acceptable values for the operational category/sub-category's data and the screen crack detection routine returns an indication that no screen cracks or damage to the surface of the mobile device were detected; and when it is determined that the security feature of the mobile device is disabled.

In some embodiments, at least a portion of the diagnostic data generated from the diagnostic(s) performed on the mobile device may be generated using internal diagnostic(s) within the mobile device. For example, a mobile device may comprise specialized hardware, firmware, and/or software diagnostic process to determine the operational status and/or performance of any portion of the mobile device.

In some embodiments, the diagnostic data generated from the diagnostic(s) performed on the mobile device may include the mobile device transmitting to the remote verification system internal diagnostic indictors for an agent of the remote verification system to determine if the operational parameters meet one or more acceptable values. In some embodiments, at least a portion of a remote screen crack detection routine may also be performed external from the mobile device following capture of images by the mobile device and/or a secondary imaging device. For example, the remote screen crack detection routine may be performed by the remote verification system or a system associated with the remote verification system (e.g., an agent associated with the remote verification system), wherein one or more raw or at least partially processed images of the mobile device may be transmitted from the mobile device to a remote server (e.g., provider system 305 and/or remote verification system 307) via a network 301 for processing. In some embodiments, the agent may return an indication of the results of the screen crack detection routine to the mobile device. In some embodiments, if the screen crack detection fails, an acceptable condition may still be generated if it is determined that the security feature of the mobile device is disabled. In some embodiments, the indication of an acceptable condition may only require a determination that the security feature is disabled, or the acceptable condition may require all or some additional diagnostic tests to pass.

In some embodiments, the security feature of the mobile device may be controlled and/or disabled remote from the mobile device by transmitting one or more requests from the mobile device to a provider system and/or a remote verification system associated with a provider. For example, a user of the mobile device may access one or more settings within the mobile device (e.g., locally) and select the security feature from a settings menu to be disabled or enabled. Once the security feature has been selected by a user to be disabled locally, a request may be transmitted from the mobile device to provider system to disable the security feature housed and/or controlled within the provider system. In some embodiments, the provider system may transmit (e.g., forward) the request to an external server for disablement/enablement. In some embodiments, the provider system may transmit a signal back to the mobile device confirming that the security feature has been disabled. In some embodiments, an acceptable condition of the mobile device may be determined when the security feature is determined to be disabled. In some embodiments, an acceptable condition may be determined when the security feature is determined to be disabled and at least one of the diagnostic(s) herein described are determined to comprise an indication of an acceptable condition In another example use case, a user may transmit, either directly or indirectly, an indication of registration for the purchase of insurance for the mobile device to the remote verification system 307 and/or the provider system 305. The indication of registration for the insurance may comprise specific identifying information of the user of the mobile device, mobile device data (e.g., the age of the mobile device, the IMEI number, the storage capacity of the mobile device, etc.). In some embodiments, the remote verification system 307 and/or provider system 305 may comprise a registration update workflow which may comprise one or more predetermined requirements that must be satisfied before the registration of insurance can be completed and the mobile device covered. For example, the predetermined requirements may include one or more diagnostics, including a screen crack detection and internal diagnostics. In such an example use case, the "acceptable condition" may be determined upon satisfaction of the predetermined requirements (e.g., determining that the screen is not cracked or satisfies a maximum level of damage, and the internal diagnostics are acceptable/pass). In some embodiments, one or more additional diagnostic datapoints may optionally be collected without the additional diagnostic datapoints affecting the determination of the acceptable condition. In some embodiments, the acceptable condition may only require the one or more diagnostics to be generated and transmitted to the remote verification system 307 and/or the provider system 305, where the remote verification system 307 and/or the provider system 305 may return an insurance policy after processing the one or more diagnostics.

In one such example workflow, the system (e.g., the mobile device, the provider system, and/or remote verification system according to the various embodiments herein) may follow the process of FIGS. 4 and/or 5 to receive a request for verification of the mobile device condition in connection with the registration update workflow. The mobile device 310 may then, in response to instruction from local software and/or instruction from the remote verification system 307, perform a screen crack detection process (e.g., process 700 described with respect to FIG. 7) and an internal diagnostic (e.g., process 600 described with respect to FIG. 6). Upon determination that the screen is not cracked or satisfies a maximum level of damage, and the internal diagnostics are acceptable/pass, the registration update workflow may transmit the acceptable condition of the insurance policy. Upon receipt of the acceptable condition of the insurance policy, the user may be provided with one or more downstream processing options. For example, the remote verification system 307 or an associated system may transmit an offer to the user (e.g., via the mobile device GUI) for the user to accept the insurance policy for the mobile device.

Example Post-Acceptable Condition GUI

FIG. 16 illustrates an example GUI configured to be rendered on a mobile device in accordance with a post-acceptable condition (e.g., an interface that may be displayed following determination of an acceptable condition), which may present an offer to the user to purchase the mobile device (e.g., in connection with a trade-in or other transfer). Similarly, FIG. 17 illustrates an example GUI configured on a mobile device in accordance with a post-acceptable condition, showing a shipping barcode in accordance with a process for sending the mobile device to a third party (e.g., a repair depot, trade-in, warranty claim, out-of-warranty repair, an insurance claim, or the like) after a remote verification of the condition of the mobile device has taken place and the acceptable condition determined.

With respect to FIG. 16, an example GUI of the mobile device may be configured to show an acceptable condition of the mobile device based on the remote verification of the condition of the mobile device herein described. For instance, the GUI indicating the acceptable condition 1600 may comprise data (e.g., text data, number data, etc.) of the mobile device such as the manufacturer, model, and/or storage capability as shown at 1601. The GUI indicating the acceptable condition may also comprise a summary or overview of the diagnostic(s) performed on the mobile device 1610, including the results of the internal diagnostic, the disabling of the security feature, and/or the screen crack detection routine. In some embodiments, the GUI indicating the acceptable condition 1600 may comprise a input that a user may select (e.g., an input may comprise a visual representation of a button indicated on the mobile device interface such as button 1604 to Proceed, 1605 to go back to Start, button 1606 to Reject, and any other such buttons herein described) to continue with a trade-in of the mobile device at 1604. In some embodiments, the GUI indicating the acceptable condition 1600 may comprise an input to "reject" the offer, 1606, and exit the remote verification process on the mobile device. In some embodiments, once a user has selected the input to reject the offer (1606), the GUI may be configured to show the beginning of the remote verification process at step 401, 501 of respective FIG. 4 or 5. In some embodiments, the GUI may be configured with an input to go back to the start, at 1605, of the remote verification process (e.g., to return to step 401 of FIG. 1). In some embodiments, if an offer expires, the mobile device may be configured to terminate the trade in offer GUI after the predetermined time interval. In some embodiments, the user may be required to enter more details into the configured GUI of the mobile device in order to complete the trade-in.

In some embodiments, and as shown in FIG. 17, a GUI configured to give a user a barcode for shipping of the mobile device may be shown in GUI 1700. The barcode may be generated based on an address of the third party receiving the device (e.g., a trade-in organization, or an intermediary between the seller (current-user) of the mobile device and a future purchaser (future-user) of the mobile device).

In some embodiments, and as shown in FIG. 41, an example GUI 4100 configured to give a user a trade-in amount and routing information for a user account is shown. The trade-in amount, shown at 4102, may comprise the value associated with the mobile device after the acceptable condition is determined following one or more diagnostics have been run on the mobile device and the security feature has been indicated as disabled. In some embodiments, the trade-in value shown on GUI 4100 may be associated with an indication of the type of mobile device being traded in (e.g., iphone, Android, etc.) at 4105 and the trade-in value may further be associated with an indication of a mobile device identification data object, such as the IMEI number shown at 4105. In some embodiments, the GUI 4100 may comprise bank account routing information or other completion instructions, such as that shown at 4103, for the trade-in value of the mobile device. For example, the system may be configured to initiate payment to the designated payment method once the phone has been received at its destination for trade-in (e.g., a warehouse associated with the trade-in entity) and the mobile device has been verified against the identification data object. In some embodiments, GUI 4100 may comprise a button (e.g., a "Continue" button, 4104) for the user to select in order to proceed to the next step of the remote verification of the condition of the mobile device process. Such next step of the remote verification of the condition of the mobile device process may comprise a GUI configured to show a shipping label, like that shown in FIG. 17. In some embodiments herein, the GUI may be configured to facilitate disposition and/or repair of the device by providing other relevant information in addition to or instead of trade in information, such as instructions to transfer the device to a third party or return the device to a particular location.

In some embodiments, and as shown in FIG. 42, a GUI configured to show a final screen of the remote verification of the condition of the mobile device process may comprise an indication that the mobile device is approved for an upgrade and/or trade-in. For example, GUI 4200 may comprise a graphic and/or text (e.g., graphic and/or text as shown at 4201) indicting the mobile device has passed the one or more diagnostics and the security feature has been determined to be disabled. In some embodiments, GUI 4200 may comprise a graphic and/or text (e.g., graphic and/or text as shown at 4202) indicating the upgrade of the mobile device will only be completed once the mobile device has been brought into a store and/or warehouse associated with the trade-in/upgrade entity. In some embodiments, GUI 4200 may comprise a link and/or button (e.g., button 4203) which, when selected, may configure the GUI to show the mobile device on a satellite image and/or map and generate an indication of the nearest store and/or warehouse associated with the trade-in/upgrade entity for the user to take the mobile device. The process may include detecting a location of the mobile device and plotting the nearest trade in location on a map for the user. In some embodiments, GUI 4200 may comprise a button (e.g., "Retake Test" button, 4204) which may be selected by a user to restart the remote verification of the condition of the mobile device process. In some embodiments, GUI 4200 may comprise a button (e.g., "Explore My Device" button, 4205) which may be selected by a user to configure the GUI of the mobile device to show one or more data objects associated with the mobile device comprising the one or more diagnostic results of the mobile device from one or more previously-run remote verification of the condition of the mobile device processes.

In some embodiments, and as shown in FIG. 43, a GUI configured to show a final screen of the remote verification of the condition of the mobile device process may comprise an indication that the mobile device is unacceptable for an upgrade and/or trade-in. For example, GUI 4300 may comprise a graphic and/or text (e.g., graphic and/or text as shown at 4301) indicting the mobile device has failed at least one of the one or more diagnostics and the device is unacceptable (e.g., for trade in). In some embodiments, GUI 4300 may comprise a graphic and/or text (e.g., graphic and/or text as shown at 4302) indicating that one or more of the one or more diagnostics (e.g., a screen crack test, touch screen test, and battery health check in the depicted embodiment) have passed. In some embodiments, GUI 4300 may comprise a graphic and/or text (e.g., graphic and/or text as shown at 4303) indicating that one or more of the one or more diagnostics (e.g., a Bluetooth test and a WiFi test in the depicted embodiment) have failed. As described herein, depending upon the criteria associated with the verification process, the failed tests may trigger an unacceptable condition. In some embodiments, GUI 4300 may comprise a button (e.g., "Retake Test" button, 4304) which may be selected by a user to restart the remote verification of the condition of the mobile device process (e.g., following enabling or otherwise rectifying the fault associated with Bluetooth and/or WiFi in the depicted embodiment).

It is to be understood the implementations are not limited to particular systems or processes described which may, of course, vary. It is also to be understood that the terminology used herein is for the purpose of describing particular implementations only and is not intended to be limiting. As used in this specification, the singular forms "a", "an" and "the" include plural referents unless the content clearly indicates otherwise. Thus, for example, references to "an image" includes a combination of two or more images and references to "a graphic" includes different types and/or combinations of graphics.

Although the present disclosure has been described in detail, it should be understood that various changes, substitutions, and alterations may be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate form the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A computer executable method for remotely verifying a condition of a mobile device, said method comprising:
   receiving, via a remote verification device, a request for verification of the condition of the mobile device;
   based on the request, causing the mobile device to perform at least one diagnostic via a processor of the mobile device;
   based on the request, requesting at least one security data object associated with the mobile device from a remote provider device via a network, wherein the remote verification device, the remote provider device, and the mobile device are separate devices in communication via the network and remote from each other;
   based on the request, receiving the at least one security data object associated with the mobile device from the remote provider device via the network;
   determining that the at least one security data object indicates that a security feature associated with the at least one security data object is enabled such that a geographic location of the mobile device is viewable by one or more other devices; and
   in response to determining that the security feature associated with the at least one security data object is enabled, pausing verification of the condition of the mobile device until the security feature is disabled and causing rendering of a first graphical user interface for a user of the mobile device configured to facilitate disabling the security feature to cause the geographic location to no longer be viewable by the one or more other devices.

2. The method of claim 1, wherein the at least one diagnostic comprises a crack detection routine comprising:
   directing a user of the mobile device to orient a front-facing camera of the mobile device towards a reflective surface;
   capturing an image of the mobile device with the front-facing camera; and
   analyzing the image to determine if a crack is present or transmitting the image from the mobile device for analysis.

3. The method of claim 1, wherein the at least one diagnostic comprises an internal diagnostic test.

4. The method of claim 1, wherein the at least one security data object is transmitted from the mobile device or from the remote provider device to the remote verification device.

5. The method of claim 1, further comprising causing a prompt to be displayed on the mobile device, wherein the prompt comprises requesting entry of a serial number of the mobile device, receiving an identification data object associated with said mobile device, and determining that said identification data object matches the serial number.

6. The method of claim 1, further comprising receiving an updated security data object indicating that the security feature is disabled, determining an acceptable condition of the mobile device based upon the updated security data object, and transmitting computer readable instructions from the remote verification device configured to facilitate transfer of the mobile device from the user to a third party.

7. The method of claim 6, wherein the remote verification device is configured to determine the acceptable condition and facilitate transfer of the mobile device from the user to the third party without requiring identifying information associated with the user or the third party.

8. The method of claim 1, further comprising receiving an updated security data object indicating that the security feature is disabled, determining an acceptable condition of the mobile device based upon the updated security data object, and changing an indication of an acceptable condition of the mobile device to an unacceptable condition after a predetermined threshold time has lapsed.

9. The method of claim 1, further comprising receiving an updated security data object indicating that the security feature is disabled and transmitting an indication of an acceptable condition of the mobile device.

10. The method of claim 9, further comprising receiving an indication that the mobile device has passed the at least one diagnostic before transmitting the indication of the acceptable condition of the mobile device.

11. The method of claim 10, further comprising receiving the indication that the mobile device has passed the at least one diagnostic before receiving the at least one security data object associated with the mobile device.

12. The method of claim 1, further comprising:
   causing, in response to a selection of a first graphical element of the first graphical user interface, rendering of a second graphical user interface for the user of the mobile device configured to facilitate providing of an authentication credential associated with the user, wherein, in response to the authentication credential being provided via the second graphical user interface, the security feature is configured to be disabled such that the geographic location is no longer viewable by the one or more other devices.

13. The method of claim 12, further comprising:

determining that the authentication credential has been provided via the second graphical user interface;

requesting a second security data object associated with the mobile device from the remote provider device via the network in response to determining that the authentication credential has been provided via the second graphical user interface;

receiving the second security data object associated with the mobile device from the remote provider device via the network;

determining that the second security data object indicates that the security feature is disabled such that the geographic location of the mobile device is not viewable by the one or more other devices; and providing computer readable instructions configured to facilitate transfer of the mobile device from the user to a third party.

14. At least one non-transitory computer-readable storage medium having computer program code stored thereon, the computer program code configured, in execution with at least one processor, for:

receiving, via a remote verification device, a request for verification of a condition of a mobile device;

based on the request, causing the mobile device to perform at least one diagnostic via a processor of the mobile device;

based on the request, requesting at least one security data object associated with the mobile device from a remote provider device via a network, wherein the remote verification device, the remote provider device, and the mobile device are separate devices in communication via the network and remote from each other;

based on the request, receiving the at least one security data object associated with the mobile device from the remote provider device via the network;

determine that the at least one security data object indicates that a security feature associated with the at least one security data object is enabled such that a geographic location of the mobile device is viewable by one or more other devices, in response to determining that the security feature associated with the at least one security data object is enabled, pause verification of the condition of the mobile device until the security feature is disabled and cause rendering of a first graphical user interface for a user of the mobile device configured to facilitate disabling the security feature to cause the geographic location to no longer be viewable by the one or more other devices.

15. The at least one non-transitory computer-readable storage medium of claim 14, wherein performing at least one diagnostic comprises directing a user of the mobile device to orient a front-facing camera of the mobile device towards a reflective surface;

capturing an image of the mobile device with the front-facing camera; and analyzing the image to determine if a crack is present or transmitting the image from the mobile device for analysis.

16. The at least one non-transitory computer-readable storage medium of claim 14, wherein the at least one security data object is transmitted from the mobile device or from the remote provider device to the remote verification device.

17. The at least one non-transitory computer-readable storage medium of claim 14, wherein the computer program code is configured, in execution with the at least one processor, for causing a prompt to be displayed on the mobile device, wherein the prompt comprises requesting entry of a serial number of the mobile device, receiving an identification data object associated with said mobile device, and determining that said identification data object matches the serial number.

18. The at least one non-transitory computer-readable storage medium of claim 14, wherein the computer program code is configured, in execution with the at least one processor, for receiving an updated security data object indicating that the security feature is disabled, determining an acceptable condition of the mobile device based upon the updated security data object, and transmitting computer readable instructions from the remote verification device configured to facilitate transfer of the mobile device from the user to a third party.

19. The at least one non-transitory computer-readable storage medium of claim 18, wherein the remote verification device is configured to determine the acceptable condition and facilitate transfer of the mobile device from the user to the third party without requiring identifying information associated with the user or the third party.

20. The at least one non-transitory computer-readable storage medium of claim 14, wherein the computer program code is configured, in execution with the at least one processor, for receiving an updated security data object indicating that the security feature is disabled, determining an acceptable condition of the mobile device based upon the updated security data object, and changing the indication of an acceptable condition of the mobile device to an unacceptable condition after a predetermined threshold time has lapsed.

21. The at least one non-transitory computer-readable storage medium of claim 14, wherein the computer program code is configured, in execution with the at least one processor, for receiving an updated security data object indicating that the security feature is disabled and transmitting an indication of an acceptable condition of the mobile device.

22. The at least one non-transitory computer-readable storage medium of claim 21, wherein the computer program code is configured, in execution with the at least one processor, for receiving an indication that the mobile device has passed the at least one diagnostic before transmitting the indication of the acceptable condition of the mobile device.

23. The at least one non-transitory computer-readable storage medium of claim 22, wherein the computer program code is configured, in execution with the at least one processor, for receiving the indication that the mobile device has passed the at least one diagnostic before receiving the at least one security data object associated with the mobile device.

24. The at least one non-transitory computer-readable storage medium of claim 14, wherein computer program code may be housed on a Software Development Kit (SDK) and applied to at least one or more mobile devices.

25. A system for remote verification of a condition of a mobile device, the system comprising:

a processor of the mobile device configured to receive, via a remote verification device, a request for verification of the condition of the mobile device;

cause, based on the request, the mobile device to perform at least one diagnostic;

request, based on the request, at least one security data object associated with the mobile device from a remote provider device via a network, wherein the remote verification device, the remote provider device, and the mobile device are separate devices in communication via the network and remote from each other;

receive, based on the request, the at least one security data object associated with the mobile device from the remote provider device via the network;

determine that the at least one security data object indicates that a security feature associated with the at least one security data object is enabled such that a geographic location of the mobile device is viewable by one or more other devices; and in response to determining that the security feature associated with the at least one security data object is enabled, pause verification of the condition of the mobile device until the security feature is disabled and cause rendering of a first graphical user interface for a user of the mobile device configured to facilitate disabling the security feature to cause the geographic location to no longer be viewable by the one or more other devices.

*   *   *   *   *